United States Patent
Krosschell et al.

(10) Patent No.: US 12,458,012 B2
(45) Date of Patent: *Nov. 4, 2025

(54) VALVE CONTROL SYSTEM AND METHOD

(71) Applicant: Raven Industries, Inc., Sioux Falls, SD (US)

(72) Inventors: Justin Krosschell, Sioux Falls, SD (US); Drew John Waltner, Freeman, SD (US); Travis Allen Burgers, Sioux Falls, SD (US); Jacob David Deines, Brandon, SD (US); Seth Steensma, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,321

(22) Filed: Feb. 3, 2023

(65) Prior Publication Data

US 2023/0329220 A1 Oct. 19, 2023

Related U.S. Application Data

(63) Continuation of application No. 17/224,955, filed on Apr. 7, 2021, now Pat. No. 11,612,160, which is a (Continued)

(51) Int. Cl.
*A01M 7/00* (2006.01)
*B05B 1/08* (2006.01)
(Continued)

(52) U.S. Cl.
CPC ........... *A01M 7/0089* (2013.01); *B05B 1/083* (2013.01); *B05B 1/3026* (2013.01); *B05B 12/006* (2013.01); *B05B 12/16* (2018.02)

(58) Field of Classification Search
CPC ..... B05B 1/083; B05B 1/3026; B05B 12/006; B05B 12/16
See application file for complete search history.

(56) References Cited

U.S. PATENT DOCUMENTS 1,582,986 A 5/1926 Frank
3,197,299 A 7/1965 Bosse et al.
(Continued)

FOREIGN PATENT DOCUMENTS

AU 725448 10/2000
AU 2004219715 9/2004
(Continued)

OTHER PUBLICATIONS

"Agrifac Pulse-width modulation (PWM) spraying", (c) 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.
(Continued)

*Primary Examiner* — Eric Keasel
(74) *Attorney, Agent, or Firm* — Schwegman Lundberg & Woessner, P.A.

(57) ABSTRACT

A sprayer control system includes a plurality of smart nozzles each having at least one control valve with a valve operator, an electronic control unit for the valve operator, and one or more spray nozzles. The at least one control valve and the ECU control a flow rate of liquid agricultural product through the nozzles. A duty cycle modulator is in communication with the ECU and generates an applied duty cycle for the at least one control valve. The duty cycle modulator includes a specified duty cycle input having a specified duty cycle and a pressure monitor associated with the at least one control valve. A pressure comparator compares the valve pressure determined with the pressure moni-
(Continued)

tor with a system pressure and generates a pressure error. An applied duty cycle generator generates the applied duty cycle based on the specified duty cycle modified by the pressure error.

19 Claims, 16 Drawing Sheets

Related U.S. Application Data continuation-in-part of application No. 17/001,539, filed on Aug. 24, 2020, now Pat. No. 11,236,841, application No. 18/164,321, filed on Feb. 3, 2023 is a continuation-in-part of application No. PCT/US2020/047696, filed on Aug. 24, 2020.

(60) Provisional application No. 62/911,045, filed on Oct. 4, 2019.

(51) Int. Cl.
 B05B 1/30 (2006.01)
 B05B 12/00 (2018.01)
 B05B 12/16 (2018.01)

(56) References Cited

U.S. PATENT DOCUMENTS

| | | |
|---|---|---|
| 3,770,198 A | 11/1973 | Mihara |
| 3,955,795 A | 5/1976 | Neely |
| 4,283,010 A | 8/1981 | Arzi et al. |
| 4,392,611 A | 7/1983 | Bachman et al. |
| 4,398,605 A | 8/1983 | Conklin et al. |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 4,970,973 A | 11/1990 | Lyle et al. |
| 5,134,961 A | 8/1992 | Giles et al. |
| 5,285,814 A | 2/1994 | Pettersson et al. |
| 5,310,113 A | 5/1994 | Cowgur |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,520,333 A | 5/1996 | Tofte |
| 5,615,836 A | 4/1997 | Graef |
| 5,635,911 A | 6/1997 | Landers et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,881,919 A | 3/1999 | Womac et al. |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,931,882 A | 8/1999 | Fick et al. |
| 5,936,234 A | 8/1999 | Thomas et al. |
| 5,938,071 A | 8/1999 | Sauder |
| 5,941,303 A | 8/1999 | Gowan et al. |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,012,996 A | 1/2000 | Lo |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,089,743 A | 7/2000 | Mcquinn et al. |
| 6,093,926 A | 7/2000 | Mertins et al. |
| 6,112,999 A | 9/2000 | Fingleton et al. |
| 6,122,581 A | 9/2000 | McQuinn |
| 6,145,455 A | 11/2000 | Gust et al. |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,196,473 B1 | 3/2001 | Beeren et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,269,757 B1 | 8/2001 | Kiest |
| 6,276,385 B1 | 8/2001 | Gassman |
| 6,285,938 B1 | 9/2001 | Lang et al. |
| 6,305,583 B1 | 10/2001 | Ward et al. |
| 6,373,057 B1 | 4/2002 | Penfold |
| 6,486,761 B1 | 11/2002 | Czarnetzki et al. |
| 6,522,948 B1 | 2/2003 | Benneweis |
| 6,533,334 B1 | 3/2003 | Bonn |
| 6,584,920 B1 | 7/2003 | Cresswell |
| 6,598,944 B1 | 7/2003 | Wolff et al. |
| 6,606,542 B2 | 8/2003 | Hauwiller et al. |
| 6,661,514 B1 | 12/2003 | Tevs et al. |
| 6,666,384 B2 | 12/2003 | Prandi |
| 6,678,580 B2 | 1/2004 | Benneweis |
| 6,698,368 B2 | 3/2004 | Cresswell |
| 6,708,080 B2 | 3/2004 | Benneweis |
| 6,720,684 B2 | 4/2004 | Czimmek |
| 6,755,390 B2 | 6/2004 | Masuda et al. |
| 6,776,355 B2 | 8/2004 | Ringer et al. |
| 6,851,377 B2 | 2/2005 | Mayerle et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,195,027 B2 | 3/2007 | Goossens et al. |
| 7,243,899 B2 | 7/2007 | Acar et al. |
| 7,311,004 B2 | 12/2007 | Giles |
| 7,347,221 B2 | 3/2008 | Berger et al. |
| 7,395,769 B2 | 7/2008 | Jensen |
| 7,441,746 B2 | 10/2008 | Sugiyama |
| 7,472,660 B2 | 1/2009 | Mariman et al. |
| 7,478,603 B2 | 1/2009 | Riewerts et al. |
| 7,490,564 B2 | 2/2009 | Allan et al. |
| 7,502,665 B2 | 3/2009 | Giles et al. |
| 7,626,288 B2 | 12/2009 | Protze |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,845,914 B2 | 12/2010 | Engelbrecht et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |

(56) References Cited

U.S. PATENT DOCUMENTS

| | | |
|---|---|---|
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,214,111 B2 | 7/2012 | Heiniger et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,505,573 B2 | 8/2013 | Herbert et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,635,848 B2 | 5/2017 | Needham et al. |
| 9,702,475 B2 | 7/2017 | Scheffel et al. |
| 9,781,916 B2 | 10/2017 | Preheim et al. |
| 9,894,829 B2 | 2/2018 | Shivak |
| 10,058,879 B2 | 8/2018 | Needham |
| 10,173,236 B2 | 1/2019 | Preheim et al. |
| 10,189,031 B2 | 1/2019 | Funseth et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,799,898 B2 | 10/2020 | Posselius et al. |
| 10,821,460 B2 | 11/2020 | Batcheller et al. |
| 11,051,505 B2 | 7/2021 | Humpal et al. |
| 11,071,247 B2 | 7/2021 | Shivak et al. |
| 11,134,668 B2 | 10/2021 | Preheim et al. |
| 11,160,204 B2 | 11/2021 | Michael |
| 11,236,841 B2 | 2/2022 | Krosschell et al. |
| 11,261,998 B2 | 3/2022 | Bodenschatz et al. |
| 11,309,112 B2 | 4/2022 | Katagiri et al. |
| 11,396,892 B2 | 7/2022 | Long et al. |
| 11,612,160 B2 | 3/2023 | Krosschell et al. |
| 11,944,046 B2 * | 4/2024 | Wonderlich .......... B05B 12/085 |
| 12,029,214 B2 | 7/2024 | Preheim et al. |
| 12,055,234 B2 | 8/2024 | Krosschell et al. |
| 12,274,260 B2 | 4/2025 | Long et al. |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2003/0234301 A1 | 12/2003 | Swan |
| 2004/0036048 A1 | 2/2004 | Petersen |
| 2004/0104370 A1 | 6/2004 | Suzuki |
| 2004/0128045 A1 | 7/2004 | Benneweis |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0230624 A1 | 9/2008 | Giles et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1 | 5/2009 | Giles |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320105 A1 | 12/2013 | Schmidt |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1 | 12/2014 | Michael |
| 2015/0115058 A1 | 4/2015 | Wilger |
| 2015/0167861 A1 | 6/2015 | Ferrer Herrera et al. |
| 2015/0257331 A1 | 9/2015 | Shivak |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |

(56) References Cited

U.S. PATENT DOCUMENTS

| | | | |
|---|---|---|---|
| 2016/0044862 | A1 | 2/2016 | Kocer et al. |
| 2016/0084382 | A1 | 3/2016 | Pisasale |
| 2016/0136671 | A1 | 5/2016 | Kocer |
| 2016/0175869 | A1 | 6/2016 | Sullivan et al. |
| 2016/0178422 | A1 | 6/2016 | Humpal et al. |
| 2016/0227755 | A1 | 8/2016 | Preheim et al. |
| 2016/0251008 | A1 | 9/2016 | Jeon et al. |
| 2017/0018345 | A1 | 1/2017 | Raff et al. |
| 2017/0050206 | A1 | 2/2017 | Bullock et al. |
| 2017/0079200 | A1 | 3/2017 | Posselius et al. |
| 2017/0120263 | A1 | 5/2017 | Needham |
| 2017/0251656 | A1 | 9/2017 | Kolb et al. |
| 2017/0284285 | A1 | 10/2017 | Lenk et al. |
| 2017/0314580 | A1 | 11/2017 | Steensma et al. |
| 2017/0348718 | A1 | 12/2017 | Preheim et al. |
| 2018/0042214 | A1 | 2/2018 | Preheim et al. |
| 2018/0111148 | A1 | 4/2018 | Batcheller et al. |
| 2018/0288934 | A1 | 10/2018 | Shivak |
| 2019/0029170 | A1 | 1/2019 | Wilger |
| 2019/0040972 | A1 | 2/2019 | Schrader |
| 2019/0047694 | A1 | 2/2019 | Zivan et al. |
| 2019/0321844 | A1 | 10/2019 | Schrader et al. |
| 2019/0350187 | A1 | 11/2019 | Kocer et al. |
| 2019/0373880 | A1 | 12/2019 | Kocer et al. |
| 2020/0037519 | A1 | 2/2020 | Wonderlich et al. |
| 2020/0101480 | A1 | 4/2020 | Schrader et al. |
| 2020/0107538 | A1 | 4/2020 | Preheim et al. |
| 2020/0113170 | A1 | 4/2020 | Davis et al. |
| 2020/0113171 | A1 | 4/2020 | Davis et al. |
| 2020/0214193 | A1 | 7/2020 | Shivak |
| 2020/0217894 | A1 | 7/2020 | Ferrarini et al. |
| 2020/0221682 | A1 | 7/2020 | Grimm et al. |
| 2020/0253111 | A1 | 8/2020 | Schlipf et al. |
| 2020/0406281 | A1 | 12/2020 | Funseth et al. |
| 2021/0000006 | A1 | 1/2021 | Ellaboudy et al. |
| 2021/0102637 | A1 | 4/2021 | Krosschell et al. |
| 2021/0144906 | A1 | 5/2021 | Shivak et al. |
| 2021/0219538 | A1 | 7/2021 | Krosschell et al. |
| 2021/0282315 | A1 | 9/2021 | Charcosset |
| 2021/0289693 | A1 | 9/2021 | Harmon et al. |
| 2021/0400946 | A1 | 12/2021 | Burgers et al. |
| 2022/0079132 | A1 | 3/2022 | Preheim et al. |
| 2022/0099213 | A1 | 3/2022 | Krosschell et al. |
| 2023/0141867 | A1 | 5/2023 | Krosschell et al. |
| 2023/0356248 | A1 | 11/2023 | Krosschell et al. |
| 2024/0324580 | A1 | 10/2024 | Preheim et al. |
| 2024/0418289 | A1 | 12/2024 | Krosschell et al. |

FOREIGN PATENT DOCUMENTS

| | | |
|---|---|---|
| AU | 2005247004 | 12/2006 |
| AU | 2006202376 B2 | 12/2006 |
| AU | 2009203181 A1 | 2/2010 |
| AU | 2012201357 A1 | 9/2012 |
| AU | 2013203361 A1 | 10/2013 |
| AU | 2013204455 A1 | 3/2014 |
| AU | 2013248190 | 5/2014 |
| AU | 2013277513 B2 | 3/2017 |
| AU | 2015204319 | 4/2019 |
| AU | 2017285727 B2 | 7/2020 |
| AU | 2020357581 | 5/2022 |
| AU | 2023214344 | 8/2023 |
| CA | 2229852 A1 | 8/1998 |
| CA | 2517031 A1 | 9/2004 |
| CA | 2528708 A1 | 11/2006 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CA | 2830306 | 4/2014 |
| CA | 2926448 A1 | 4/2015 |
| CA | 2926448 C | 9/2020 |
| CN | 102435019 A | 5/2012 |
| CN | 202255911 U | 5/2012 |
| CN | 102266829 B | 12/2012 |
| CN | 203264929 U | 11/2013 |
| DE | 102011053182 | 3/2013 |
| DE | 112017003084 T5 | 6/2019 |
| EP | 0576121 B1 | 3/1996 |
| EP | 969712 | 1/2000 |
| EP | 0963255 B1 | 10/2002 |
| EP | 0847307 B2 | 1/2003 |
| EP | 1426112 B1 | 6/2011 |
| FR | 2964047 A1 | 3/2012 |
| GB | 990346 A | 4/1965 |
| GB | 2322573 A | 9/1998 |
| JP | 2759711 B2 | 5/1998 |
| JP | 2000139245 A | 5/2000 |
| JP | 2005161221 A | 6/2005 |
| WO | WO-9712688 A1 | 4/1997 |
| WO | WO1997012688 | 4/1997 |
| WO | WO-98037751 | 9/1998 |
| WO | WO-9842178 A1 | 10/1998 |
| WO | WO-9916007 A1 | 4/1999 |
| WO | WO-2004023865 | 3/2004 |
| WO | WO-2004081499 | 9/2004 |
| WO | WO-2005048704 A2 | 6/2005 |
| WO | WO-2008059984 A1 | 5/2008 |
| WO | WO-2008112930 A1 | 9/2008 |
| WO | WO-2010105221 A1 | 9/2010 |
| WO | WO-2012022903 A1 | 2/2012 |
| WO | WO-2013135430 A1 | 9/2013 |
| WO | WO-2013191990 A2 | 12/2013 |
| WO | WO-2013191990 A3 | 12/2013 |
| WO | WO-2014201008 A1 | 12/2014 |
| WO | WO-2014210043 A1 | 12/2014 |
| WO | WO-2015058091 A1 | 4/2015 |
| WO | WO-2016145081 A2 | 9/2016 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |
| WO | WO-2021066962 A1 | 4/2021 |
| WO | 2021263024 | 12/2021 |
| WO | 2022216285 | 10/2022 |
| WO | WO-2022216285 A1 | 10/2022 |
| WO | 2023081371 | 5/2023 |
| WO | 2023215178 | 11/2023 |

OTHER PUBLICATIONS

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

"U.S. Appl. No. 13/832,678, Response filed Dec. 31, 2015 to Non Final Office Action mailed Oct. 1, 2015", 10 pgs.

"U.S. Appl. No. 13/832,678, Restriction Requirement mailed Jun. 9, 2015", 7 pgs.

(56) References Cited

OTHER PUBLICATIONS

"U.S. Appl. No. 13/832,735, Final Office Action mailed Aug. 5, 2016", 29 pgs.
"U.S. Appl. No. 13/832,735, Non Final Office Action mailed Feb. 19, 2016", 26 pgs.
"U.S. Appl. No. 13/832,735, Non Final Office Action mailed Jul. 15, 2015", 22 pgs.
"U.S. Appl. No. 13/832,735, Response filed May 19, 2016 to Non Final Office Action mailed Feb. 19, 2016", 13 pgs.
"U.S. Appl. No. 13/832,735, Response filed Nov. 16, 2015 to Non-Final Office Action mailed Jul. 15, 2015", 16 pgs.
"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action malled May 24, 2018", 16 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", (9 pgs).
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.
"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action mailed Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.

"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action malled Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response filed Nov. 13, 2018 to Examiner's Reasons for Allowance mailed May 3, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.
"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Non Final Office Action mailed Aug. 31, 2021", 14 pgs.
"U.S. Appl. No. 16/476,016, Preliminary Amendment filed Jul. 3, 2019", 12 pgs.
"U.S. Appl. No. 16/476,016, Response filed Jul. 28, 2021 to Restriction Requirement mailed Apr. 30, 2021", 12 pgs.
"U.S. Appl. No. 16/476,016, Restriction Requirement mailed Apr. 30, 2021", 8 pgs.

(56) References Cited

OTHER PUBLICATIONS

"U.S. Appl. No. 16/476,069, Preliminary Amendment filed Jul. 3, 2019", 13 pgs.
"U.S. Appl. No. 16/476,069, Response filed Jul. 27, 2021 to Restriction Requirement mailed May 3, 2021", 10 pgs.
"U.S. Appl. No. 16/476,069, Restriction Requirement mailed May 3, 2021", 9 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Preliminary Amendment filed Jan. 28, 2021", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/410,852, Preliminary Amendment filed Dec. 10, 2021", 8 pgs.
"U.S. Appl. No. 17/465,644, Preliminary Amendment filed Dec. 17, 2021", 11 pgs.
"Application Serial No. PCT/US2014/061150, International Preliminary Report on Patentability mailed Oct. 16, 2015", 10 pgs.
"U.S. Appl. No. 15/629,696, Notice of Allowance malled Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 12 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Voluntary Amendment filed Jun. 22, 2020", (w/ English Translation), 44 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Dec. 18, 2019 to Office Action malled Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Office Action mailed Sep. 4, 2020", 4 pgs.
"Canadian Application Serial No. 3,049,391, Response filed Mar. 3, 2021 to Office Action mailed Sep. 4, 2020", 11 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Response filed Mar. 1, 2021 to Office Action mailed Nov. 5, 2020", 19 pgs.
"Canadian Application Serial No. 3153465, Examiners Rule 86(2) Report mailed Jan. 13, 2023", 3 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.

(56) References Cited

OTHER PUBLICATIONS

"European Application Serial No. 18735853.6, Response filed Feb. 24, 2020 to Communiciation pursuant to Rules 161(2) and 162 EPC mailed Aug. 13, 2019", 16 pgs.

"European Application Serial No. 18736496.3, Extended European Search Report mailed Sep. 15, 2020", 9 pgs.

"European Application Serial No. 18736496.3, Response filed Apr. 12, 2021 to Extended European Search Report mailed Sep. 15, 2020", 31 pgs.

"European Application Serial No. 18736496.3, Response to Communication Pursuant to Rules 161(2) and 162 EPC filed Feb. 28, 2020", 14 pgs.

"European Application Serial No. 20872967.3, Response to Communication Pursuant to Rules 161 and 162 EPC filed Nov. 17, 2022", 9 pgs.

"German Application Serial No. 11 2017 003 084.6, Office Action mailed Feb. 5, 2019", (w/ English Translation), 5 pgs.

"German Application Serial No. 11 2017 003 084.6, Response filed May 8, 2019 to Office Action mailed Feb. 5, 2019", (w/ Concise Statement of Relevance), 17 pgs.

"International Application Serial No. PCT/US2013/045445, International Preliminary Report on Patentability mailed Dec. 31, 2014", 7 pgs.

"International Application Serial No. PCT/US2013/045445, International Search Report mailed Nov. 27, 2013", 3 pgs.

"International Application Serial No. PCT/US2013/045445, Written Opinion mailed Nov. 27, 2013", 9 pgs.

"International Application Serial No. PCT/US2014/041717, International Preliminary Report on Patentability mailed May 6, 2015", 11 pgs.

"International Application Serial No. PCT/US2014/041717, International Search Report mailed Oct. 15, 2014", 2 pgs.

"International Application Serial No. PCT/US2014/041717, Response and Amendment filed Apr. 5, 2015 to Written Opinion mailed Oct. 15, 2014", 15 pgs.

"International Application Serial No. PCT/US2014/041717, Written Opinion mailed Oct. 15, 2014", 7 pgs.

"International Application Serial No. PCT/US2014/043926, International Preliminary Report on Patentability Jan. 7, 2016", 11 pgs.

"International Application Serial No. PCT/US2014/043926, International Search Report mailed Nov. 3, 2014", 2 pgs.

"International Application Serial No. PCT/US2014/043926, Written Opinion mailed Nov. 3, 2014", 9 pgs.

"International Application Serial No. PCT/US2014/061150, International Search Report mailed Feb. 4, 2015", 2 pgs.

"International Application Serial No. PCT/US2014/061150, Written Opinion mailed Feb. 4, 2015", 7 pgs.

"International Application Serial No. PCT/US2017/030694, International Preliminary Report on Patentability mailed May 29, 2018", 23 pgs.

"International Application Serial No. PCT/US2017/030694, International Search Report mailed Aug. 1, 2017", 3 pgs.

"International Application Serial No. PCT/US2017/030694, Response filed Mar. 2, 2018 to Written Opinion mailed Aug. 1, 2017", 4 pgs.

"International Application Serial No. PCT/US2017/030694, Written Opinion mailed Aug. 1, 2017", 8 pgs.

"International Application Serial No. PCT/US2017/038622, International Preliminary Report on Patentability mailed Jan. 3, 2019", 7 pgs.

"International Application Serial No. PCT/US2017/038622, International Search Report mailed Sep. 28, 2017", 2 pgs.

"International Application Serial No. PCT/US2017/038622, Written Opinion mailed Sep. 28, 2017", 5 pgs.

"International Application Serial No. PCT/US2018/012590, International Preliminary Report on Patentability mailed Jul. 18, 2019", 15 pgs.

"International Application Serial No. PCT/US2018/012590, International Search Report mailed Apr. 13, 2018", 4 pgs.

"International Application Serial No. PCT/US2018/012590, Invitation to Pay Additional Fees and Partial Search Report mailed Feb. 21, 2018", 2 pgs.

"International Application Serial No. PCT/US2018/012590, Written Opinion mailed Apr. 13, 2018", 13 pgs.

"International Application Serial No. PCT/US2018/012661, International Preliminary Report on Patentability mailed Jul. 18, 2019", 11 pgs.

"International Application Serial No. PCT/US2018/012661, International Search Report mailed Jun. 21, 2018", 4 pgs.

"International Application Serial No. PCT/US2018/012661, Invitation to Pay Additional Fees and Partial Search Report mailed Mar. 15, 2018", 2 pgs.

"International Application Serial No. PCT/US2018/012661, Written Opinion mailed Jun. 21, 2018", 9 pgs.

"International Application Serial No. PCT/US2020/047696, International Preliminary Report on Patentability mailed Apr. 14, 2022", 6 pgs.

"International Application Serial No. PCT/US2020/047696, International Search Report mailed Nov. 23, 2020", 2 pgs.

"International Application Serial No. PCT/US2020/047696, Written Opinion mailed Nov. 23, 2020", 4 pgs.

"International Application Serial No. PCT/US2021/026252, International Search Report mailed Jun. 15, 2021", 2 pgs.

"International Application Serial No. PCT/US2021/026252, Written Opinion mailed Jun. 15, 2021", 4 pgs.

"International Application Serial No. PCT/US2022/048981, Invitation to Pay Additional Fees mailed Jan. 19, 2023", 5 pgs.

Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.

Dietz, John, "A five-part program for efficient farming", Farming, (Apr. 2000), 1-4.

Elmore, Clyde L., "Soil Solarization A Nonpesticidal Method for Controlling Diseases, Nematodes, and Weeds", University of California Division of Agriculture and Natural Resources Publication 21377, (1997), 1-17.

Van Zuydam, R. P, "A driver's steering aid for an agricultural implement, based on an electronic map and Real Time Kinematic DGPS", Computers and Electronics in Agriculture, 24(3), (Dec. 1999), 153-163.

Van Zuydam, R. P, "Centimeter-Precision Guidance of Agricultural Implements In the Open Field by Means of Real Time Kinematic Dgps", Proceedings of the Fourth International Conference on Precision Agriculture, (1999), 1023-1034.

"U.S. Appl. No. 16/731,325, Notice of Allowance mailed Mar. 23, 2021", 5 pgs.

"Canadian Application Serial No. 2,877,195, Response filed Apr. 8, 2021 to Office Action mailed Dec. 9, 2020", 16 pgs.

"U.S. Appl. No. 14/300,761, Response filed Apr. 19, 2021 to Final Office Action mailed Dec. 18, 2020", 19 pgs.

"U.S. Appl. No. 14/300,761, Notice of Allowance mailed May 7, 2021", 16 pgs.

"U.S. Appl. No. 16/731,325, Corrected Notice of Allowability mailed Jun. 15, 2021", 2 pgs.

"Wilger 2019-20 Manufacturer's Suggested Retail Price List", (Revised Sep. 1, 2019), 20 pgs.

"U.S. Appl. No. 14/300,761, Notice of Allowance mailed Sep. 9, 2021", 16 pgs.

"Canadian Application Serial No. 3,049,421, Response filed Oct. 1, 2021 to Office Action mailed Jun. 4, 2021", 33 pgs.

"International Application Serial No. PCT US2021 038955, International Search Report mailed Sep. 29, 2021", 2 pgs.

"International Application Serial No. PCT US2021 038955, Written Opinion mailed Sep. 29, 2021", 5 pgs.

"Brazilian Application Serial No. 1120180747017, Response filed Oct. 20, 2021 to Office Action mailed Jul. 22, 2021", (W English Translation of Claims), 14 pgs.

"U.S. Appl. No. 16/476,069, Non Final Office Action mailed Nov. 12, 2021", 13 pgs.

(56) References Cited

OTHER PUBLICATIONS

"European Application Serial No. 18735853.6, Response filed Oct. 28, 2021 to Communication Pursuant to Article 94(3) EPC mailed Jun. 18, 2021", 17 pgs.
"U.S. Appl. No. 16/476,016, Response filed Nov. 29, 2021 to Non Final Office Action mailed Aug. 31, 2021", 19 pgs.
"Canadian Application Serial No. 3,049,421, Office Action mailed Nov. 29, 2021", 4 pgs.
"Canadian Application Serial No. 3,049,391, Office Action mailed Dec. 1, 2021", 4 pgs.
"U.S. Appl. No. 17/504,601, Preliminary Amendment filed Dec. 22, 2021", 7 pgs.
"U.S. Appl. No. 16/476,016, Final Office Action mailed Jan. 11, 2022", 15 pgs.
"U.S. Appl. No. 16/476,069, Examiner Interview Summary mailed Mar. 18, 2022", 2 pgs.
"Canadian Application Serial No. 3,049,391, Response filed Mar. 15, 2022 to Office Action mailed Dec. 1, 2021", 8 pgs.
"Canadian Application Serial No. 3,049,421, Response filed Mar. 25, 2022 to Office Action mailed Nov. 29, 2021", 18 pgs.
"U.S. Appl. No. 16/476,016, Response filed Apr. 11, 2022 to Final Office Action mailed Jan. 11, 2022", 18 pgs.
"U.S. Appl. No. 16/476,069, Response filed Apr. 11, 2022 to Non Final Office Action mailed Nov. 12, 2021", 12 pgs.
"U.S. Appl. No. 16/476,016, Examiner Interview Summary mailed Apr. 15, 2022", 2 pgs.
"Brazilian Application Serial No. 1120180747017, Opinion for non-patenteability (RPI 7.1) mailed Mar. 29, 2022", (w English Translation), 18 pgs.
"European Application Serial No. 18735853.6, Communication Pursuant to Article 94(3) EPC mailed Jun. 10, 2022", 3 pgs.
"U.S. Appl. No. 16/476,016, Non Final Office Action mailed Jun. 24, 2022", 15 pgs.
"Brazilian Application Serial No. 1120180747017, Response filed Jul. 4, 2022 Opinion for non-patentability (RPI 7.1) mailed Mar. 29, 2022", (w Concise Statement of Relevance), 22 pgs.
"U.S. Appl. No. 16/476,069, Final Office Action mailed Jul. 25, 2022", 13 pgs.
"Brazilian Application Serial No. 1120180747017, Office Action mailed Sep. 6, 2022", W English Translation, 6 pgs.
"Canadian Application Serial No. 3,049,391, Office Action mailed Sep. 26, 2022", 4 pgs.
"U.S. Appl. No. 16/476,016, Examiner Interview Summary mailed Oct. 4, 2022", 2 pgs.
"U.S. Appl. No. 16/476,016, Response filed Oct. 24, 2022 to Non Final Office Action mailed Jun. 24, 2022", 22 pgs.
"U.S. Appl. No. 16/476,069, Response filed Oct. 25, 2022 to Final Office Action mailed Jul. 25, 2022", 13 pgs.
"U.S. Appl. No. 16/476,069, Examiner Interview Summary mailed U.S. Appl. No. 16/476,069, Examiner Interview Summary mailed Oct. 28, 2022", 2 pgs.
"European Application Serial No. 18735853.6, Response filed Oct. 18, 2022 to Communication Pursuant to Article 94(3) EPC mailed Jun. 10, 2022", 24 pgs.
"U.S. Appl. No. 17/809,223, Preliminary Amendment filed Nov. 3, 2022", 7 pgs.
"U.S. Appl. No. 16/476,016, Final Office Action mailed Nov. 15, 2022", 20 pgs.
"Australian Application Serial No. 2020357581, First Examination Report mailed Feb. 2, 2023", 2 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.
"International Application Serial No. PCT US2022 048981, International Search Report mailed Apr. 13, 2023", 6 pgs.
"International Application Serial No. PCT US2022 048981, Written Opinion mailed Apr. 13, 2023", 18 pgs.
"Canadian Application Serial No. 3153465, Response filed May 1, 2023 to Examiners Rule 86(2) Report mailed Jan. 13, 2023", 2 pgs.

"U.S. Appl. No. 18/140,491, Preliminary Amendment Filed May 3, 2023", 15 pgs.
"U.S. Appl. No. 17/410,852, Non Final Office Action mailed Aug. 1, 2023", 9 pgs.
"International Application Serial No. PCT US2023 020275, International Search Report mailed Jul. 26, 2023", 2 pgs.
"International Application Serial No. PCT US2023 020275, Written Opinion mailed Jul. 26, 2023", 12 pgs.
Luck, "A Case Study Concerning The Effects Of Controller Response And Turning Movements On Application Rate Uniformity With A Self-Propelled Sprayer", Biological Systems Engineering, University of Nebraska, [Online]. Retrieved from the Internet: https: elibrary.asabe.org abstract.asp?aid=36445, (Dec. 12, 2011), 10 pgs.
Madsen, Jesper, "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
"European Application Serial No. 20872967.3, Extended European Search Report mailed Sep. 29, 2023", 9 pgs.
"U.S. Appl. No. 17/465,644, Restriction Requirement mailed Oct. 13, 2023", 6 pgs.
"International Application Serial No. PCT US2021 026252, International Preliminary Report on Patentability mailed Oct. 19, 2023", 6 pgs.
"U.S. Appl. No. 17/410,852, Response filed Nov. 1, 2023 to Non Final Office Action mailed Aug. 1, 2023", 15 pgs.
"U.S. Appl. No. 17/410,852, Final Office Action mailed Nov. 14, 2023", 8 pgs.
"U.S. Appl. No. 17/465,644, Response filed Dec. 13, 2023 to Restriction Requirement mailed Oct. 13, 2023", 11 pgs.
"Brazilian Application Serial No. 1120160085175, Office Action mailed Dec. 4, 2023", w Machine English translation, 9 pgs.
"U.S. Appl. No. 17/410,852, Response filed Feb. 14, 2024 to Final Office Action mailed Nov. 14, 2023", 10 pgs.
"U.S. Appl. No. 17/410,852, Notice of Allowance mailed Feb. 28, 2024", 5 pgs.
"Brazilian Application Serial No. 1120160085175, Response filed Feb. 14, 2024 to Office Action mailed Dec. 4, 2023", w English claims, 15 pgs.
"U.S. Appl. No. 17/410,852, Corrected Notice of Allowability mailed Mar. 6, 2024", 2 pgs.
"U.S. Appl. No. 17/410,852, Corrected Notice of Allowability mailed Mar. 13, 2024", 2 pgs.
"U.S. Appl. No. 17/465,644, Notice of Allowance mailed Mar. 21, 2024", 12 pgs.
"International Application Serial No. PCT US2022 048981, International Preliminary Report on Patentability mailed May 16, 2024", 20 pgs.
"U.S. Appl. No. 18/669,983, Preliminary Amendment filed May 28, 2024", 3 pgs.
"U.S. Appl. No. 17/410,852, Corrected Notice of Allowability mailed May 31, 2024", 2 pgs.
"U.S. Appl. No. 18/669,983, Preliminary Amendment filed Jun. 4, 2024", 7 pgs.
"U.S. Appl. No. 17/465,644, Supplemental Notice of Allowability mailed Jun. 27, 2024", 2 pgs.
"Brazil Application Serial No. BR112022006486-1, Office Action mailed Jul. 13, 2024", w English translation, 9 pgs.
"International Application Serial No. PCT US2023 020275, International Preliminary Report on Patentability mailed Aug. 29, 2024", 10 pgs.
"U.S. Appl. No. 18/750,201, Preliminary Amendment filed Sep. 5, 2024", 12 pgs.
"Australian Application Serial No. 2023214344, First Examination Report mailed Sep. 9, 2024", 2 pgs.
"Australian Application Serial No. 2021439481, First Examination Report mailed Sep. 19, 2024", 3 pgs.
"Brazil Application Serial No. BR112022006486-1, Response filed Oct. 25, 2024 to Office Action mailed Jul. 13, 2024", w English Claims, 227 pgs.

(56) References Cited

OTHER PUBLICATIONS

"European Application Serial No. 22890829.9, Response to Communication pursuant to Rules 161(1) and 162 EPC filed Dec. 12, 24", 22 pgs.
"European Application Serial No. 21936210.0, Extended European Search Report mailed Dec. 18, 24", 11 pgs.
"Application Serial No. 18 669,983, Non Final Office Action mailed Jan. 10, 25", 12 pgs.
"Canadian Application Serial No. 3,214,361, Office Action mailed Jan. 28, 25", 6 pgs.
"Australian Application Serial No. 2022382950, First Examination Report mailed Mar. 14, 25", 3 pgs.
"Application Serial No. 18 052,758, Notice of Allowance mailed May 9, 25", 12 pgs.
"Application Serial No. 18 669,983, Response filed May 12, 25 to Non Final Office Action mailed Feb. 10, 25", 15 pgs.
"Application Serial No. 18 669,983, Examiner Interview Summary mailed May 13, 25", 2 pgs.
"Canadian Application Serial No. 3,214,361, Response filed May 23, 25 to Office Action mailed Jan. 28, 25", 94 pgs.
"Australian Application Serial No. 2023214344, Response filed Jun. 18, 25 to First Examination Report mailed Sep. 9, 24", 154 pgs.
"European Application Serial No. 21936210.0, Response filed Jul. 10, 25 to Extended European Search Report mailed Dec. 18, 24", 47 pgs.
"European Application Serial No. 23799847.1, Response to Communication Pursuant to Rules 161 and 162 EPC filed Jun. 5, 25", 22 pgs.
"U.S. Appl. No. 18/052,758, Corrected Notice of Allowability mailed Jun. 10, 25", 4 pgs.
"U.S. Appl. No. 18/140,491, Non Final Office Action mailed Jul. 28, 25", 44 pgs.
"U.S. Appl. No. 18/669,983, Notice of Allowance mailed Jun. 12, 25", 5 pgs.
"European Application Serial No. 22890829.9, Extended European Search Report mailed Sep. 2, 25", 12 pgs.
"U.S. Appl. No. 18/052,758, Corrected Notice of Allowability mailed Aug. 18, 25", 4 pgs.
"U.S. Appl. No. 18/052,758, Corrected Notice of Allowability mailed Sep. 16, 25", 4 pgs.

\* cited by examiner

VALVE CONTROL SYSTEM AND METHOD

CLAIM OF PRIORITY

This patent application is a continuation of U.S. patent application Ser. No. 17/224,955, entitled "VALVE CONTROL SYSTEM AND METHOD," filed Apr. 7, 2021, which claims the benefit of priority of Krosschell et al. U.S. patent application Ser. No. 17/001,539, entitled "VALVE CONTROL SYSTEM AND METHOD," filed Aug. 24, 2020, and PCT Patent Application No. PCT/US2020/047696, entitled "VALVE CONTROL SYSTEM AND METHOD," filed Aug. 24, 2020, which applications claim priority to U.S. Provisional Patent Application Ser. No. 62/911,045, entitled "VALVE CONTROL SYSTEM AND METHOD," filed on Oct. 4, 2019, which applications are hereby incorporated by reference herein in their entirety.

TECHNICAL FIELD

This document pertains generally, but not by way of limitation, to agricultural equipment.

BACKGROUND

An agricultural product (e.g., a fertilizer, carrier fluid, or the like) is optionally applied to a crop (e.g., one or more plants located in a farm field). In some examples, the agricultural product is applied with a sprayer system, for instance a sprayer mounted on a prime mover (e.g., a tractor, truck, all-terrain-vehicle, or the like). The sprayer system includes a valve, and the valve facilitates application of agricultural product to the crop (e.g., by spraying the agricultural product from a nozzle). In some examples, the valve is operated by a controller, for instance to translate the valve between an open position and a closed position. In the open position, the valve permits flow of the agricultural product through the valve. In the closed position, the valve does not permit flow of the agricultural product through the valve (e.g., between a valve inlet and a valve outlet). In some examples, the controller modulates the valve according to a duty cycle. The valve opens (or closes) in correspondence to the duty cycle of the modulation provided by the controller.

OVERVIEW

The present inventors have recognized, among other things, that a problem to be solved can include accurately applying an agricultural product to a crop. In an example, a valve controls the flow of a fluid through the valve. The valve is included in a sprayer system that applies the agricultural product to the crop (e.g., by spraying the agricultural product from a nozzle). In some examples, the valve is operated by a controller, for instance to translate the valve between an open position and a closed position. In the open position, the valve permits flow of the agricultural product through the valve. In the closed position, the valve does not permit flow of the agricultural product through the valve (e.g., between a valve inlet and a valve outlet).

In an example, the valve is operated for a specified duty cycle. The specified duty cycle optionally corresponds to a time duration between a first time interval when the controller modulates the valve (e.g., by generating a control signal) and a second time interval when the controller stops modulating the valve (e.g., by stopping the generation of the control signal). An actual duty cycle of the valve differs from the specified duty cycle for the valve. For instance, the mechanical response of the valve (e.g., to begin translating the valve toward the open position from the closed position) to the modulation provided by the controller does not perfectly correspond in time to when the controller intends for the valve to modulate. In an example, the actual duty cycle of the valve corresponds to a time duration between a third time interval when the valve actually begins transitioning between the open position and the closed position, and a fourth time interval when the valve actually completes the transition between the open position and the closed position. Accordingly, the specified duty cycle corresponds to a time duration that the controller modulates the valve (e.g., the time duration that the controller generates a control signal, or the like). The actual duty cycle of the valve corresponds to the time duration that the valve is in an open position (e.g., when a seal is disengaged from a valve seat to allow flow through the valve) in response to the modulation provided by the controller. The actual duty cycle varies from the specified duty cycle, for example due to mechanical tolerances of the valve, operating conditions (e.g., high pressure as opposed to low pressure), inertia of mechanical components of the system, signal processing delays or the like.

In some examples, the valve is operated to deliver a specified amount of agricultural product (e.g., a specified volume, specified flow rate, or the like) through the valve. In some approaches, an actual amount of agricultural fluid flowing through the valve differs from the specified amount because of differences between the specified duty cycle and the actual duty cycle of the valve. Accordingly, in some approaches the agricultural fluid is misapplied to the crop (e.g., too much agricultural product, too little agricultural product, or the like), and the misapplication affects one or more characteristics of the crop (e.g., growth, development, yield or the like).

The present subject matter can help provide a solution to this problem, such as by providing a system for applying agricultural product. The system includes a valve, and the valve optionally includes a solenoid having a coil configured to generate a magnetic flux. In some examples, the valve includes a moveable valve operator, and the valve operator translates with respect to the coil based on the generated magnetic flux. The valve operator optionally translates between a closed position and an open position according to a specified magnetic flux associated with a specified duty cycle, for instance the valve (ideally) opens with application of the magnetic flux and closes with arresting of the magnetic flux. In an example, the valve operator prevents flow through the valve in closed position, and the valve operator permits flow through the valve in the open position.

In an example, the system includes a dissipation element, such as a transient voltage suppression diode ("TVS"), having a dissipation characteristic (e.g., an amount of energy dissipated in proportion to a voltage across the dissipation element). In some examples, the dissipation element dissipates energy from the coil to arrest the magnetic flux and thereby initiate a rapid closing of the valve operator. For instance, a clamping voltage of a coil is increased and the energy in the coil (the increased voltage) is readily dissipated with the TVS. The dissipated energy corresponding initiates a rapid drop off in current and thereby decreases the magnetic flux that is based on current.

In some examples, the system includes a controller, and the controller receives measurements of one or more electrical characteristics of at least one of the coil or the dissipation element. The controller optionally determines an actual duty cycle of the valve operator using the measured electrical characteristics (e.g., through flux and electrical characteristics caused by movement of the operator relative to the coil). In an example, the controller determines a magnetic flux correction (e.g., for the coil, or the like) based on a difference between the actual duty cycle and the specified duty cycle of the valve operator. The controller optionally operates the valve operator according to the specified magnetic flux and the magnetic flux correction to guide the actual duty cycle of the valve operator toward the specified duty cycle of the valve operator.

Accordingly, the system for applying an agricultural product facilitates accurate and precise application of the agricultural product to a crop. For example, the controller guiding the actual duty cycle of the valve operator toward the specified duty cycle increases the accuracy (and precision) of an amount of agricultural fluid to the crop. For example, the system facilitates the application of a specified amount of agricultural product at a specified location (and/or at a specified time). Accordingly, agricultural product is accurately and precisely applied to the crop, for example to improve one or more crop characteristics (e.g., growth, development, yield or the like) and minimize waste of the agricultural product (e.g., waste due to misapplication).

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
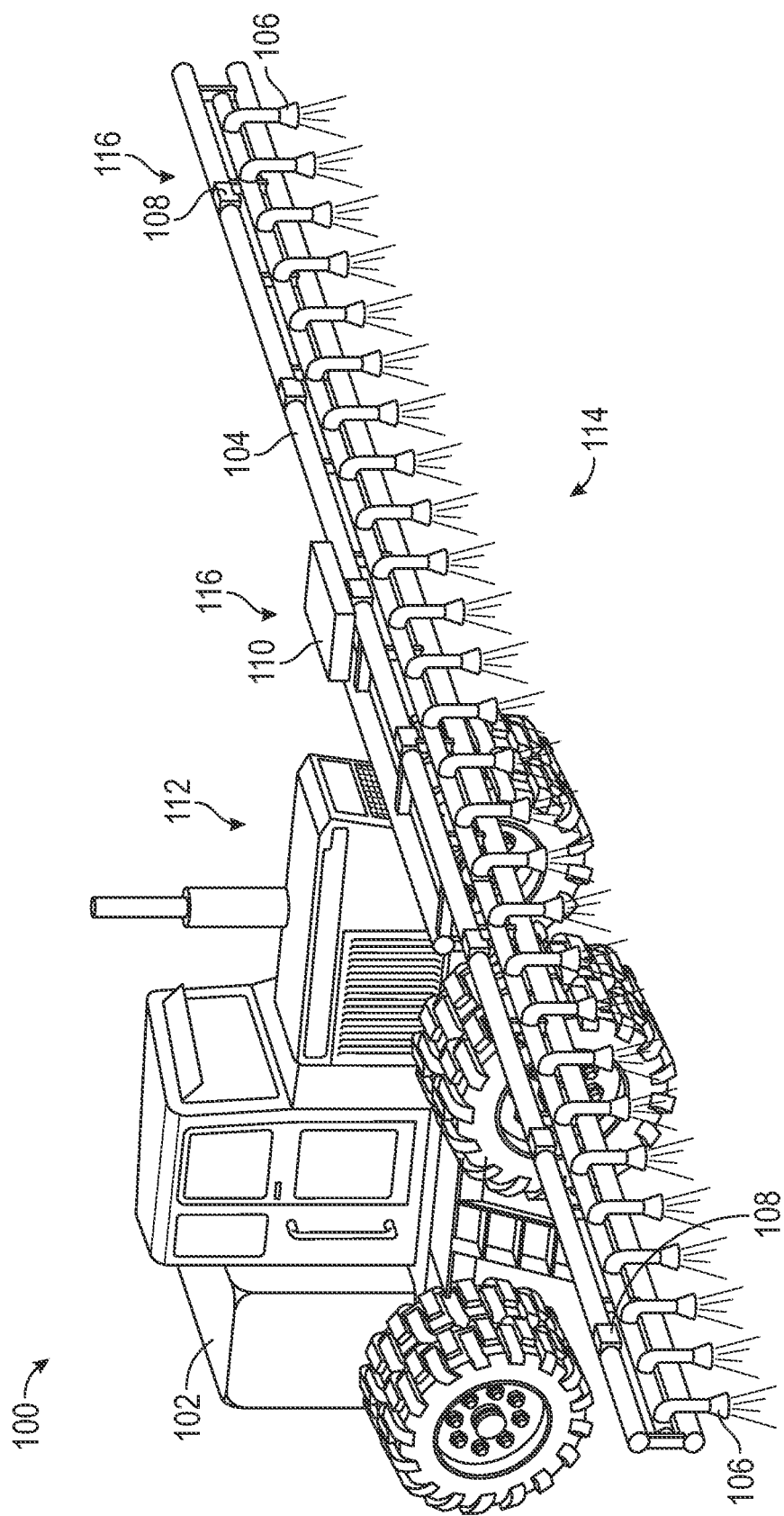
FIG. 1 illustrates a perspective view of an example of an agricultural sprayer.

FIG. 1 illustrates a perspective view of an example of an agricultural sprayer 100. In an example, the agricultural sprayer 100 includes a reservoir tank 102 and one or more sprayer booms 104. The sprayer booms 104 optionally include one or more nozzles 106. In some examples, the agricultural sprayer 100 includes one or more electronic control units (ECU) 108 (e.g., a microprocessor based system), and for instance a master node 110. (e.g., a microprocessor based system)

In an example, the reservoir tank 102 is integral with a prime mover 112 (e.g., a tractor, truck, combine, vehicle, or the like). In some examples, the reservoir tank 102 is a towed behind the prime mover 112 (e.g., the reservoir tank 102 is included with a trailer, or the like). The reservoir tank 102, in an example, includes an agricultural product mixed with a carrier fluid, such as water. In some examples, the carrier fluid and the agricultural product are mixed in-line prior to or at the sprayer boom 104. The nozzles 106 are positioned along the sprayer boom 104 to deliver the agricultural product (and the carrier fluid) to a crop (e.g., vegetables, fruit feed, or the like), for instance a crop located in an agricultural field 114. Crops include, but are not limited to, any product grown in an agricultural field, such as row and non-row based crops. Agricultural products include, but are not limited to, fertilizers, water, pesticides, fungicides, herbicides, or the like.

The agricultural sprayer 100 includes one or more controllers 116, for example the ECU 108 and the master node 110. In an example, the master node 110 operates in conjunction with the one or more ECU 108 to control delivery of the agricultural product from the reservoir tank 102, to the sprayer boom 104 and the associated nozzles 106 for delivery to the agricultural field or crop.

Figure 2:
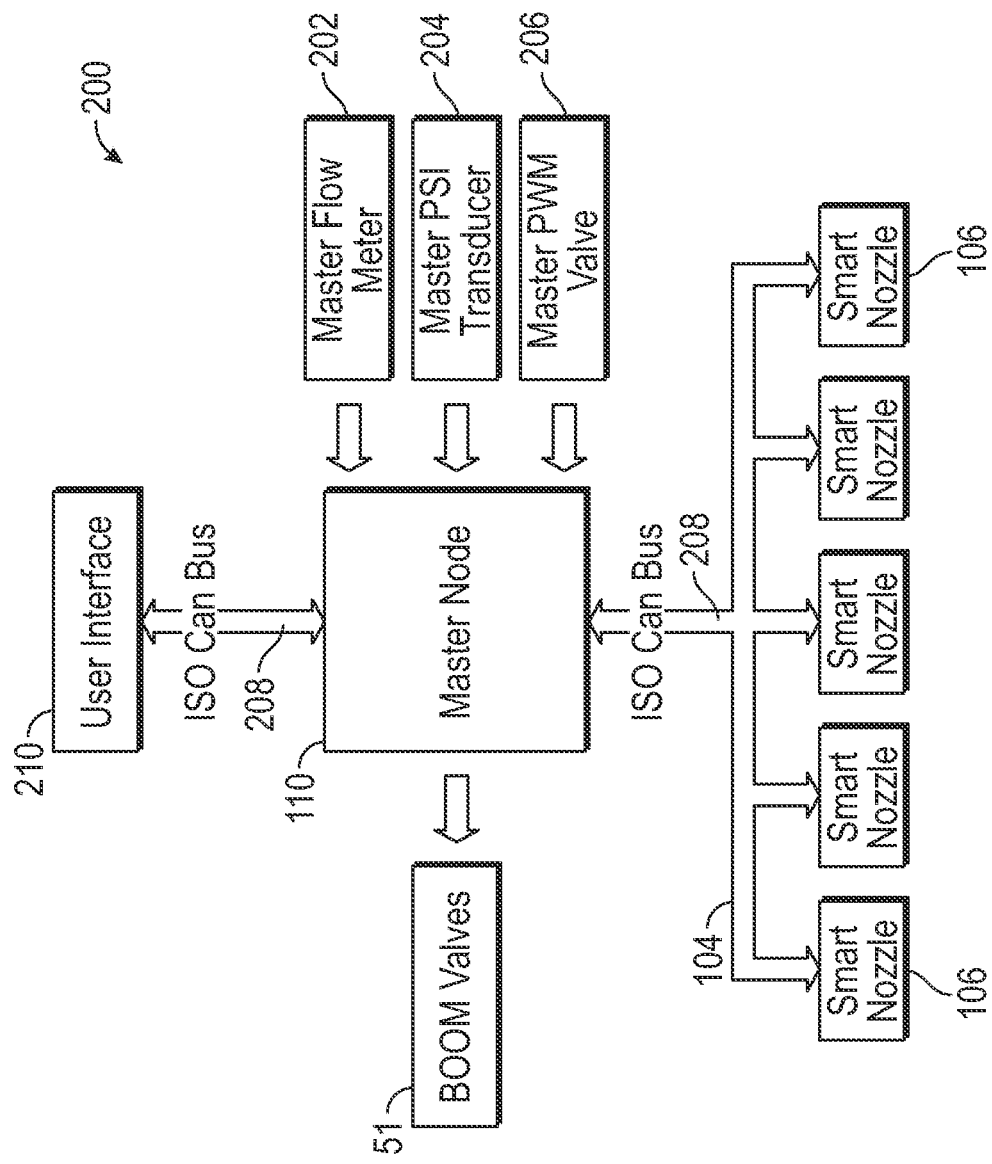
FIG. 2 illustrates a schematic of an exemplary nozzle control system.

FIG. 2 illustrates a schematic of an exemplary nozzle control system 200, wherein the one or more nozzles 106 located on the boom 104 control a respective nozzle flow rate of an agricultural product dispensed from the nozzle 106. As shown in FIG. 2, the master node 110 is communicatively coupled to one or more valves (e.g., the PWM valve 206) of the boom 104, such that system pressure within the boom 104 can be controlled by the master node 110. In some examples, the master node 110 of the current system is not configured to control the flow rate within the system 200, boom 104, or at the smart nozzles 106. Instead, the master node 110 controls the pressure within the system 200, boom 104, or at the smart nozzles 106, and the pressure control provides control of the flow rate (e.g., control to a lower pressure decreases flow while control to a higher pressure increases flow), The master node 110 is in communication with a master flowmeter 202, a master pressure transducer 204, and a master pulse width modulation (PWM) valve 206. The master node 110 controls the master PWM valve 206 to provide a targeted system pressure (through modulated operation of a system pump associated with the master PWM valve 206), such that a desired droplet size of the agricultural product is generated at the nozzles 106. For example, environmental conditions, such as wind, humidity, rain, temperature, field characteristics, or user preference determine whether a smaller or larger droplet size of the agricultural product is preferred. By controlling a targeted system pressure (e.g., maintaining, changing with variations in flow rate or the like), the preferred droplet size is maintained with the system 200.

Figure 3:
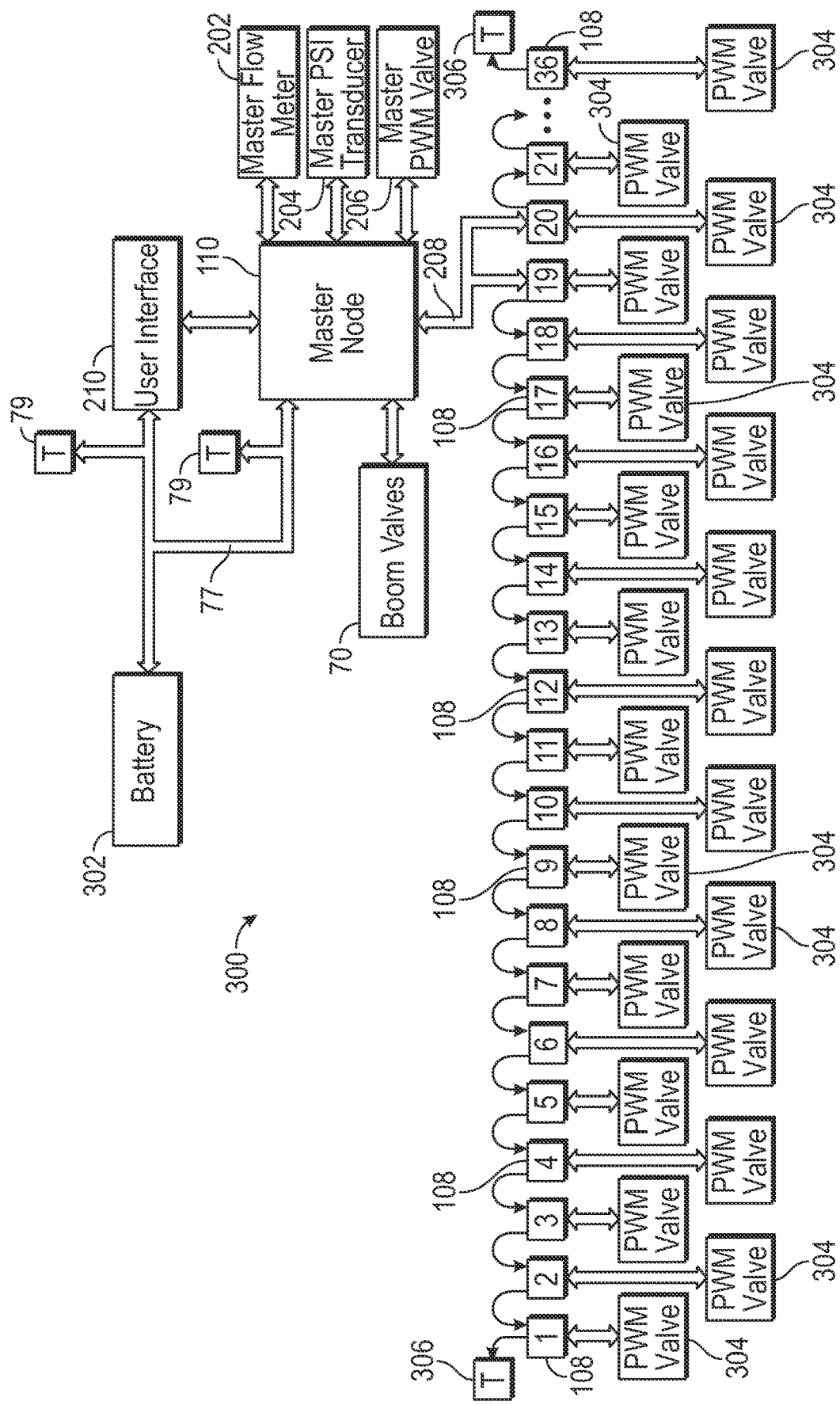
FIG. 3 illustrates a detailed schematic view of an exemplary nozzle control system.

In the exemplary embodiment, each of the nozzles 106 is a smart nozzle that includes an electronic control unit (ECU) (e.g., ECU 108, shown in FIG. 1 or the like) that regulates, determines, and/or controls the nozzle flow rate of the agricultural product dispensed from the nozzle 106, as discussed in reference to FIG. 3. In other embodiments, a group of the nozzles 106 are associated with a common ECU and is collectively considered a single smart nozzle. The smart nozzles 106 are connected to, for example, the boom 104 and communicatively coupled to a controller area network (e.g., nozzle CAN bus 208, wireless network or the like) of the overall control system 200. As discussed herein, the CAN bus 208 is configured to distribute overall system information from the master node 110 (e.g., master node). The ECU at each smart nozzle 106 uses data from the overall system information to regulate, determine, and/or control the nozzle flow rate of each corresponding smart nozzle 106.

The master node 110 controls one or more of a system pressure or system flow rate using, for example, the master pressure transducer 204 (or in other examples the flow meter, flow meter and pressure transducer together or the like) and the master pulse width modulation (PWM) valve 206. Although FIG. 2 illustrates a PWM valve as a master valve 206, embodiments are not so limited. For example, the master valve 206 includes any valve capable of controlling pressure or flow rate of a system, such as a ball valve, PWM valve, butterfly valve or the like. For instance, the master node 110 maintains the system pressure or flow rate at a target system value (e.g., a target system pressure or target system flow rate). In another example, each smart nozzle 106 controls the component flow rate to the constituent nozzles associated with each smart nozzle. In another example, the master node controls the system pressure or system flow rate to one or more target values and the smart nozzles 106 control the flow rate for each of the constituent nozzles (e.g., one or more) associated with each smart nozzle. Collectively, the smart nozzles 106 may control the overall agricultural product flow rate of the system.

In an example, the target system pressure is provided by a user, such as at the user interface 210 connected to the master node 110 by the nozzle CAN bus 208. In an additional example, the user also provides a target system flow rate (e.g., volume/area) at the user interface 210. In an example, the master node 110 provides one or more of the target system flow rate or the target system pressure to each of the one or more smart nozzles 106, such that each smart nozzle 106 (or each ECU, as discussed herein) determines an individual agricultural product flow rate (or pressure) for the smart nozzle 106. For example, the system target flow rate is divided by the number of nozzles 106 to provide a target agricultural product flow rate for each of the one or more nozzles 106. In an example, the master node 110 measures the flow rate (e.g., volume per time) with a master flow meter 202 and compares it with the overall target flow rate (e.g., designated by one or more of the user, crop type, soil characteristic, agricultural product type, historical data, or the like). The master node 110 is configured to determine a difference or error, if present, between the measured system flow rate and the target system flow rate. In such an example, the master node 110 provides the determined difference, by the nozzle CAN bus 208, to the individual nozzles 106 (or ECUs, as discussed herein). The one or more nozzles 106 receive the difference on the CAN bus 208 and adjust their pressure/flow/duty cycle curve using the difference (e.g., compensating for errors in the system) to reduce the error between the measured and target system flow rates (or reduce the error between the measured and target system pressures).

Additionally, in at least some examples, the master node 110 reports the actual pressure, measured by the master pressure transducer 204, as well as boom 104 information, including, but not limited to, one or more of yaw rate, speed, number of smart nozzles of the boom, distance between smart nozzles on the boom, to the smart nozzles 106 (or ECUs, as described herein) for individual flow rate control (or pressure control) of each of the smart nozzles 106. For example, the information provided from the master node 110 is used in addition to nozzle characteristics to control the individual flow rate control of each smart nozzle 106. Nozzle characteristics include, but are not limited to, one or more of nozzle position on a boom, length of the boom, nozzle spacing, target flow rate for the system (e.g., one or more of carrier fluid, injection product, agricultural product of the mixed carrier fluid and injection product, or the like), target pressure for the system (e.g., one or more of carrier fluid, injection product, agricultural product of the mixed carrier fluid and injection product, or the like), yaw rate of the boom, yaw rate of the agricultural sprayer, speed of the agricultural sprayer, one or more of the overall system pressure or flow rate (e.g., actual pressures or flow rates of the carrier fluid, injection product, mixed agricultural product or the like), agricultural product characteristics, valve performance such as a moveable valve operator transition time (including differences between specified and actual duty cycles), or the like.

The system 200 is configured for installation on an agricultural sprayer (e.g., the agricultural sprayer 100, shown in FIG. 1). In an example, the sprayer moves during operation (e.g., translates, rotates, accelerates or the like). The system optionally adjusts flow rates at one or more of the smart nozzles, concentrations of injection products delivered by the smart nozzles, or the like. Accordingly, the system provides a consistent application pattern of agricultural product to the crop. In another example, the one or more nozzle characteristics are dynamic and, and in some examples, the delivery of agricultural product by the nozzles is dynamic in correspondence with the nozzle characteristics. For instance, one or more of flow rates, pressures or the like through nozzles associated with a smart nozzle 106 dynamically change relative to other smart nozzles 106 of the system.

FIG. 3 illustrates a detailed schematic view of an exemplary nozzle control system 300. The control system 300 includes the master node 110 communicatively coupled to one or more valves of the boom 104, such that system pressure within the boom 104 can be controlled by the master node 110. Further, the master node 110 includes inputs from one or more of the master flowmeter 202, the master pressure transducer 204, and the master pulse width modulation (PWM) valve 206. Further, as described herein, the master node 110 is coupled to the user interface 210 and, in an example, a battery 302, so as to provide power to one or more of the master node 110 and user interface 210.

As shown in the embodiment of FIG. 3, a smart nozzle 106 optionally includes an ECU 108 coupled to a valve 304 (e.g., a PWM valve, ball valve, butterfly valve, or the like). That is, FIG. 3 illustrates 36 ECUs relating directly to 36 nozzles of the nozzle control system 300, but embodiments are not so limited. The master node 110 is communicatively coupled, by nozzle CAN bus 208 to ECU-18 and ECU-19, wherein ECU-18 108 and ECU-19 108 define a center region of the boom. From the center region of the boom, the ECUs 108 are communicatively coupled to the most proximate ECU 108 in the direction toward each terminal end 306 of the boom. That is, ECU-18 is communicatively couple to ECU-17, which is communicatively coupled to ECU-16, and so forth until the optional terminator after ECU-1 is reached. The same pattern holds for the other half of the boom. Although 36 ECUs 108 are illustrated, embodiments are not so limited.

Further, as shown in FIG. 3, each ECU 108 is coupled to one PWM valve 304, however, embodiments are not so limited. In another example, a single ECU 108 is communicatively coupled to more than one PWM valve 304. For instance, a single ECU 108 is communicatively coupled to more than one valve, such as every other valve, arrays of valves along portions of booms or the like. In an example, 12 ECUs split control of the 36 nozzles of the boom. In an example, a plurality of nozzles are partitioned into nozzle groups, such that each nozzle group includes an ECU 108 configured to control a nozzle group flow rate (or nozzle pressure that in turn controls flow) of the agricultural product dispensed from each nozzle of the nozzle group (by way of associated control valves) based on the nozzle characteristics, as described herein, of the respective nozzles. Thus, a smart nozzle includes, but is not limited to, a single nozzle, an associated valve and an associated ECU. In another example, a smart nozzle includes a group of nozzles (having associated valves) that are associated with a common ECU.

In still another example, the system 300 includes one or more location fiducials associated with the system 300, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 108 of the system is configured to control the agricultural product at individual rates according to the location of the one or more nozzles (or ECUs 108), the movement of the one or more nozzles relative to the field, another frame of reference or the like (and optionally in addition to the nozzle characteristics described herein). Further, each of the plurality of nozzles (or ECUs 108) is optionally cycled, such as on/off, according to the location of the nozzle (or location of a nozzle group or ECU 108) relative to a frame of reference, such as a field.

In an example, each nozzle ECU 108 is programmable to receive, track, or modify designated nozzle control factors (e.g., flow rate, the related specified duty cycle, the actual duty cycle, or the like). For example, each ECU 108 monitors one or more of nozzle spacing, target flow rate for the system or for the nozzle(s) controlled by the ECU, target pressure for the system, speed of the agricultural sprayer, yaw rate, nozzle location on the field, or the like. Such examples provide the benefit of comporting the system to user specifications, provide greater programmability of the system, and providing cost effective nozzle specific flow rate and pressure solutions (e.g., through modification of valve duty cycles). In yet another example, the ECUs 108 associated with each nozzle are instead consolidated into one or more centralized nodes that determine (e.g., monitor or calculate) one or more of actual flow rate, actual pressure or the like of each of the respective nozzles in a similar manner to the previously described ECUs 108 associated with each of the nozzles.

The controllers 116 (e.g., the ECU 108, the master node 110, or the like) control the nozzle flow rate (or the timing of flow through the nozzle) based on a number of parameters, including, but not limited to: speed of the sprayer or boom, yaw rate, target system flow rate (e.g. volume/area), target system pressure, and on/off command at runtime. Such parameters permit the controllers 116 to calibrate the duty cycle curve (e.g., by adjusting the actual duty cycle of a valve) of each smart nozzle needed to achieve one or more of the target nozzle flow rate, system target flow rate, system pressure, nozzle pressure, target nozzle timing of each of the smart nozzles. For instance, calibrating the duty cycle curve includes guiding an actual duty cycle of the nozzles (and their associated valves) to a specified duty cycle of the nozzles. The specified duty cycle corresponds to one or more of a target flow rate, target pressure (combination of both) or the like. Each smart nozzle is further configured according to nozzle spacing on the boom, location on the boom, and nozzle type. Further, in some examples, each smart nozzle regulates or controls the nozzle flow rate (or pressure) based on the location of the nozzle in the field (as described above).

As described herein, the agricultural sprayer 100 (shown in FIG. 1) includes a nozzle control system including a plurality of nozzles 106 having one or more associated valves 304 (e.g., such as a PWM solenoid valve as shown in FIG. 3, or the like) that regulate flow in order to provide a specified target application of an agricultural product from the nozzles 106. As a plurality of nozzles 106 are used across the boom 104 (shown in FIG. 1), achieving specified flow performance for each of the nozzles 106 enhances application precision and accuracy while minimizing application errors (e.g., misapplication, underapplication, overapplication, or the like). In some examples, one or more factors cause inconsistency in nozzle flow and droplet size (e.g., the size of droplets of agricultural product dispensed by the nozzle 106) of the sprayed agricultural product. Examples of these factors include, but are not limited to voltage drop of a solenoid drive voltage due to chassis wiring resistance, manufacturing tolerances of the mechanical elements in a valve itself (e.g., the valve 304, shown in FIG. 3), valve wear, valve contamination from the agricultural product, pressure variations across the boom or boom sections, variation due to an installed tip on the outlet of the nozzle, or open-stroke and close-stroke transition times for a moveable valve operator within the valve 304 controlling flow to the nozzle 106.

In an example, and as described in greater detail herein, a system for applying an agricultural product (e.g., the sprayer 100, or the like) realizes specified operational flow performance out of a smart nozzle 106 despite factors that negatively affect performance by determining variations between the specified performance and the actual performance and instituting a correction (or corrections) at valves to achieve the specified performance. For instance, the system controls a specified duty cycle of a valve versus an actual duty cycle of the valve 304 with a correction (discussed herein) that guides the actual duty cycle to coincide with the specified duty cycle. In some examples the system includes a solenoid valve drive circuit and a solenoid valve monitoring circuit. In another example, the system includes (or utilizes) an algorithm for tracking a position of a moveable valve operator (e.g., a poppet, or the like) of the valve 304 based on, for example, monitoring of back-emf (BEMF) generated in a solenoid coil by the moving valve operator as it transitions between its open and closed positions in the valve 304. In another example, monitoring (e.g., capturing, recording, observing, cataloging, compiling, collecting, or the like) of the performance of the valve 304 optionally provides insight into valve health or nozzle faults and, for instance alerts a system user to a specific problem (e.g., with the user interface 210, shown in FIG. 2).

Figure 4:
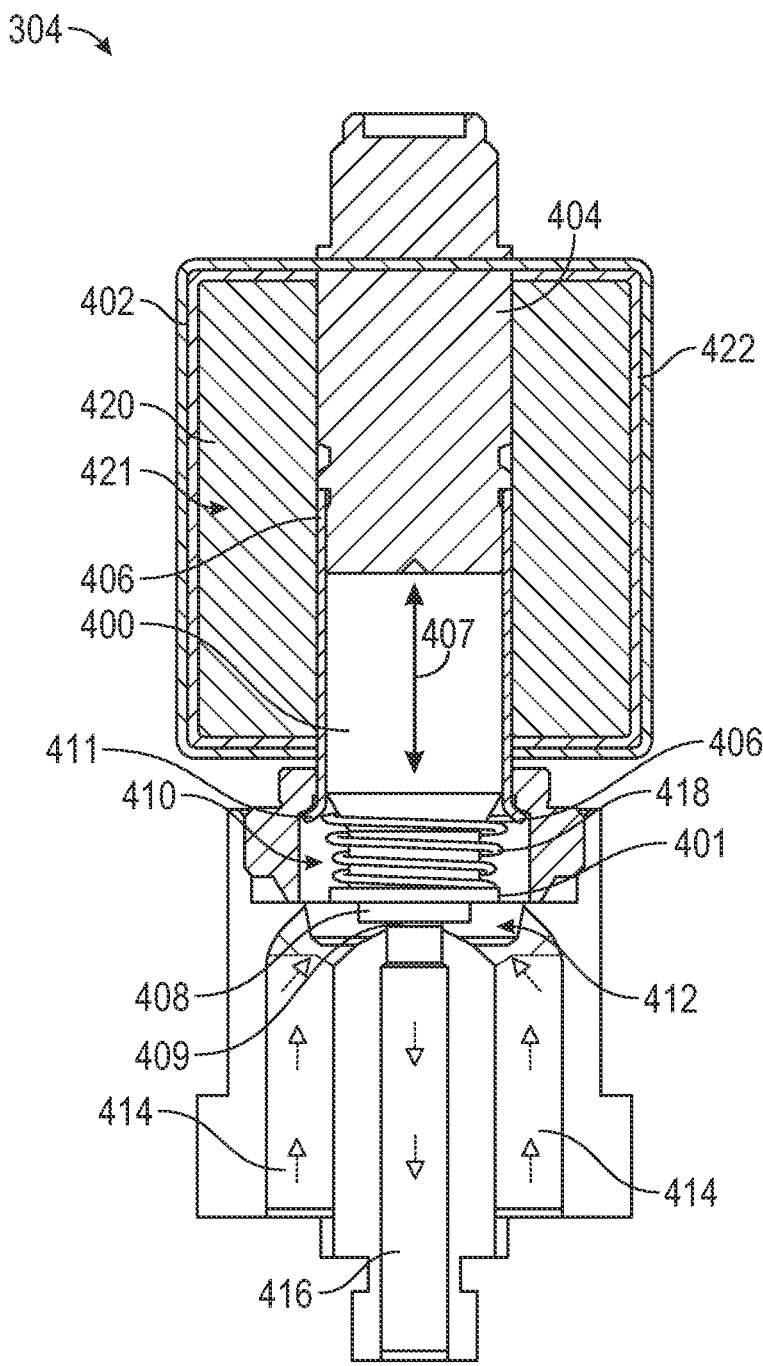
FIG. 4 illustrates an example of a valve, according to an embodiment of the present subject matter.
Figure 5:
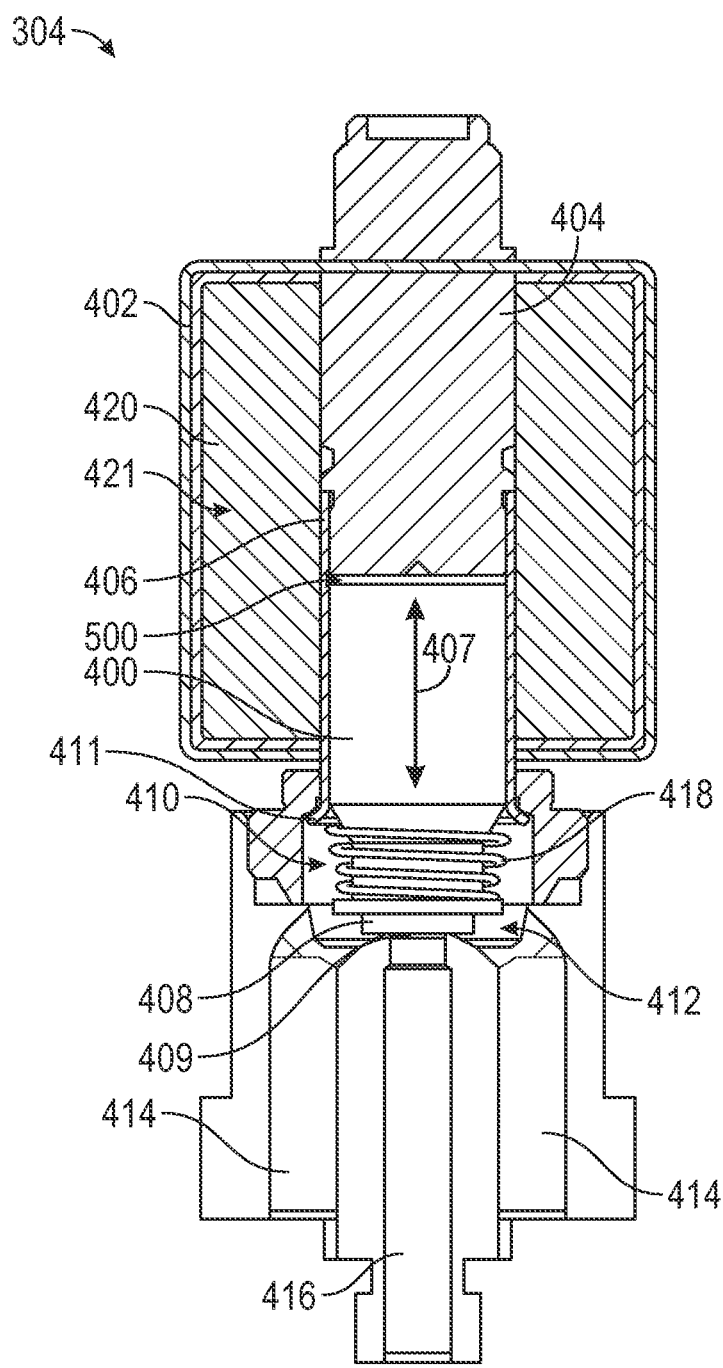
FIG. 5 illustrates an example of a valve, according to an embodiment of the present subject matter.

FIG. 4 and FIG. 5 illustrate sectional views of an example of the valve 304 in an open position and a closed position, respectively. The valve 304 is optionally a solenoid valve, for instance an electro-mechanical device that opens and closes an orifice by moving a moveable valve operator 400 (e.g., a poppet, gate, or the like) in a valve body 402 (e.g., a pressure vessel, frame, or the like). In an example, the valve body 402 of the valve 304 contains a lug 404 (e.g., a ferromagnetic material) and a housing 406 (e.g., a non-ferromagnetic material) that is connected to the lug 404. The valve operator 400 is movable in the housing 406, for instance with a range of motion 407 to open and close the valve. The valve operator 400 includes a seal 408 (e.g., a gasket, membrane or the like) coupled with a first end 410 of the valve operator 400. In an example, movement of the valve operator 400 within the housing 406 selectively opens and closes a channel 412 between a valve inlet 414 and a valve outlet 416. For example, the seal 408 engages with a valve seat 409 (shown in the closed configuration in FIG. 5) thereby inhibiting flow through the channel 412. In the open position, the seal 408 is disengaged from the seat 409 (as shown in FIG. 4) thereby allowing flow through the channel 412 (e.g., because the valve operator 400 is moved away from the seat 409). FIG. 4 includes arrows indicating flow within the valve inlet 414 and the valve outlet 416.

In an example, the valve 304 is biased toward the closed position, for instance with a biasing element 418, such as a coil spring, leaf spring, elastomer, magnet, or the like. The biasing element 418 optionally biases the valve operator 400 toward the closed position. In an example, the moveable valve operator 400 includes an operator flange 401 and the housing 406 includes a flare 411 The biasing element 418 (a spring in this example) is coupled between the operator flange 401 and the flare 411. In this example, the biasing element 418 provides a force between the housing 406 and the valve operator 400 to bias the valve operator 400 toward the closed position.

In some examples, the valve 304 operates by applying a voltage potential to a coil 420 (e.g., a winding of wire, or the like) that generates current in the coil 420. The coil 420 generates magnetic flux when current flows through the coil 420. In an example, the moveable valve operator 400 translates with respect to the coil 420 based on the magnetic flux generated by the coil 420. The current flowing through the coil 420 optionally magnetizes the lug 404 (and the valve operator 400) of the valve 304. For instance, the lug 404 is ferromagnetic, and a magnetic pole is established that attracts (e.g., draws, pulls, pushes, drives, or the like) the valve operator 400 toward the lug 404. Accordingly, the valve 304 optionally includes a solenoid 421, and the solenoid 421 includes (but is not limited to) the valve operator 400, the lug 404, and the coil 420.

The valve 304 optionally includes a magnetic flux frame 422 surrounding one or more of the lug 404 or the valve operator 400. The magnetic flux frame 422 encapsulates the magnetic field between the lug 404 and valve operator 400 and accordingly concentrates the magnetic field. For instance, the magnetic flux frame 422 enhances bounding of flux generated by the coil 420 to concentrate the magnetic field between the lug 404 and the valve operator 400.

Referring again to FIG. 4, as the amount of current flowing through the coil 420 increases, the magnetic field generated by the coil 420 increases as does the resulting force applied to the valve operator 400. For instance, an attractive force increases between the valve operator 400 and the lug 404. As the attractive force generated (e.g., induced, developed, provided, or the like) by the magnetized lug 404 overcomes forces such as fluid pressure within the housing 406, bias from the biasing element 418 or the like—the valve operator 400 begins moving from the closed position (FIG. 5) to the open position (FIG. 4). As described herein, the movement of the valve operator 400 is affected by one or more characteristics including the previously described fluid pressure, bias, or the like, and these characteristics alter the movement and accordingly vary an actual duty cycle of the valve 304 in comparison to a specified (e.g., desired) duty cycle.

A generated counter current (e.g., back electromotive force or back EMF) and corresponding magnetic field are examples of characteristics that alter the performance of the valve 304 relative to a specified duty cycle. For example, as the valve operator 400 moves toward the open position a counter current is generated in the coil 420 as the flux linkage changes because of a change of magnetically permeable material within the magnetic field (e.g., more of the valve operator having a higher magnetic permeability moves into the magnetic field and displaces fluid having a lower permeability). As the valve opens the flux linkage of the valve 304 changes due to the valve operator 400 occupying the previously fluid filled fluid gap 500. Conversely, when the valve operator 400 is in the closed position (FIG. 4) the fluid gap 500 is filled with the fluid having a lower magnetic permeability and the flux linkage again changes and generates counter current. The changes in flux linkage generate correspond counter currents (e.g., back EMF) that resist otherwise specified operation of the valve including opening and closing movements and thereby slow opening and slow closing as flux linkage changes and back EMF is generated.

The direction of the current generated in the coil 420 and its magnetic field caused by the moving valve operator 400 opposes the initial magnetic field of the coil 420 (e.g., the magnetic field generated by a current flowing through the coil 420). In an example, opposition of the initial magnetic field decreases the initial magnetic field generated by the coil 420 (e.g., according to Lenz's Law, or the like). Thus, in some examples, as the valve operator 400 moves nearer the coil 420 (or within the housing 406), the magnitude of current in the coil is reduced to oppose the originally created field caused by the current applied to the coil 420 (e.g., a ramping current, or the like).

Figure 6:
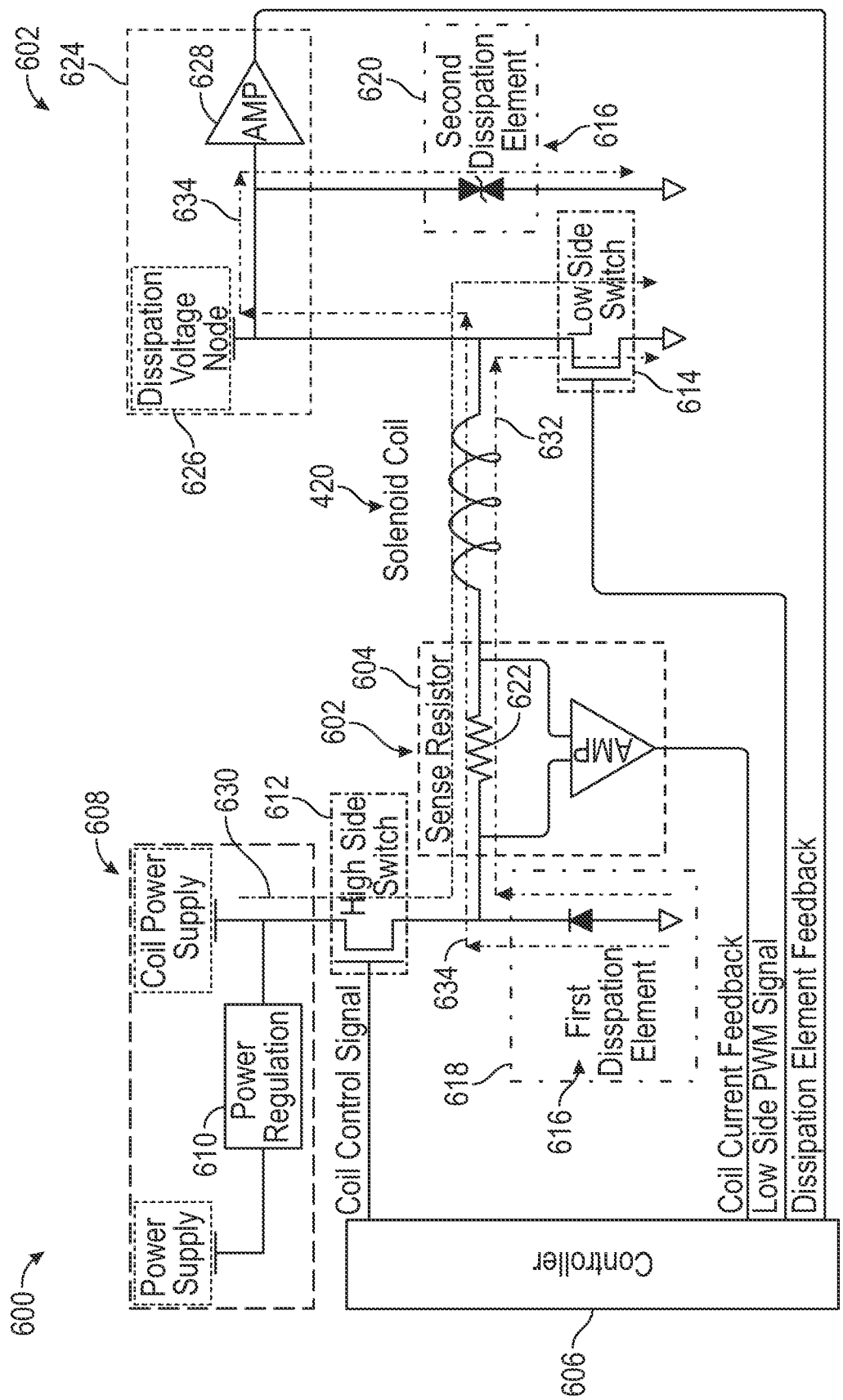
FIG. 6 illustrates an example of a system for applying an agricultural fluid including a controller, according to an embodiment of the present subject matter.

FIG. 6 illustrates a schematic diagram of a nozzle control system 600. The agricultural sprayer 100 (shown in FIG. 1) includes the nozzle control system 600. For instance, the nozzle control system 600 is used in combination with one or more components (or functions) of the nozzle control system 200 (shown in FIG. 2) or the nozzle control system 300 (shown in FIG. 3). In an example, the nozzle control system 600 includes the plurality of nozzles 106 (shown in FIG. 1) and one or more associated valves 304 (e.g., a PWM solenoid valve, or the like). The valves 304 (shown in FIG. 3) regulate flow to provide a specified target application rate of an agricultural product from the agricultural sprayer 100.

The nozzle control system 600 includes one or more sensors 602 that facilitate monitoring of one or more electrical characteristics (e.g., current, voltage, resistance, or the like) of components of the system 600. For example, the nozzle control system 600 includes a coil characteristic sensor 604, for instance included in series with the coil 420. In an example, the coil characteristic sensor 604 determines (e.g., measures, monitors, obtains, provides, evaluates, observes, or the like) the magnitude of current through the coil 420 (or voltage across the coil 420).

In an example, the system 600 includes a nozzle controller 606, and the nozzle controller 606 monitors the electrical characteristics of the system 600. For instance, the controller 606 is in communication with the sensors 602, and the controller 606 monitors the sensors 602. For example, the controller 606 monitors the magnitude of the current through the coil 420 (e.g., as determined by the characteristic sensor 604). In some examples, the controller 606 performs one or more mathematical operations upon the monitored electrical characteristics. For instance, the controller 606 monitors one or more rates of change of the current through the coil 420.

As discussed herein, movement of the valve operator 400 facilitates flow through the valve 304. In an example, movement of the valve operator 400 (e.g., with respect to the housing 406, shown in FIG. 4) generates a change in current through the coil 420. In some examples, the controller 606 monitors the change in current through the coil 420 by way of the sensor 604. Accordingly, in this example the controller 606 determines when the valve operator 400 actually moves (in contrast to when it should move based on a specified duty cycle) based on the monitoring of electrical characteristics with the sensor 604 (e.g., a decrease in current indicates movement of the valve operator 400). Thus, the control system 600 (e.g., the controller 606 and sensor 604) detects actual movement of the valve operator 400 including one or more of initial (e.g., beginning, starting, or the like) movement of the operator, full transition of the valve operator 400 (e.g., to open or closed positions) and movement therebetween.

The valve 304 is optionally closed (e.g., to inhibit flow in the channel 412 between the valve inlet 414 and the valve outlet 416) by dissipating the magnetic field between the lug 404 and the valve operator 400. For example, the magnetic field between the lug 404 and the valve operator 400 is dissipated and the biasing element 418 is thereby freed to overcome the attraction force between the valve operator 400 and the lug 404. The valve operator 400 is biased with the biasing element 418 toward the closed position. In an example, the current flowing through the coil 420 is reduced to dissipate the magnetic field generated by the coil 420. For example, the voltage potential applied to the coil 420 is removed from the coil 420. When the voltage potential is removed, the current flowing through the coil 420 will decrease and the magnetic field generated by the coil 420 will also begin to dissipate (e.g., decay, reduce, decrease, diminish or the like). When the magnetic field has sufficiently dissipated, the biasing element 418 will bias the valve operator 400 back towards the valve seat 409 and the closed position.

As the valve operator 400 begins to transition from the open position (shown in FIG. 4) toward the closed position (shown in FIG. 5), the amount of flux linkage in the magnetic circuit (e.g., between the lug 404 and the valve operator 400) decreases. For instance, fluid having a lower magnetic permeability fills the fluid gap 500 as the valve operator 400 (with a relatively higher magnetic permeability) moves out of the gap and toward the closed position. A counter current is generated in the coil 420 as the valve operator 400 begins to move, and the counter current opposes the change in flux linkage (e.g., according to Lenz's law, or the like). The direction of the current generated in the coil 420 by the transitioning valve operator 400 is such that the generated current generates a counter magnetic field opposed to the dissipating magnetic field in the coil 420. In an example, the generated current is monitored (e.g., by the controller 606 in communication with the one or more sensors 602) to determine when the valve operator 400 is transitioning from the open position to the closed position.

In an example, the valve control system 600 includes a power conditioning system 608. The power conditioning system 608 provides a drive voltage potential to operate the system 600 (including the valve 304 having the coil 420). In some examples, the coil 420 acts like an inductor, and the current flowing through the coil 420 does not change instantaneously. The rate of adding energy into the coil 420 is optionally increased, for example by increasing the drive voltage potential (e.g., a voltage applied across the coil 420 with the power conditioning system 608) to overcome the inductance of the coil 420.

In some examples, the open time for the valve 304 is improved by reducing the force of the biasing element 418 to make the biasing force easier to overcome. Increasing the rate that energy is dissipated from the coil 420 (and corresponding dissipation of the magnetic field) optionally reduces the close time of the valve 304 (e.g., a time duration for the valve operator 400 to transition from the open position to the closed position). Further, reducing the amount of energy to be dissipated from the valve 304 (e.g., the coil 420) optionally reduces the close time of the valve 304. An increase in the spring constant of the biasing element 418 aids in returning the valve operator 400 to the closed position (e.g., with the seal 408 engaged with the valve seat 409) though it may conversely increase the duration of valve open as the stiffer biasing element 418 opposes opening.

In some examples, the coil 420 has a defined resistance, and when a potential is applied across the coil 420, a first amount of energy will be dissipated by the coil 420 to build the magnetic field. A second amount of energy is dissipated due to the resistance of the coil 420 (e.g., as heat). Once the valve 304 transitions from the closed position to the open position, the amount of magnetic field needed to maintain the open position of the valve operator 400 is reduced because the initial additional force to separate the seal 408 from the seat 409 against the fluid pressure of the valve 304 is reduced (e.g., in comparison to when the valve operator is in the closed position). With the valve operator 400 in the open position, the fluid gap 500 (shown in FIG. 5) between the lug 404 and the valve operator 400 is removed (shown in FIG. 4). Since the field is optionally reduced, the amount of current running through the valve 304 is optionally reduced to maintain the valve 304 (e.g., the valve operator 400) in the open position, for example to save power (e.g., hitting and holding the valve operator 400 in the open position). In an example, a full voltage potential is applied to the coil 420 until the valve operator 400 transitions to the open position from the closed position. Once the valve 304 has opened, a reduced voltage potential (or current), or a modulated current (shown in FIG. 7 as the rapid saw tooth portion of the current plot), is applied to the coil 420 to facilitate maintaining the valve operator 400 in the open position while reducing the power consumption due to the wiring resistance in the coil 420.

In an example, the system 600 includes a coil drive voltage regulator 610, for instance to facilitate operating the power conditioning system 608 at a fixed, or nearly fixed voltage. The controller 606 optionally modulates one or more of a high side switch 612 and a low side switch 614, for instance to provide energy to the coil 420. The high side switch 612 and the low side switch 614 are optionally located on either side of the coil 420. For example, the high side switch 612 is included in the system 600 on a first side of the coil 420. In an example, the low side switch 614 is included in the system 600 on a second side of the coil 420. In an example, current flows through the coil 420 (and energizes the coil 420) when the switches 612, 614 are closed. In some examples, one or more of the switches 612, 614 are normally open, and modulation of the switch closes a circuit and allows current to flow through the switches 612, 614. For instance, the switches 612, 614 are normally open to facilitate conservation of power in the system 600 (e.g., by selectively supplying power to the system 600 as needed).

In some examples, the system 600 includes one or more dissipation elements 616, for instance a first dissipation element 618 and a second dissipation element 620. The dissipation elements 616 include (but are not limited to) a flyback diode, freewheeling diode, clamp diode, transient voltage suppression diode, resistor, capacitor, or the like. In an example, the first dissipation element 618 includes a freewheeling diode, and the dissipation element 618 facilitates recirculation of current through the coil 420 to facilitate the maintenance of the magnetic field with less energy. The dissipation element 616 optionally have a dissipation characteristic and dissipate energy within the system 600, for instance from the coil 420. In some examples, the dissipation element 616 helps recirculate energy within the system 600 (e.g., by recirculating current through the freewheel path 632, or the like). For example, the dissipation element 618 facilitates recirculation of current through the coil 420 (with corresponding maintenance of the magnetic field) when the high side switch 612 is open (e.g., to inhibit current flow through the switch 612) and the low side switch 614 is closed (e.g., to allow recirculating current to flow between the switch 614 and the dissipation element 616 with the intervening circuit having the coil 420 and ground).

The second dissipation element 620, for example, facilitates deenergizing of the coil 420. For instance, the dissipation element 620 includes a clamping diode, and the dissipation element 620 quickly dissipates recirculating energy in the system 600 (e.g., removes, reduces, diminishes, dumps, minimizes or the like) from the coil 420 (or the system 600) when both switches 612, 614 are opened. Accordingly, current flowing through the coil 420 is forced to divert to a flyback path (e.g., the flyback path 634, or the like) for dissipation across the dissipation element 620 (e.g., a clamping diode).

As described herein, the controller 606 monitors the sensors 602. For instance, the controller 606 determines when the valve operator 400 moves based on the monitoring of electrical characteristics with the sensor 604 (e.g., a decrease in current corresponding to movement of the valve operator 400 with respect to the housing 406). The system 600 optionally includes a sense resistor 622. For instance, the sense resistor 622 facilitates monitoring of electrical characteristics of the system 600 (e.g., current through the coil 420), for example with the controller 606.

In an example, the controller 606 monitors the sensors 602 to correspondingly monitor the mechanical response of the valve operator 400 (e.g., movement of the valve operator 400 between the closed position and the open position). Monitoring of the mechanical response of the valve operator 400 facilitates determining the actual duty cycle of the valve 304.

In some examples, the coil characteristic sensor 604 includes the sense resistor 622. For example, the sense resistor 622 facilitates determining electrical characteristics of the coil 420. Monitoring of the electrical characteristics of the coil 420 facilitates monitoring of movement of the valve operator 400, for instance to determine when the valve operator 400 begins to transition from the closed position to the open position. In an example, the sense resistor 622 (in cooperation with the controller 606) facilitates determining when the valve operator 400 has fully transitioned to the open position (from the closed position). In some examples, the sense resistor 622 is located in series with the coil 420. In an example, the sense resistor 622 is located in the system 600 between the coil 420 and the switch 612. The sense resistor 622 is optionally located in series with the power conditioning system 608 and the coil 420. Thus, the coil characteristic sensor 604 determines electrical characteristics of the coil 420 and facilitates monitoring of the electrical characteristic of the coil 420 with the controller 606. Accordingly, monitoring of the electrical characteristics of the coil 420 facilitates determining when the valve operator 400 actually moves (e.g., because the mechanical response of the valve 304 differs from the electrical signals operating the valve 304).

In an example, the sensors 602 include a dissipation characteristic sensor 624. For instance, the dissipation characteristic sensor 624 determines one or more electrical characteristics of the dissipation elements 616. For example, the dissipation characteristic sensor 624 determines a voltage across the second dissipation element 620, for instance by determining a voltage at a dissipation voltage node 626 between the coil 420 and the second dissipation element 620.

In an example, the dissipation characteristic sensor 624 facilitates monitoring of movement of the valve operator 400. For instance, the controller 606 optionally monitors the dissipation characteristic sensor 624 to monitor the mechanical response of the valve operator 400 (e.g., movement of the valve operator 400 between the open position and the closed position). The controller 606 monitors the sensor 624 to determine when the valve operator 400 begins to transition from the open position to the closed position. In another example, the sense resistor 622 (in cooperation with the controller 606) facilitates determining when the valve operator 400 has fully transitioned to the closed position (from the open position).

The system 600 optionally includes one or more signal processors 628. For instance, the signal processors 628 provide signal conditioning, amplification, or the like for components of the system 600. In an example, the signal processors 628 facilitate monitoring of electrical characteristics by the controller 606. For example, the signal processors 628 condition electrical characteristics of the system 600 for monitoring by the controller 606. For instance, the signal processors 628 allow the controller 606 to monitor the voltage at the dissipation voltage node 626. The signal processors 628 allow the controller 606 to monitor current flowing through the coil 420, for example by monitoring the voltage across the sense resistor 622.

Figure 7:
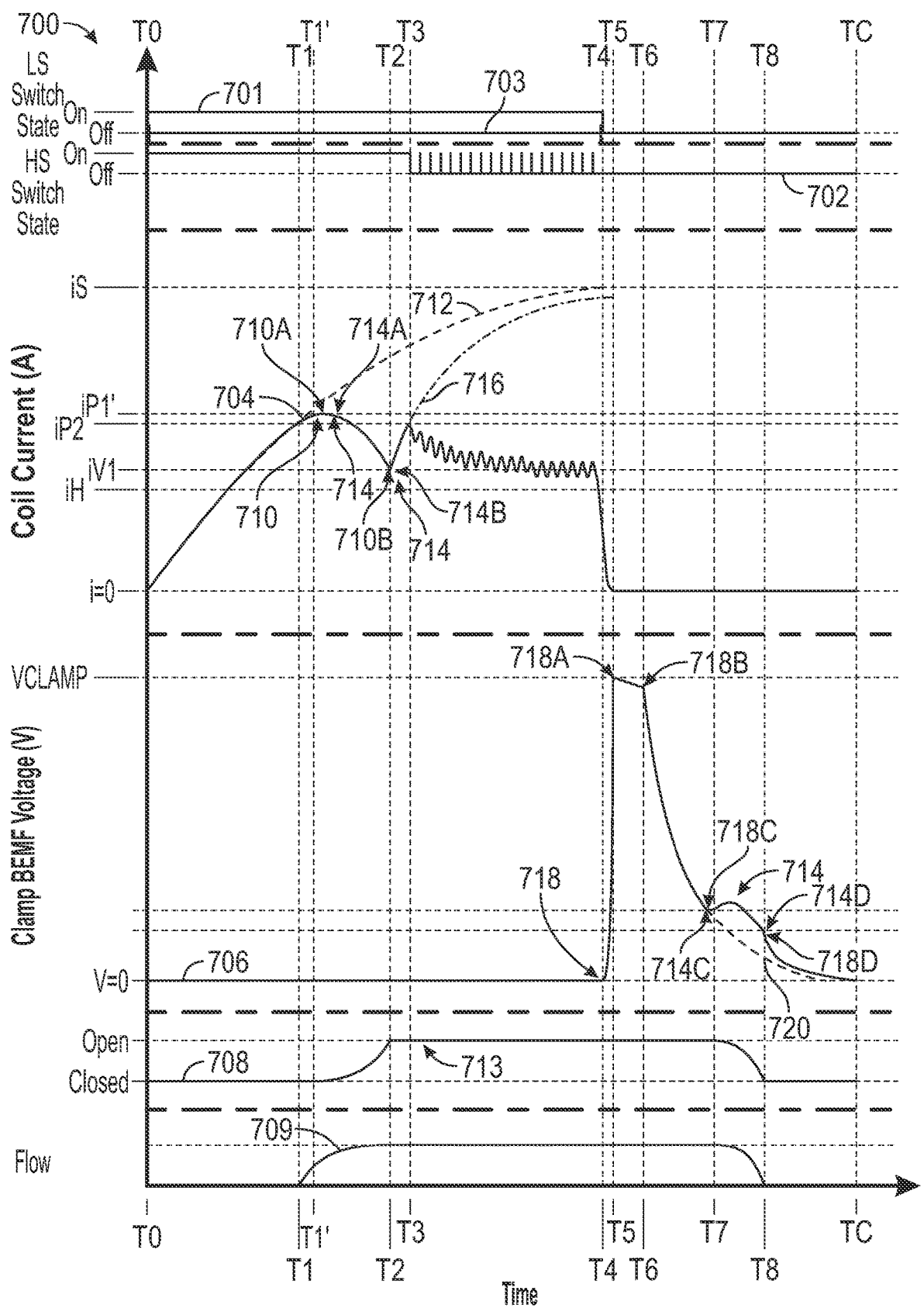
FIG. 7 illustrates a representation of one or more drive signals used to apply a specified duty cycle to a valve and the resultant waveform shapes that are monitored by the controller, according to an embodiment of the present subject matter.

FIG. 7 illustrates a representation of one or more drive signals used to apply a specified duty cycle to a valve (e.g., the valve 304, shown in FIG. 3) and the resultant waveforms (e.g., one or more electrical characteristics, valve operator positions, specified and actual duty cycles, or the like) that are monitored (or determined) by the controller 606 in combination with the sensors described herein. FIG. 7 shows one iteration (sequence) of an example specified duty cycle, the resulting actual duty cycle and the monitored or sensed characteristics described herein.

FIG. 6 shows arrows indicating flow of current through the system 600 in the various configurations described herein (e.g., during energizing of the coil 420, maintenance of the energized coil, and dissipation of energy from the coil 420). The system 600 shown in FIG. 6 includes an energizing path 630 (dot-dash stippled lines) that energies the coil 420 to generate the magnetic field (e.g., to open the valve). In an example, current flows through the energizing path 630 when the high side switch 612 and the low side switch 614 are closed. In another example, the system 600 includes the freewheel path 632 (dot-dash-dash stippled lines) that allows current to recirculate through the coil 420 (e.g., to maintain the magnetic field and hold the valve operator 400 in the open position). For instance, current flows in the freewheel path 632 including ground and the coil 420 when the high side switch 612 is open and the low side switch 614 is closed. In yet another example, the system 600 includes a flyback path 634 (dot-dot-dash stippled lines) that dissipates energy from the coil 420. In an example, current flows through the flyback path 634 when the high side switch 612 and the low side switch 614 are open. Accordingly, the system 600 operates the switches 612, 614 to direct current flow through one or more of the energizing path 630, the freewheel path 632, or the flyback path 634 to accomplish energizing of the coil 420 and generation of the magnetic field, maintenance of the magnetic field or dissipation of energy (and the magnetic field), respectively.

FIG. 7 shows time intervals T0, T1, T1', T2, T3, T4, T5, T6, T7, T8, and TC along a common X-axis for each of differing plots that follow characteristics of the nozzle control system 600 during operation. The Y axes of the respective plots are graduated by corresponding characteristics including, but not limited to, voltage, current, open or closed states (and intermediate positions) or the like. In an example, the high side switch 612 and the low side switch 614 (shown in in the upper most plots of FIG. 6) are modulated between on off states. The first (upper most) plot of FIG. 7 shows a low side switch state 700 and the second plot shows a high side switch state 702. For instance, the high side switch state 702 is in the on state at T0, and the low side switch state 700 is in the off state at T4. In some examples, a specified duty cycle 701 of the valve corresponds to the low side switch state 700 having a corresponding specified time length 703, in this example of T0 to T4 of one full cycle (e.g., for a complete cycle including on and off of time T0 to TC). In other examples, the specified duty cycle 701 is represented as a percentage (e.g., 30, 40, 50, 60 percent or so on) of one full cycle (time T0 to TC).

The controller 606 (in cooperation with the sensor 604, shown in FIG. 6) monitors a coil electrical characteristic 704 (e.g., current) of the coil 420 as shown in the third plot of FIG. 7. In another example, the controller 606 (in cooperation with the sensor 624, shown in FIG. 6) monitors a dissipation element electrical characteristic 706 (e.g., one or more of voltage, current, or the like) of the dissipation element 620 shown in the fourth plot of FIG. 7. Additionally, FIG. 7 shows a fifth plot of a valve operator position 708 indicating the position of the valve operator 400 within the valve 304 with the bottom of the curve corresponding to the closed position and the peak of the curve corresponding to the open position. In an example, the actual duty cycle of the valve corresponds to the valve operator position 708.

Further, flow 709 agricultural product or the like through the valve of the valve system 600 is shown in the sixth plot (lower most) in FIG. 7 and varies between a value of 0 (e.g., no flow) and 1 (e.g., 100 percent flow indicating the valve is open and steady state flow is provided). As discussed herein, movement of the valve operator 400 permits (or inhibits) flow 709 through the valve.

As shown in FIG. 7 with the specified duty cycle 701 corresponding to the low side switch state 700 and the actual duty cycle 713 corresponding to the valve operator position 708 the valve operator movement (opening and closing) lags in comparison to the specified duty cycle 701. For instance, the actual duty cycle 713 is clearly positioned behind (time-wise) the specified duty cycle 701. This variation or lag between the actual and specified duty cycles 713, 701 causes errant application of agricultural product (e.g., quantity of product applied, location of application, or the like) relative to the specified duty cycle 701.

In one example, at time T0, the valve operator 400 is a closed position as shown with the valve operator position plot 708. At time T0 both of the high side switch 612 and low side switch 614 (shown in FIG. 6) are closed, a circuit is completed, and current begins to flow through the current sense resistor 622 and the coil 420 (shown in FIG. 6). The coil 420 initially behaves as an inductor (resisting the increased current), and the coil electrical characteristic 704 (e.g., current) does not change instantaneously, but instead increases over time from T0 onward. For example, the coil electrical characteristic 704 increases with time as shown in FIG. 7 after closure of the low side switch state 700 at T0. The resulting magnetic field generated from the coil 420 builds as current increases. The building magnetic field applies a corresponding increasing force to the moveable valve operator 400. As the magnetic field builds in the coil 420 and the lug 404 the force produced by the field overcomes the combination of forces holding the valve operator 400 in the closed position (e.g., pressure holding the valve 304 closed, the bias force holding the valve closed, and any other forces on the valve operator 400 holding it closed position such as gravity) and the operator 400 begins moving toward the open position.

The plotted coil electrical characteristic 704 shows a plurality of inflection points 710. As previously described, as the valve operator 400 begins to move (e.g., from closed to open) at approximately T1 a counter current is generated, and the counter current is graphically shown in FIG. 7 with a first inflection point 710A at T1 along the coil characteristic 704 plot. In another example, the valve operator 400 is cracked from the closed position and overcomes the pressure differential between the upstream and downstream sides of the operator 400—thereby decreasing the current for moving the operator. In contrast, if there were no movement of the valve operator 400, the current would follow the upward trending path indicated by the first dashed line 712. In some examples, monitoring of this electrical characteristic is utilized to diagnose a service issue with the valve 304, such as the absence of a valve operator 400 (e.g., after servicing). If the valve operator 400 is missing from the valve 304 (e.g., errantly not replace after service) the electrical characteristic 704 will behave in a manner consistent with first dashed line 712 and thereby facilitate diagnosis of a missing operator 400.

The fifth plot of FIG. 7 shows the valve operator position 708, and the valve operator position 708 corresponds to a position of the valve operator 400 within the valve 304 with the bottom of the curve corresponding to the closed position and the peak of the curve corresponding to the open position. In an example, FIG. 7 shows the valve operator 400 beginning to translate at time T1 (e.g., a translation start time, corresponding to when the measured current signature starts to depart from the dashed line 712). In an example, Faraday's law indicates that movement of the valve operator 400 generates a field in the coil 420. Lenz's law indicates that the current generated by the valve operator 400 must oppose the direction of the building magnetic field caused by the driver of the coil 420 (e.g., the characteristic 704, current, provided with the power conditioning system 608, or the like). Accordingly, in an example, a change (e.g., decrease with respect to time) in the coil electrical characteristic 704 (the third plot), current, indicates one or more valve operator translation signatures 714, specifically indicating when the valve operator 400 begins opening movement (from closed) toward the lug 404 of the valve 304.

In some examples, the controller 606 (shown in FIG. 6) compares the monitored electrical characteristics of the system 600 to the one or more valve operator translation signatures 714 (shown in the third plot and the fourth plot of FIG. 7). For instance, a first valve operator translation signature 714A corresponds to at least one inflection point 710 of the coil electric characteristic 704 for example at T1'. In an example, the inflection points 710 include one or more of a change in magnitude of a derivative of the characteristic 704, such as an increase in the rate that the slope is decreasing; a change in sign of the slope of the characteristic 704; a change in sign of the derivative of characteristic 704; peaks and valleys; or the like. The controller 606 monitors the coil electric characteristic 704 (the third plot) and indexes at least a component of movement of the valve operator 400 (shown in the fifth plot) based on features of one or more of the coil electrical characteristic 704 or the dissipation element characteristic 706 (the fourth plot). The controller 606 compares the indexed the electrical characteristics to the valve operator translation signature 714, for example by locating one or more of the inflection points in one or more of the coil electric characteristic 704 or the dissipation element characteristic 706.

Referring to FIG. 7, as the valve operator 400 moves (indicated with the valve operator position 708), the inductance of the coil 420 begins to change as more of the volume inside the solenoid 421 is converted from fluid with a low magnetic permeability to include the valve operator 400 material with a relatively higher magnetic permeability. When the valve operator 400 reaches the top of the valve 304 (fully open, shown in FIG. 4) and shown at T2 in the fifth plot of FIG. 7 the valve operator 400 stops moving and no longer generates a counter current in the coil 420. As shown with the coil electric characteristic 704 (third plot), the current ceases decreasing at a second inflection point 710B and begins to rise again. The current in the coil 420 continues to build as it did before due to the potential through the coil 420 (applied by the power conditioning system 608) without the counter current provided by the previously moving valve operator 400. Accordingly, the second inflection point 710B corresponds to a second valve operator translation signature 714B indicating the valve operator 400 is fully open. Thus, the controller 606 monitors the coil electric characteristic 704 and determines that the valve operator 400 has fully moved to the open position based on the valve operator translation signature 714B at time T2.

At time T2, the valve operator 400 is at the open position, and at time T3 the controller 606 optionally reduces the current and associated magnetic field in the solenoid 421 for instance to save energy. For instance, the controller 606 maintains the current at a lower level recognized to retain (e.g., maintain) the valve operator 400 in the open position. In an example, the current is modulated as shown with the sawtooth wave at T3 (e.g., with selective opening and closing of the high side switch 612 while the low side switch 614 is closed). For example, the electrical resistance in the coil 420 and loss in one or more of the dissipation elements 616 and switches 612, 614 causes the coil electrical characteristic 704 to decay. In order to maintain the field generated by the coil 420, the high side switch 612 is modulated to add energy to the solenoid 421 (e.g., the coil 420, or the like) as needed to maintain the valve operator 400 open while minimizing power usage.

The modulated current maintains the magnetic field in the solenoid 421 with a slight imbalance (e.g., relative to gravity, fluid pressure, bias from the bias element or the like) to ensure retention of the valve operator 400 in the open position. In an approach, the inductance of the coil 420 is higher and the coil electrical characteristic 704 would follow the path indicated by a second dotted line 716 in the coil electrical characteristic 704 until it had saturated near a maximum value (e.g., approaches a limit, or the like) if the high side switch 612 was maintained in the on state.

Modulating (e.g., selectively opening and closing) the high side switch 612 circulates current in the system 600 at a level to generate a magnetic flux between the lug 404 and the valve operator 400 so as to maintain the position of the valve operator 400 (e.g., in the open position). Accordingly, the system 600 modulates the switch 612 to provide a force imbalance incident upon the valve operator 400 and ensure retention of the valve operator 400 in the open position while reducing the power needed to maintain the position of the valve operator 400.

In some examples, the high side switch 612 is modulated between the on state and the off state (e.g., by selectively closing and opening the switch 612) while maintaining the low side switch 614 in the on (e.g., closed) state. Modulating the high side switch 612 while the low side switch 614 is in the on state causes current to flow through the freewheel path 632 that, in some examples, includes the low side switch 614, the first dissipation element 618, the sense resistor 622, and the coil 420 (shown in FIG. 6). Accordingly, modulating the high side switch 614 reduces the power usage for the system 600 to maintain the position of the valve operator 400 (e.g., in the open position). Thus, the performance of the system 600 is enhanced because of the reduced power consumption to maintain the position of the valve operator 400. In some examples, modulating the high side switch 612 between closed and open (with the low side switch 614 closed) ensures retention of the valve operator 400 in the open position is referred to as a hit-and-hold algorithm.

In an example, during a rising edge of the low side switch control, a hit state is initiated in the high side switch 612 and the controller 606 starts recording electrical characteristics, for example by monitoring the current flowing through the coil 420. The controller 606 analyzes the current data collected to determine if the valve operator 400 has translated between the open position and the closed position. In some examples, the controller 606 waits for a specified delay and repeats the analysis if a translation is not detected.

In an example, when the controller 606 determines the valve operator 400 has translated, the controller 606 optionally stops monitoring the electrical characteristics of the coil 420 and maintains the position of the valve operator 400 (e.g., by modulating the switch 612, or the like). Optionally, the controller 606 waits for a specified duration for a compare event in the low side switch 614 timer. When a compare event occurs, the low side switch 614 and the high side switches 612 are turned to an off state. Accordingly, current is forced to recirculate in the flyback path 634 to be dissipated across the second dissipation element 620 (e.g., a clamping diode, or the like). At this point, the controller 606 monitors the dissipation characteristic 706 (e.g., a flyback voltage, or the like). At the end of a wait period (e.g., either 10 ms or the until the next update event), the controller 606 analyzes the dissipation characteristic for transition signature 714.

The valve operator 400 is optionally moved to the closed position, for instance at time T4. In an example, both the high side switch 612 and the low side switch 614 are transitioned to the off state (e.g., to inhibit current flow through the switches 612, 614). With the switches 612, 614 in the off state, current is inhibited from flowing through the freewheel path 632. Accordingly, the current recirculating in the coil 420 flows through the flyback path 634 (see FIG. 6), optionally including the dissipation element 620 (e.g., a clamping diode), and begins to dissipate to free the valve operator 400 to move to the closed position.

FIG. 7 shows the monitored dissipation element electrical characteristic 706 (e.g., one or more of voltage, current, or the like) of the dissipation element 620 in the fourth plot. In an example, the dissipation element electrical characteristic 706 ("dissipation characteristic 706") includes a monitored voltage at the dissipation voltage node 626 (shown in FIG. 6). Since the dissipation characteristic 706 is greater than the voltage potential across the coil 420 with the switches 612, 614 in the off state, the energy of the magnetic field is quickly collapsed into a high electrical potential at the dissipation voltage node 626. Conversely, as the voltage across the coil 420 rapidly rises the coil characteristic 704 (e.g., current) shown in the fourth plot flowing through the coil 420 quickly collapses to 0, for instance as shown by time T5 proximate to time T4. As previously discussed, current generates the magnetic field that retains the valve operator 400 in the open position, and the rapid decrease of current (and corresponding magnetic field) accordingly permits the movement of the operator toward the closed position.

In between T5 and T6, the dissipation characteristic (voltage) 706 is saturated, current decreases as shown in the third plot, and the magnetic field generated by the coil 420 decreases quickly. As the field decreases, the corresponding force retaining the open position of valve operator 400 against the fixed lug 404 dissipates—and the force provided by the biasing element 418 (shown in FIG. 4) overcomes the retaining force and closing movement of the valve operator 400 is initiated. In some examples, the dissipation characteristic 706 includes one or more voltage inflection points 718. For instance, a first voltage inflection point 718A (shown at T5) correlates to the time when the current is directed to the second dissipation element 620 (and the voltage at the node 626 rises). In an example, a second voltage inflection point 718B (shown at T6) corresponds to when the dissipation element 620 is no longer saturated. FIG. 7 shows the valve operator position 708 (fifth plot) begins movement from the open position to the closed position at approximately T7 (e.g., a translation start time) corresponding to a third voltage inflection point 718C. Closing movement finishes at approximately T8 (e.g., a translation stop time) corresponding to a fourth voltage inflection point 718D. In an example, as the valve operator 400 moves away from the collapsing magnetic field, the valve operator 400 induces a current in the coil 420, and accordingly provides a corresponding change in the otherwise dissipating voltage of characteristic 706 having a third valve operator translation signature 714C. For example, the valve operator translation signature 714C includes a change (e.g., an increase with respect to time, or the like) in the dissipation element electrical characteristic 706, voltage in the example shown. In an example, the third voltage inflection point 718C corresponds to movement of the valve operator 400 (e.g., translation signature 714C). Completion of movement corresponds to, for instance, the fourth inflection point 718D and a fourth translation signature 714D when the valve operator 400 comes to a rest (and the valve 304 is closed).

In one example, Lenz's law indicates that the current generated by the valve operator 400 transitioning to the closed position opposes the change in the characteristic 706 as a result of the collapsing magnetic field. Thus, in an example, instead of seeing the voltage decay of the coil 420 (e.g., an inductor, or the like) that is discharging (represented by a third dotted line 720), the dissipation characteristic 706 will rise and then fall relative to the previous decay until the valve operator 400 has completed its movement (e.g., translation, transition, stroke, displacement, change, shift, or the like) from the open position (e.g., at T7) to the closed position (e.g., at T8). In an example where the field generated by the solenoid 421 is insufficient to maintain the valve operator 400 in the open position, the valve operator 400 will transition to the closed position prior to turning off the switches 612, 614. At time T8, the valve operator 400 has fully completed movement to the closed position, and any remainder of the field generated by the coil 420 decays based on the lower inductance in the coil 420 since the fluid gap 500 has been reintroduced. In some examples, the valve 304 remains in this de-energized state until time TC which is the duration of a cycle.

Accordingly, the time duration between T1 (e.g., when the valve operator 400 begins moving toward the open position) and T8 (e.g., when the valve operator 400 moves to the closed position and the flow 709 through the valve 304 stops) corresponds to an actual duty cycle 713 of the valve 304. For example, the actual duty cycle 713 of the valve 304 corresponds to the time between actual opening of the valve operator 400 with beginning of translation to the open position at T1 (in contrast to the preceding operation of the switches 612, 614 at TO) and a translation stop time of the valve operator 400 at T8 (when the valve operator 400 is in the closed position). As shown in FIG. 7, the actual duty cycle 713 is different than the specified duty cycle 701 corresponding to the low side switch state 700. For instance, the actual duty cycle 713 lags behind the specified duty cycle 701 and its timing and corresponding characteristics such as length of time open or closed, initiation of movement, corresponding flow or the like varies relative to the specified duty cycle 701.

As discussed herein, the system 600 guides the actual duty cycle 713 of the valve 304 to comport with the specified duty cycle 701. For example, the specified duty cycle 701 corresponds to the portion of the low side switch state 700 (e.g., from T0 to T4). The actual duty cycle 713 corresponds to the valve operator position 708 shown in the fifth plot of FIG. 7 and determined from the coil electrical characteristic 704 (e.g., current) in the third plot indicating the actual opening of the valve and the dissipation element electrical characteristic 706 (e.g., voltage) in the fourth plot indicating the actual closing of the valve. For instance, the actual duty cycle 713 corresponds to the valve operator 400 in the open position (e.g., from T1 to T8). The system 600 determines one or more errors (e.g., a difference, delta, or the like) between the specified duty cycle 701 and the actual duty cycle 713. In an example, a portion of the error in the actual duty cycle 713 relative to the specified duty cycle 701 is generated from differences in opening and closing movement of the valve operator 400 between the specified and actual cycles (e.g., lagging of opening and closing movement, variation in duty cycle length relative to the specified or the like).

The system 600 applies a correction, for example a magnetic flux correction, to the specified duty cycle 701 to guide the actual duty cycle 713 of the valve 304 toward the specified duty cycle. In an example, the correction applied to the specified duty cycle corresponds to the error determined between the actual duty cycle and the specified duty cycle. As one representative example, opening of the valve in the actual duty cycle 713 is delayed by 0.005 seconds (5 milliseconds or 5 ms) relative to the specified duty cycle 701. The system modulates the switches 612, 614 to advance the timing of the specified duty cycle by 5 ms to guide the actual duty cycle 713 of the valve 304 to the specified duty cycle 701 (e.g., with a modified specified duty cycle). Thus, the system 600 adjusts (e.g., corrects, modulates or the like) the magnetic flux generated by the coil 420 to achieve actual operation of the valve operator 400 (opening, closing, and timing of the same) according to the specified duty cycle. Accordingly, the system 600 minimizes error between the specified duty cycle 701 and the actual duty cycle 713 to improve the performance of the valve 304 (e.g., to open or close the valve operator 400 at a desired point in time, permit flow through the valve 304 for a specified period of time or the like).

Figure 8:
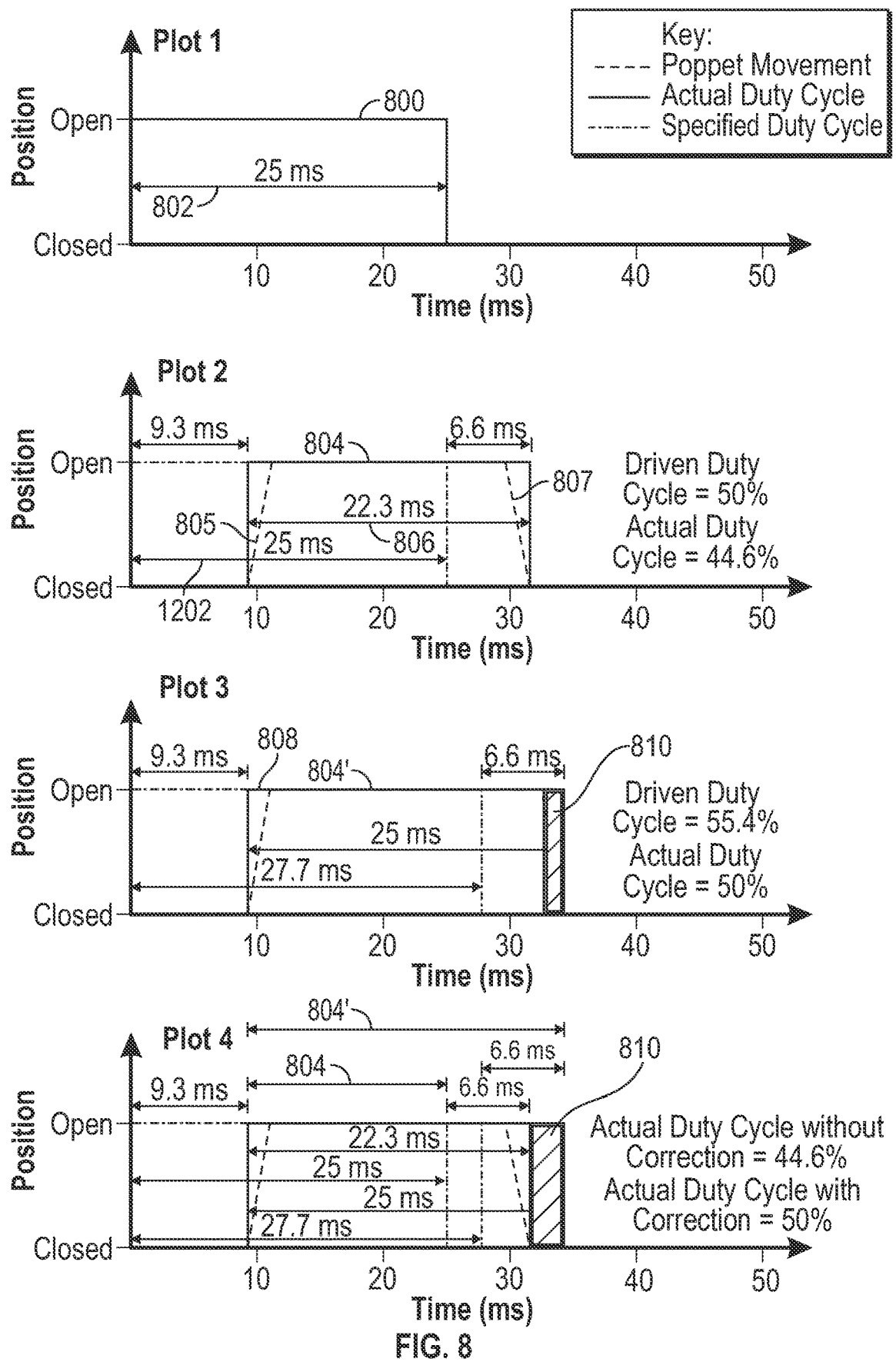
FIG. 8 illustrates an example diagram of duty cycle guidance.
Figure 11:
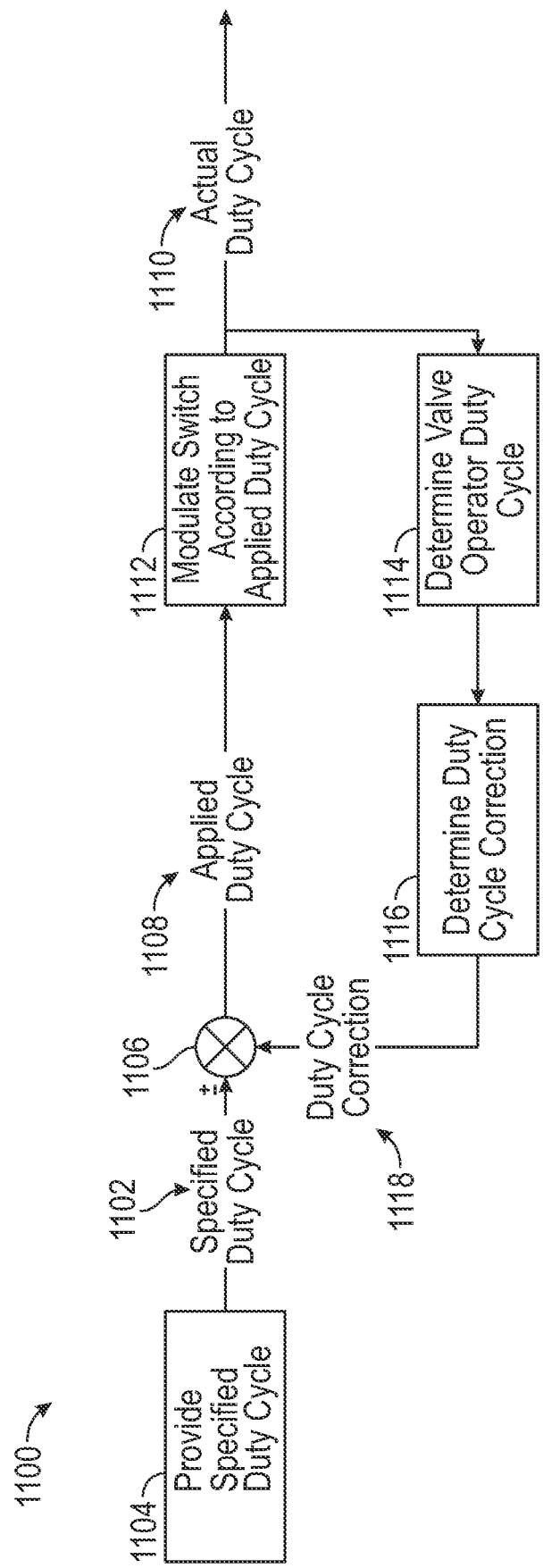
FIG. 11 illustrates an algorithm for compensating for variability using a moveable valve operator position or a magnetic flux correction, according to an embodiment of the present subject matter.
Figure 12:
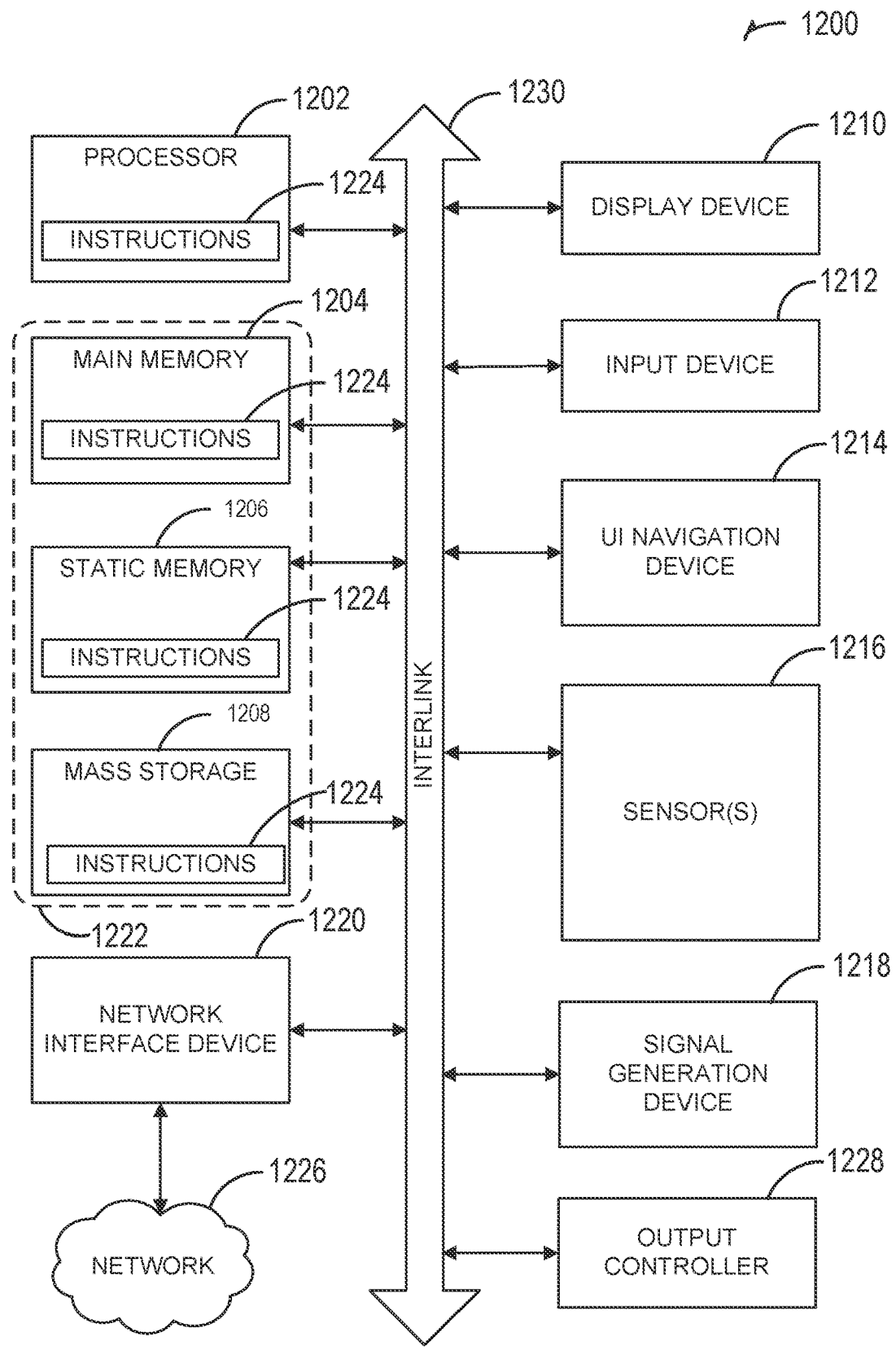
FIG. 12 FIG. 12 illustrates a block diagram of an example machine upon which any one or more of the techniques discussed herein may perform, according to an embodiment of the present subject matter.

FIG. 8 illustrates a diagram of duty cycle guidance, for instance to minimize error between the specified duty cycle 701 and the actual duty cycle 713 shown in FIG. 7. In some examples, the duty cycle guidance discussed herein is referred to as an algorithm 801. The controller 606 generates a magnetic flux correction for an example specified duty cycle 800 (FIG. 8 with an associated specified on period 802), an actual duty cycle 804 (with an associated actual on period 806) shown in the second plot and an actual duty cycle 804' (e.g., an updated actual duty cycle 804 or valve performance) that is based on the specified duty cycle 800 and a magnetic flux correction (collectively an applied duty cycle 808) is shown in the third plot of FIG. 8. An example feedback control loop 1100 for generating the applied duty cycle 808 is shown in FIG. 11.

Referring first to FIG. 8, the specified duty cycle 800 in the first plot is shown with an associated specified on period 802 of 25 milliseconds ("ms") and conversely an off period of 25 ms for a total cycle time of 50 ms. The specified duty cycle 800 is specified in some examples as a percentage, and in this example corresponds to a 50 percent duty cycle; the on period 802 is 50 percent of the full cycle of 50 ms.

The actual duty cycle 804 (e.g., mechanical performance of the valve 304) is shown in the second plot of FIG. 8. As previously described, the movement of the valve operator 400 is detected, in one example as shown in FIG. 6, to determine the actual duty cycle 713 in FIG. 7 and the example actual duty cycle 804 in FIG. 8. In the example shown in FIG. 8, the actual duty cycle 804 extending between on and off transitions 805, 807 of the valve operator is 22.3 ms. The error between the length of the actual duty cycle 804 and the specified duty cycle 800 is 2.7 ms. In another example, the actual duty cycle 804 is a 44.6 percent duty cycle relative to the specified duty cycle of 50 percent shown in the upper plot of FIG. 8 (e.g., a negative 5.4 percent error).

The system 600 including for example the feedback control loop 1100 (of FIG. 11) uses this error (e.g., 2.7 ms or 5.4 percent) to determine and apply a magnetic flux correction 810 (referred to as the duty cycle correction in FIG. 11) that modifies the signal for the specified duty cycle 800 to the applied duty cycle 808 to guide the mechanical performance of the valve 304 toward the specified duty cycle 800 (see the third plot in FIG. 8) having performance (e.g., on time percentage, on duration or the like) corresponding to the original specified duty cycle 800. The fourth plot in FIG. 8 shows the third plot overlaid with the second plot, thereby showing differences between the third plot (e.g., the actual duty cycle 804') and the second plot (e.g., the actual duty cycle 804).

The magnetic flux correction 810 increases or decreases the flux in the valve 304 to accordingly trigger a change in one or more of valve opening or valve closing (e.g., opens, closes earlier, later, one earlier one later, combinations of the same or the like) relative to the previous actual duty cycle 804. The applied duty cycle 808 (based on the specified duty cycle 800 with the magnetic flux correction 810), when implemented with the system 600, provides the actual duty cycle 804' shown in the third plot having a duration, percentage or the like), in this example 25 ms, relative to the actual duty cycle 804 length of 22.3 ms. The time length of the actual duty cycle 804', 25 ms, corresponds to the specified time length of 25 ms of the specified duty cycle 800. The actual duty cycle 804' is the actual valve performance of the valve 304 driven with the specified duty cycle 800 and the magnetic flux correction 810, and the actual duty cycle 804' has a duration of 25 ms that matches the duration of the original specified duty cycle 800 shown in the upper plot of FIG. 8. In other examples, if the actual duty cycle 804 is longer than the specified duty cycle 800, the system 600 implements a magnetic flux correction 810 (e.g., a change in magnetic flux that shortens the on performance of the valve) as part of the applied duty cycle 808 to generate the actual duty cycle 804' that matches the shorter specified duty cycle 800.

FIG. 8 shows the fourth plot, which includes the second plot overlaid with the third plot. The monitoring of the actual performance of a valve and its associated valve operator to determine an actual duty cycle based on detected valve operator movement (e.g., opening and closing of the valve operator) differences between the actual duty cycle 804 and the specified duty cycle 800 are readily determined and corrected with system 600 described herein including implementation of the magnetic flux correction 810. The system 600 drives the valve with an applied duty cycle 808 (the specified duty cycle including the magnetic flux correction 810) that causes the valve to mechanically behave with an actual duty cycle 804' that matches the specified duty cycle 800. In other examples, the system 600 and the example feedback control loop 1100 operate in an ongoing manner and accordingly modulate the specified duty cycle 800 with the magnetic flux correction 810 (collectively the applied duty cycle 808) to vary operation of the valve 304. For instance, as an agricultural vehicle (e.g., a sprayer or the like) changes velocity, turns, increases or decreases flow rates in different zones of a field or the like, the system 600 continues to monitor actual valve performance (opening and closing of one or more valves) to determine an actual duty cycle, compare the actual duty cycle with a specified duty cycle, and adjust the performance of the valve with an applied duty cycle based on the specified duty cycle modified with the magnetic flux correction 810 to achieve actual performance (e.g., sprayer output, flow rate, a resulting actual duty cycle or the like corresponding to the actual duty cycle 804') that matches a specified duty cycle.

Figure 9:
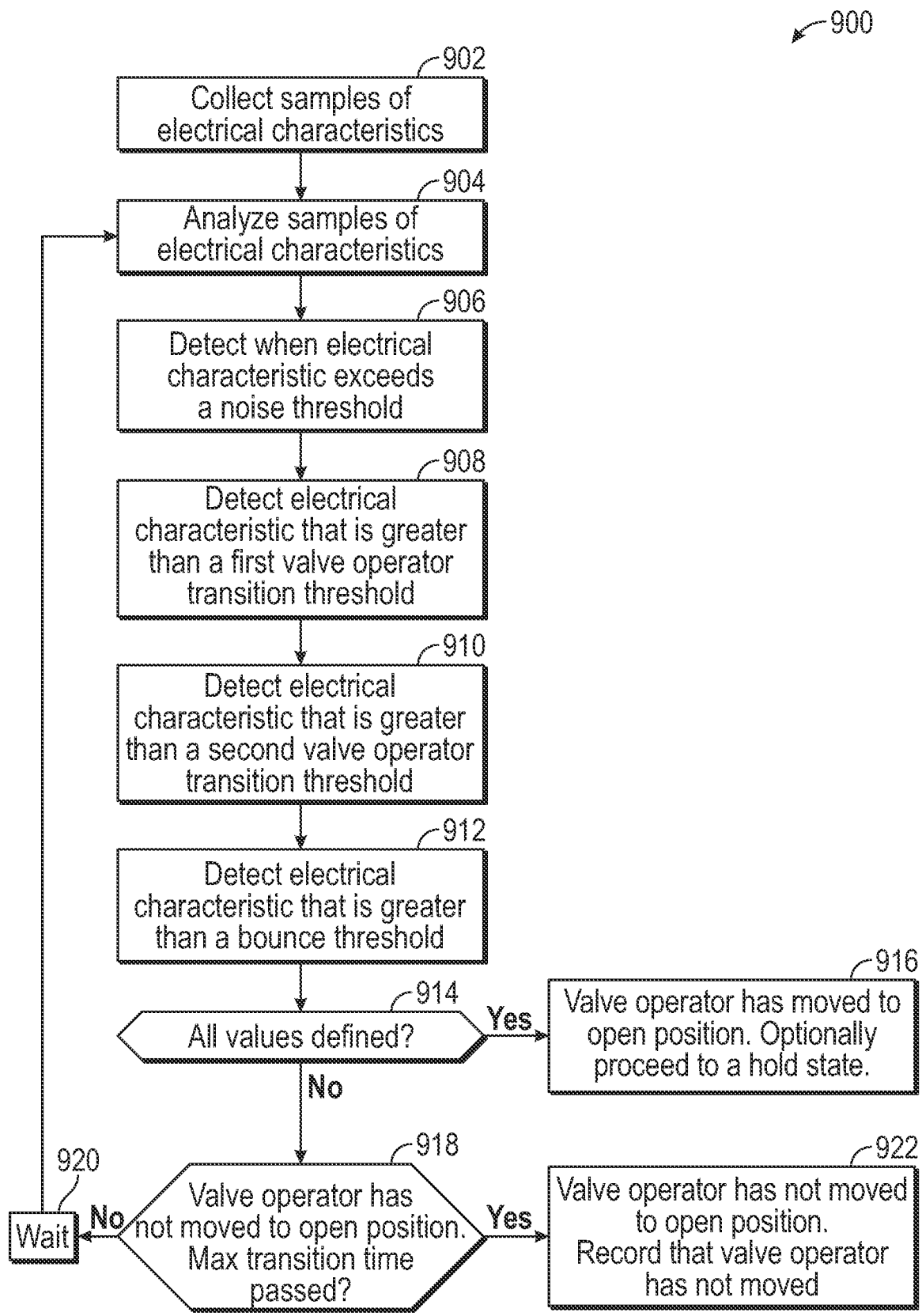
FIG. 9 illustrates an algorithm for determining one or more duty cycles, for example a duty cycle corresponding to a time duration for the valve operator transition between the closed position and the open position, according to an embodiment of the present subject matter.

FIG. 9 illustrates an algorithm 900 for determining one or more actual duty cycles, for example a duty cycle corresponding to a time duration for the valve operator 400 to transition between the closed position and the open position (e.g., the open stroke transition times). Samples are optionally collected during a first time interval (e.g., when the magnetic field is building in the solenoid 421), for example at 902. In an example, an analog-to-digital-converter ("ADC") with a direct memory access controller ("DMA") samples one or more electrical characteristics of the system 600, such as at a fixed sample rate. In an example, at 904 the electrical characteristic samples are analyzed, for instance with the controller 606 looping through an index of the samples to locate points of interest (e.g., one or more of the valve operator translation signatures 714). In another example, the controller 606 detects a value (e.g., one or more of the characteristics 704, 706) above a noise threshold (e.g., a base noise margin), and the controller 606 optionally records this as time T0. As the controller 606 continues analyzing the samples, at 906 the controller 606 optionally records the first instance of an inflection point (e.g., a peak, for instance the inflection point 710A at T1' in FIG. 7) that is greater than a first valve operator transition threshold (e.g., a noise threshold, minimum value, floor, or the like). In one example, T1' corresponds to the inflection point 710A and is, in some examples, more readily detected and T1' is accordingly interpreted as equivalent to T1. In another example, at 908 the controller 606 records an instance of a second inflection point (e.g., a valley, for example the inflection point 710B at T2 in FIG. 7) with a value that is greater than a second valve operator transition threshold. For instance, the second inflection point corresponds to the valve operator 400 fully moving to the open position (shown with the valve operator position 708 at T2 in FIG. 7).

The controller 606 optionally analyzes the samples (e.g., one or more of an analog signal, a digital signal, or the like) to detect a second peak value that exceeds the second valve operator transition value. For instance, the valve operator 400 may bounce within the valve body 402, thereby causing multiple peak values above the minimum valve operator transition value. Accordingly, at 910, the controller detects when the electrical characteristics exceed a bounce threshold to determine when the valve operator 400 has moved to the open position (e.g., the valve operator position 708 at T3, shown in FIG. 7).

The controller 606 determines when all values are defined at 914, such as by detecting when the value of the electrical characteristics of the system 600 exceed one or more of the thresholds described herein (e.g., a noise threshold, transition threshold, bounce threshold, or the like). At 916, when all values are defined, the controller 606 determines that the valve operator 400 did move (e.g., valve operator 400 is not stuck, bouncing, or the like) and proceeds to the hold state (e.g., by utilizing a hit-and-hold algorithm). If all values were not defined, at 918 the controller 606 determines that a full transition of the valve operator 400 did not occur and determines whether a wait duration has exceeded a maximum transition time threshold, such as a threshold correlating to the maximum hit duration of the hit-and-hold algorithm. In another example, the maximum transition time threshold correlates with a point when the field in the coil 420 is nearly saturated. If the wait duration has not exceeded the maximum transition time threshold, the controller 606 returns to 904 and analyzes samples of the electrical characteristics of the system 600. If the wait duration exceeds the maximum transition time threshold, the controller 606 determines that the valve operator 400 has not transitioned (e.g., the valve operator 400 is stuck or the operating pressure is too high) and the controller 606 records that the valve operator 400 did not transition.

In an example, the controller 606 when the controller 606 records that the valve operator 400 did not transition, the controller 606 provides a notification that the valve operator 400 did not transition (e.g., by displaying a message on a user interface, or the like). For example, the controller 606 transmits a notification to a user interface (e.g., a screen, dashboard, console, light emitting diode, pixel, or the like) to indicate to a user that the valve operator 400 did not transition. In another example, the notification provides the user with information that the duty cycle could not be implemented, for instance because the valve operator 400 remained open (or closed) instead of transitioning according to the specified duty cycle. Failure to implement the duty cycle is indicative in some examples of poor valve health, for example over or under application of an agricultural product, plugging, inability by the valve to achieve the specified duty cycle. A failure to implement the duty cycle triggers an implementation of a magnetic flux correction in one example. If the correction is implemented and performance is still out of line with the specified duty cycle a further indication is optionally provided of poor valve health.

Figure 10:
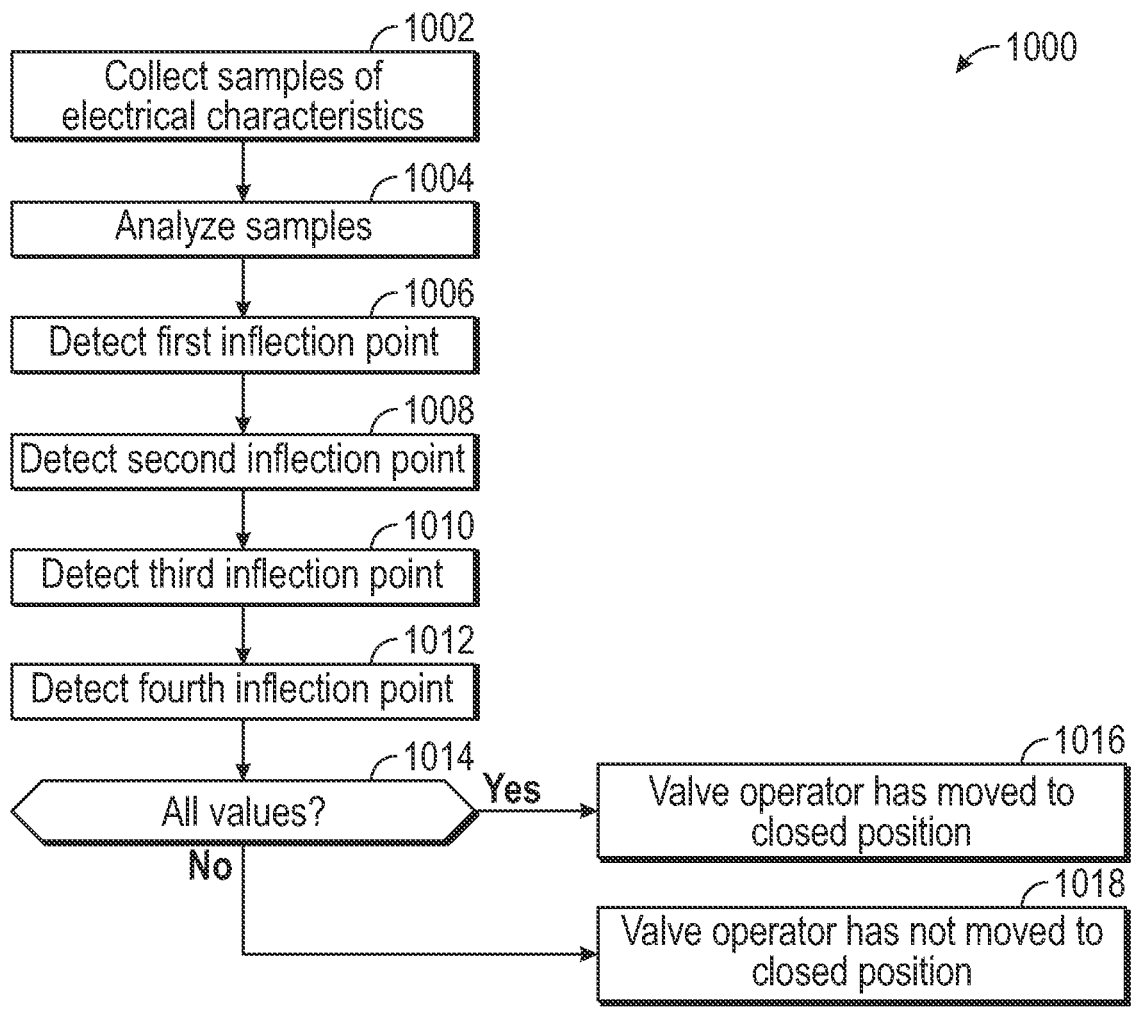
FIG. 10 illustrates an algorithm for determining one or more duty cycles, for example a duty cycle corresponding to a time duration for the valve operator transition between the open position and the closed position, according to an embodiment of the present subject matter.

FIG. 10 illustrates an algorithm 1000 for determining a translation of the valve operator 400 between the open position and the closed position (e.g., the close stroke transition times). In an example, at 1002 the controller 606 collects samples (e.g., data, information, electrical signals, or the like) during the translation of the valve operator 400 from the open position to the closed position. For instance, the controller 606 monitors a dissipation voltage node 626 during the close stroke. In an example, the controller 606 collects samples during a period of interest (e.g., when the magnetic field is decaying in the solenoid 621).

At 1004, the controller 606 analyzes the samples collected during translation of the valve operator 400. In some approaches, sampling the magnitudes of the sample values is unreliable at indicating valve operator 400 transition times. In an example, the controller 606 utilizes a derivative of the sample values (e.g., one or more electrical characteristics of the system 600, such as characteristics 704, 706) to determine whether the valve operator 400 has transitioned. The controller 606 optionally utilizes a stream derivative using, for instance a 9-sample window. For example, the controller 606 uses the Savitzky-Golay stream derivative method to compare one or more electrical characteristics of the system 600 to one or more of the valve operator translation signatures 714. In an example, as the stream derivative is calculated, the controller 606 analyzes the samples to look for one or more of the inflection points 710, 718 or the like in the electrical characteristics (or derivatives of the electrical characteristics) of the system 600. In another example, the valve operator translation signature 714 corresponds to one or more of the inflection points 710 of the coil characteristic 704. In yet another example, the valve operator translation signature 714 corresponds to one or more of the inflection points 718 of the dissipation characteristic 706. For instance, the inflection points 710, 718 include one or more of a change in magnitude of a derivative of the characteristic 704 (or the characteristic 706), such as an increase in the rate that the slope is decreasing; a change in sign of the slope of the characteristic 704 (or the characteristic 706); a change in sign of the derivative of characteristic 704 (or the characteristic 706); peaks and valleys; global maxima; global minima; local maxima; local minima; or the like.

In an example, at 1006 the controller 606 detects a first inflection point (e.g., a peak, such as inflection point 718A) in the collected samples, and the first inflection point correlates to the time (e.g., for the characteristic 706 at T5, shown in FIG. 7) when the current is directed to the second dissipation element 620 (and the voltage at the node 626 rises). At 1008, the controller 606 detects a second inflection point (e.g., a change in slope, for instance the inflection point 718B at T6 in FIG. 7), such as corresponding to a point when the second dissipation element 620 is no longer saturated. For instance, the second inflection point 718B is detected when the field decays below a clamped value of a clamp diode (e.g., for the characteristic 706 at T6, shown in FIG. 7). At 1010, the controller 606 detects a third inflection point (e.g., the inflection point 718C, shown in FIG. 7 at T7) indicating the point at which the valve operator 400 starts to transition to the closed position. In another example, the algorithm 1000 includes, at 1012, detecting a fourth inflection point (e.g., the inflection point 718D, shown in FIG. 7 at T8) with the controller 606. The fourth inflection point correlates to the point where the valve operator 400 has completed its transition to the closed position (indicated with the valve operator position 708 at T8 in FIG. 7). If all values are defined at 1014, at 1016 the controller 606 determines that the valve operator 400 did move (e.g., valve operator 400 is not stuck, bouncing, or the like) and optionally proceeds to the hold state. If all values were not recorded at 1014, at 1018 the controller 606 determines that a full transition of the valve operator 400 did not occur and optionally waits (e.g., for a waiting duration) before analyzing the electrical characteristics of the system 600 again. In some examples, the controller 606 determines that a full transition of the valve operator 400 did not occur and determines whether a wait duration has exceeded a maximum transition time threshold. The controller 606 optionally provides a notification when the wait duration exceeds the maximum transition time threshold.

FIG. 11 illustrates a duty cycle modulator 1100 for implementing a magnetic flux correction and implementing control of a valve according to a specified duty cycle 1102 and the magnetic flux correction (e.g., an applied duty cycle). In some examples, the duty cycle modulator 1100 is referred to as a feedback control loop 1100, algorithm or the like. In an example, at 1104 the controller 606 (see FIG. 6) provides the specified duty cycle 1102 to a junction, such as a summation block 1106, and the output of the summation block 1106 is an applied duty cycle 1108 (e.g., the applied duty cycle 808, shown in FIG. 8). As described herein, in some examples, the duty cycle of the electrically controlled low side switch 614 controls the valve 304 mechanics and how much fluid flows from the valve 304 (and is dispensed by the nozzle 106). In an example, the specified duty cycle 701 (shown in FIG. 7) is associated with the actual duty cycle 713 of the valve 304. As described herein, in some approaches the actual duty cycle 713 does not match the specified duty cycle 701 (e.g., due to physical limitations in the construction of the valve 304). In an example, the system 600 corrects (including minimizes) the variation or error between the specified duty cycle 1102 and an actual duty cycle 1110 (e.g., as shown with the actual duty cycle 804'), such as with the algorithm 1100.

For instance, when the system 600 decreases variations in the open time of the valve 304 (between specified open and actual open), the controller 606 optionally increases the field generated by the coil 420. The increase in the generated field corresponds to an increase in power supplied to the coil 420. In some examples, variations between duty cycles are mitigated by monitoring the feedback of the coil characteristic sensor 604 and dissipation characteristic sensor 624, for instance to determine when the valve 304 actually transitions between the open position and the closed position (e.g., when the valve 304 actually strokes).

In an example, the controller 606 determines how the valve operator 400 actually moved for a cycle of the valve 304. The controller 606 compensates for variability in movement of the valve operator 400 (e.g., a difference between specified duty cycle and actual duty cycle) with an applied duty cycle 1108 that is based on the specified duty cycle with a magnetic flux correction, for instance corresponding to the difference between the specified and actual duty cycles. For example, at 1112, one or more of the switches 612, 614 are modulated according to the applied duty cycle 1108 (or specified duty cycle if no magnetic flux correction is present) to thereby open and close the valve 304. The corresponding actual duty cycle 1110 is the output of the modulated switching at 1112. The algorithm 1100 at 1114 includes determining the (actual) valve operator duty cycle. For example, the controller 606 monitors one or more characteristics, such as the electrical characteristics 704, 106 (that represent opening and closing of the valve), also referred to herein as the actual duty cycle 1110 (or the actual duty cycle 804 in FIG. 8).

In FIG. 11, at 1116 the algorithm 1100 includes determining a duty cycle correction 1118 (corresponding to the magnetic flux correction applied to the valve 304). The duty cycle correction 1118 is implemented with the specified duty cycle 1102 at the summation block 1106, thereby generating the applied duty cycle 1108. The controller 606 uses the actual duty cycle determination (e.g., with the algorithm 1100 at 1114) to guide the actual duty cycle 1110 toward the specified duty cycle 1102, thereby minimizing error between the specified duty cycle 1102 and the actual duty cycle 1110 (and minimizing associated differences relative to a specified flow rate, pressure of the agricultural product at the valve, droplet size, spray pattern or the like). In an example, factors that cause variability from valve to valve do not change dramatically from cycle to cycle for those respective valves. In some examples, the controller 606 utilizes a magnetic flux correction (e.g., a duty cycle correction) to compensate the specified duty cycle 1102 of one or more valves 304 to improve the performance of the system 600 for applying an agricultural product. Accordingly, the variability of valve performance from a specified duty cycle and corresponding specified performance (e.g., flow rate, pressure or the like) or performance between the valves 304 can be compensated for, for instance by guiding the actual duty cycles 1110 of the valves 304 toward the specified duty cycle 1102.

For instance, at 1112, system feedback is conditioned into the duty cycle correction 1118 (e.g., an error offset, or the like) and used to modulate the low side switch 614 with the applied duty cycle 1108 that differs from the specified duty cycle 1102 to guide the actual duty cycle 1110 of the valve 304 to the specified duty cycle 1102. Accordingly, the system tightly controls the output of the valve 304 (e.g., flow of an agricultural product, or the like) based on a desired target output (e.g., valve flow rate, agricultural product volume or the like).

As described herein, at 1116, the controller 606 implementing the algorithm 1100 determines the duty cycle correction 1118 (e.g., a duration, percentage or the like that represents the magnetic flux correction) based on error (e.g., differences) between the specified duty cycle 1102 and the actual duty cycle 1110. The duty cycle correction 1118, when implemented at the coil 420 of the valve 304 corresponds to the magnetic flux correction. The duty cycle correction 1118 is combined with the specified duty cycle 1102 at the summation block 1104 to accordingly generate the applied duty cycle 1110. Accordingly, the duty cycle correction 1118 is applied to the specified duty cycle 1102 to generate the applied duty cycle 1108 that guides the valve performance (e.g., the actual duty cycle 804' described herein and shown in FIG. 8) to the original specified duty cycle 1102 (e.g., as provided at 1104). For instance, an 'on' duration (e.g., open period of the valve during a cycle of operation) for the actual duty cycle 804' corresponds with the 'on' duration of the specified duty cycle 1102 when the applied duty cycle 1108 includes the duty cycle correction 1118 (e.g., the magnetic flux correction).

As described herein, the controller 606 monitors feedback such as electrical characteristics that correspond to mechanical performance of the valve 304 as the valve operator transitions (e.g., between with an open stroke or a close stroke). The controller 606 optionally compiles one or more metrics related to valve health or valve performance relative to other valves in the system (e.g., to notify a user that performance of one or more of the valves is degraded, for instance below a performance threshold). In another example, the controller 606 compiles a health metric based on the correction, such as the magnetic flux correction or duty cycle correction 1118 (in FIG. 11), that adjusts valve performance toward the specified duty cycle 701. Optionally, the health metric is graduated according to the magnitude of the duty cycle correction 1118. For instance, as the duty cycle correction 1118 increases, the health metric conversely decreases (e.g., indicating the valve is less able to perform as specified and instead is driven with progressively greater correction).

For example, a magnitude of the duty cycle correction (e.g., determined with the algorithm 1100, shown in FIG. 11) is indicative of the health of the valve 304 (e.g., whether the valve 304 is operating as intended). In an example, the controller 606 determines that the valve 304 is performing as intended if the duty cycle correction 1118 is within 10 percent of the specified duty cycle 1102 (e.g., the duty cycle correction 1118 is within 0.010 ms for a specified duty cycle 1102 of 0.100 ms). Thus, when the duty cycle correction 1118 is within 10 percent of the specified duty cycle 1102, the controller 606 optionally provides a notification that the valve 304 is at maximum health. For instance, the controller 606 may provide a notification that a health value of the valve 304 is at 100 health points out of 100 total health points.

In another example, when the duty cycle correction 1118 exceeds 10 percent of the specified duty cycle (e.g., a duty cycle correction exceeding 0.010 ms for a duty cycle time of 100 ms), the controller 606 provides a notification that the health value of the valve 304 is decreasing. For example, the health value of the valve decreases below 100 total health points if the duty cycle correction 1118 exceeds 10 percent of the specified duty cycle 1102. The health value of the valve 304 optionally decreases in a graduated manner (e.g., linearly, exponentially, logarithmically, or the like) as the duty cycle correction 1118 increases above 10 percent of the specified duty cycle 1102. For example, the controller 606 provides a notification that the valve 304 has 50 health points (out of 100 total health points) when the duty cycle correction 1118 exceeds 15 percent of the specified duty cycle 1102 (e.g., the duty cycle correction exceeding 015 ms for a duty cycle time of 0.100 ms). In another example, the controller 606 provides a notification that the valve 304 has 0 health points (out of 100 total health points) when the duty cycle correction 1118 exceeds 20 percent of the specified duty cycle 1108 (e.g., the duty cycle correction exceeding 0.020 ms for a duty cycle time of 0.100 ms). In some examples, the controller 606 provides a notification that the valve 304 needs service, for instance when the duty cycle correction 1118 exceeds 25 percent of the specified duty cycle 1102 (e.g., the duty cycle correction exceeding 025 ms for a duty cycle time of 0.100 ms). Accordingly, the controller 606 utilizes the duty cycle correction 1118 to assess the health of the valve 304 and notify a user regarding the health of the valve (e.g., by displaying a health value including health points of the valve, or the system 600, with a user interface).

In some examples, pressure changes quickly at the valve outlet 416 once the seal is broken (on the open stroke) or sealed (on the close stroke). As the valves low output depends on the pressure at the outlet, the system provides a specified output when the system utilizes the subject matter described herein. For instance, the error offset metric is helpful for determining valve health between valves. The system provides operation conditions as similar as possible between valves of the system, and in some examples the system compares how much offset a given valve has and determines if the system is out of specifications (e.g., outlet restrictions in the case of blocked tip detection).

In some approaches a sprayer for applying an agricultural product can cause skips, or areas in application coverage that do not get touched by dispensed agrochemical, for instance if the driven duty cycle of a nozzle is less than 50%. In practice, this number is 50% because nozzle tips are generally selected to overlap 50% with their neighboring nozzle and nozzles are run out of phase with one another. Many things affect the skip area like machine speed, yaw rate, application height, mixing in the air due to boom or machine turbulence or local wind conditions. The total area of the skip depends on one or more things, the effective velocity at the nozzle, the application width of the tip, and the off time of the nozzle when operating at less than 50% duty cycle.

The area can be calculated using the following formula:

$$\text{Skip Area} = (\text{Nozzle Width} * \text{Effective Nozzle Velocity} * (1 - (\text{duty cycle}/100)))/\text{frequency [for duty cycles} < 50\%]$$

In practice, we currently recommend keeping our valve ("NCV") minimum duty cycle at or around 25% to minimize areas where skips may occur. However, the NCV can physically perform well at much lower duty cycles as the limitation in the NCV is how quickly the valve operator 400 can transition from the closed to open states or opened to close states. For instance, at 40PSI, the NCV can open in about 7 ms and close in about 5 ms. At a frequency of 10 Hz this correlates to a minimum on-time duty cycle of about 5% and at 20 Hz, this correlates to a minimum on-time duty cycle of 10%. In general, if the frequency was increased near the minimum duty cycle range to 20 Hz it would cause the skip distance to decrease and increase our confidence at lowering the NCV minimum duty cycle threshold. In the industry, the trend is to increase the base operational frequency at all duty cycles in order to minimize skip area or distance. However, increasing the frequency causes more stress on the physical mechanics of the NCV (like the valve operator 400 and seals), and in return, lowering the frequency would lengthen the lifespan of the NCV. Increasing the frequency also causes more transitions from the open to closed and closed to open states during which the pressure in the valve varies and can cause non-linear flow or pressure drops which can affect control and target droplet size.

Therefore, being able to dynamically adjust the operational frequency of the NCV at different duty cycles and effective velocities to target a minimum skip area would be ideal for targeting an optimal life time, minimalizing inconsistencies in droplet size from the tip, or minimizing time in non-linear flow rate application periods.

Technically, the frequency at any duty cycle above 50% could be reduced to the lowest allowable frequency that still produced an acceptable coverage pattern (e.g., acceptably sized double-coverage areas). One approach to implement dynamic frequency adjustment can be that the frequency is fixed at set duty cycles and then would use a percent threshold to switch between the frequencies. This approach has the disadvantage of the fact that it doesn't use the effective nozzle velocity to minimize the skip distance, which may make it unnecessarily run at higher frequencies when it doesn't need to do so to acceptably minimize skip coverage areas.

Another way would be to have the user select a maximum skip distance and then based off that setting, each NCV could use its effective speed and off time to determine its effective skip distance and make a decision to increase or decrease the frequency to control the skip distance below the maximum entered value.

It is also worth noting that because nozzles typically run out of phase with their neighbors, frequency steps would have to happen in powers of two to ensure that nozzles could still be synced locally to one another and remain out of phase.

FIG. 12 illustrates a block diagram of an example machine 1200 (e.g., the controller 606, or the like) upon which any one or more of the techniques (e.g., methodologies) discussed herein may perform, for example one or more of the algorithms 801, 900, 1000, or 1100. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Figure 13:
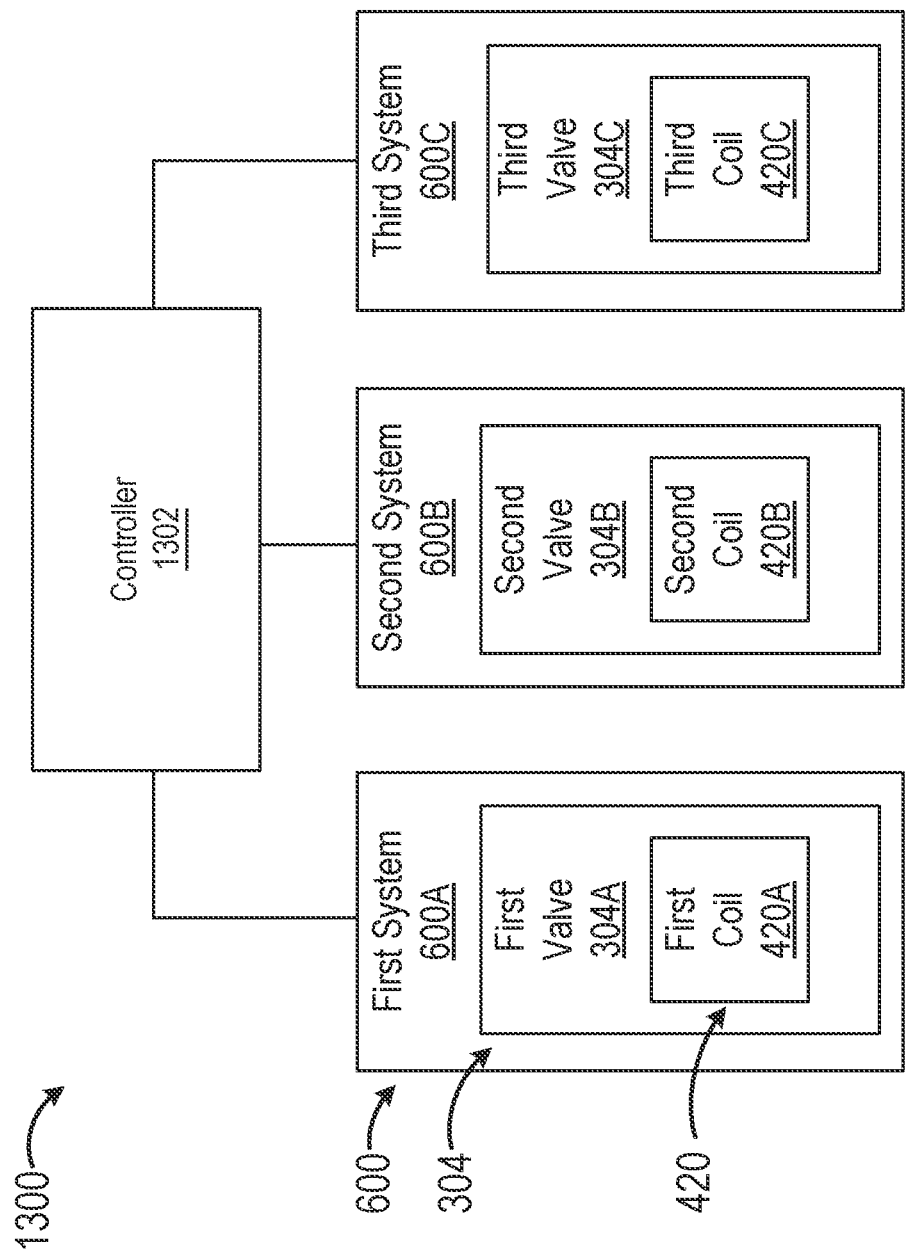
FIG. 13 illustrates a schematic diagram of an example of a system for modulating one or more of valves, according to an embodiment of the present subject matter.

FIG. 13 illustrates a schematic diagram of an example of a system 1300 for modulating one or more of the valves 304. For example, the system 1300 includes the controller 1302 (in one example the master node 110 shown in FIGS. 2, 3). In some examples, the controller 1302 includes the controller 606 (or the controller 606 is a component of the nozzle control systems 600A-C described herein). For instance, the controller 1302 includes processing circuitry that facilitates operation of the system 1300 (and the valves 304). In an example, the agricultural sprayer 100 (shown in FIG. 1) includes one or more controllers, for instance one or more of the controller 1302 or the controller 606 (shown in FIG. 6). In another example, the nozzle control system 200 (shown in FIG. 2) includes the controllers (e.g., controller 1302, controller 606, or the like). In yet another example, the control system 300 (shown in FIG. 3) includes the controllers e.g., (controller 1302, controller 606, or the like).

In an example, the controller 1302 is in communication with one or more of the nozzle control systems 600 (e.g., components of the smart nozzles 106, associated ECUs or the like). For instance, the system 1300 includes a first nozzle control system 600A, a second nozzle control system 600B, and a third nozzle control system 600C. The first system 600A includes a first valve 304A having a first coil 420A. The second system 600B includes a second valve 304B having a second coil 420B. The third system 600C includes a third valve 304C having a third coil 420C.

In one example, the controller 1302 modulates the valves 304 according to one or more duty cycles, such as specified duty cycles modified according to one or more of valve operator errors, pressure errors or the like. For example, the controller 1302 is in communication with the first system 600A and energizes the coil 420A, for instance according to a first specified duty cycle and a first magnetic flux correction (e.g., duty cycle corrections corresponding to valve operator error, pressure error or the like). The controller 1302 is in communication with the second system 600B and energizes the coil 420B, for instance according to a second specified duty cycle and a second magnetic flux correction. The controller 1302 is in communication with the third system 600C and energizes the coil 420C, for instance according to a third specified duty cycle and a third magnetic flux correction. Accordingly, the controller 1302 operates the valves 304. In another example, the controller 1302 provides an initial flow rate (or specified duty cycle) to each of the systems 600A-C, and the systems 600A-C having respective ECUs independently determine applied duty cycles based on the initial flow rate or corresponding specified duty cycle and the errors discussed herein (e.g., valve operator duty cycle errors, pressure errors or the like). Optionally, the initial specified duty cycle or specified flow rate is provided to each of the systems having the associated valves 304A-C, and the corresponding systems 600A-C determine the differing applied duty cycles for the associated valves 304A-C and coils 420A-C. In another example, the systems 600A-C and associated controllers 606 of the valves 304 (e.g., ECUs of smart valves) determine the specified duty cycle values from specified flow rates received from the controller 1302 (or the master node 110).

In some examples, the controller 1302 facilitates modulation of one or more of the valves 304 out of phase with each other, for instance to conserve power usage by the system 1300. For example, the first valve 304A is modulated out of phase with the second valve 304B. The first valve 304A is modulated out of phase with the third valve 304C. Accordingly, the first valve 304A is modulated out of phase with one or more of the second valve 304B or the third valve 304C. In another example, the second valve 304B is operated in phase with the third valve 304C. The first valve 304A is modulated out of phase with the second valve 304B and the third valve 304C (with the valves 304B, 304C modulated in phase with each other). Accordingly, modulation of the valves 304 out of phase with each other reduces the number of valves 304 that are drawing power simultaneously within the system 1300.

In an example, the controller 1302 modulates the first valve 304A out of phase with the second valve 304B at a specified phase. The controller 1302 operates the valve 304A, for example by operating a moveable valve operator (e.g., valve operator 400, shown in FIG. 4) with the coil 420A. The controller 1302 optionally determines an actual phase of the valve 304, such as by determining the actual duty cycles of the valves 304 and determining the actual phase between the actual duty cycles of the valves 304. The controller 1302 operates the valve 304A according to the specified duty cycle and a magnetic flux correction (e.g., an applied duty cycle) to guide the actual phase of the valve 304A toward the specified phase. For instance, the controller 1302 determines an error between the specified phase and the actual phase of the valves 304. The controller 1302 implements a correction to the modulation of the valves 304, for example to reduce (or minimize) error between the specified phase and the actual phase of the valves 304.

In some examples, a plumbing system of a sprayer has a pressure drop along the boom that varies from nozzle location to nozzle location that depends on the amount of flow going to each nozzle location. This variable pressure drop can cause issues, for example with our pressure control algorithm. In some approaches, the algorithm assumes that the pressure at each nozzle is the same as the pressure measured at the center of the boom. The variable pressure drop can also affect droplet size across the boom as the pressure at each nozzle location, for instance because the droplet size is dependent on nozzle pressure. To overcome controlling the flow incorrectly in the presence of this pressure drop, a controller integrates the system efficiency, but this adds latency to the control mechanism and can affect how much variation in flow rate or droplet size occurs between locations on the boom.

The pressure drop at each location can be found through modeling known aspects of the machine configuration like the diameter(s) of the plumbing, length of the plumbing to each nozzle, types of tubing, types of restrictions or fittings along the boom, target flow rate at every nozzle location along the boom, and some characteristics about the type of liquid being dispensed. The system can experimentally validate pressure drop values on a configuration by running the system at a known flow rates at each nozzle and then measure the associated pressure drops along the boom. By modeling or characterizing the system, the system (e.g., a controller) can compensate the pressure at each nozzle to an average target pressure by controlling to an overall slightly higher pressure at the center of the machine. This pressure offset can still cause an issue with the inside nozzles having a higher than target pressure and dispensing more liquid and the outside nozzles having a lower than target pressure and dispensing slightly less liquid. The effective pressure could be calculated at each nozzle or valve, and then as discussed herein the system can compensate the flow rate by adjusting the duty cycle of the valves or nozzles to match their target flow rate even in the presence of the nominal pressure drop at their location.

Figure 14:
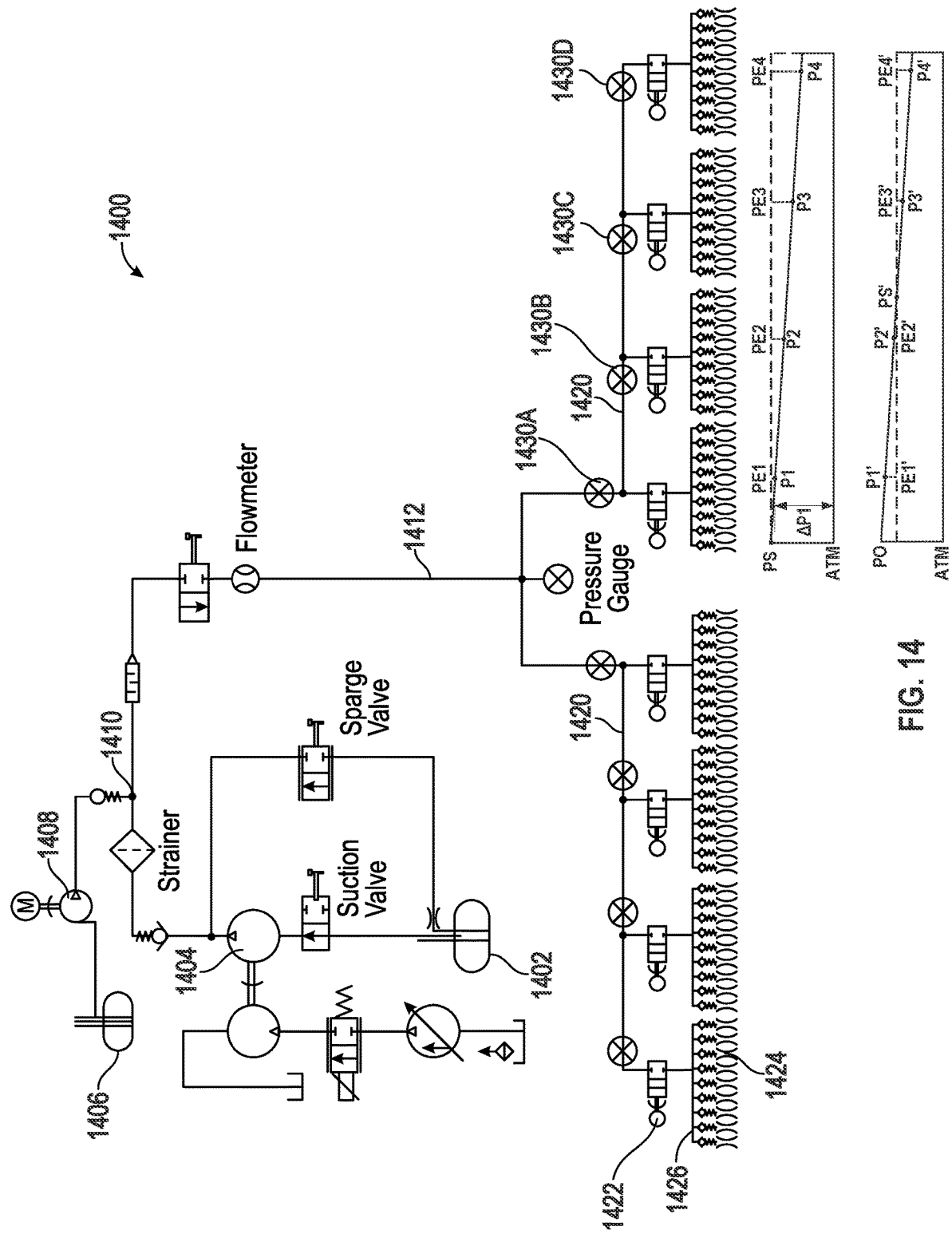
FIG. 14 illustrates a detailed schematic view of an example nozzle control system showing pressure variation along the boom
Figure 15:
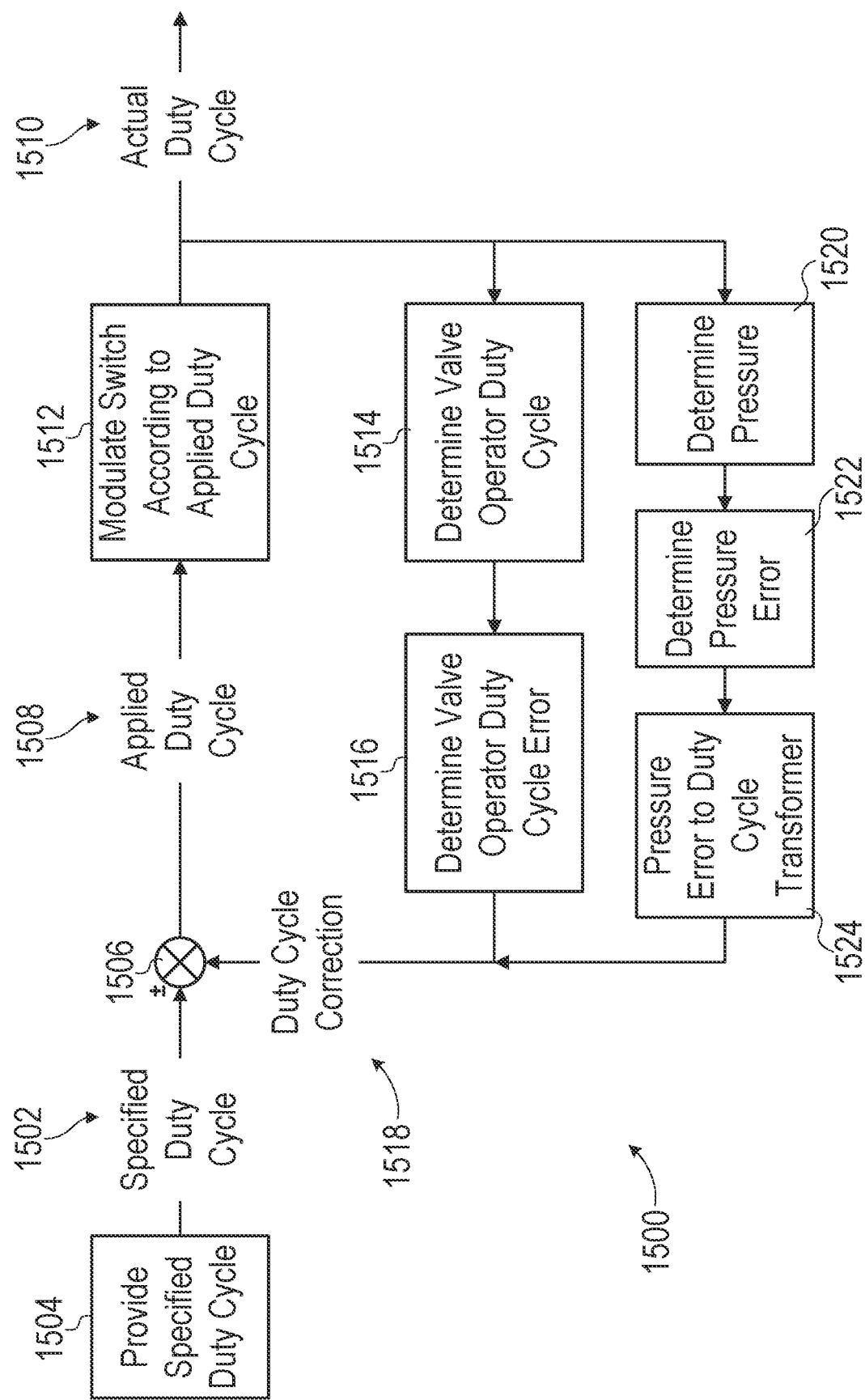
FIG. 15 illustrates an example of a duty cycle modulator configured to compensate for valve performance or pressure errors.

FIG. 14 shows another example of a sprayer 1400. The previous systems, such as the system 1300; controller 1302 (master node 110); controllers 606 associated with nozzle control systems 600, such as the ECUs discussed herein; or the like are configured for use with the sprayer 1400. As further discussed herein, a sprayer control system, referred to as a duty cycle modulator 1500, is shown in FIG. 15 and is configured for use with the sprayer 1400. The duty cycle modulator 1500 is similar in at least some aspects to the duty cycle modulator 1100 shown in FIG. 11. In the present example the duty cycle modulator 1500 is configured to determine one or more of operator duty cycle error or pressure error and compensate the determined errors with modulated control of the valve duty cycle.

The sprayer 1400 shown in FIG. 14 includes a consolidated system having the product injection reservoir 1406 and the injection pump 1408 feeding into an injection port 1410 of a header 1412 of the sprayer 1400. For instance, the carrier fluid is pumped from a carrier reservoir 1402 by a carrier pump 1404 and supplemented with the injection product at the injection port 1410 (e.g., by the injection pump 1408). One or both of the carrier pump 1404 or the injection pump 1408 are operated as system pressure regulators, for instance to control the system pressure (PS). As discussed herein, control of the system pressure (PS or PS') is conducted to minimize pressure error as an optional component of duty cycle modulation.

As further shown in FIG. 14, a mixer is provided downstream from the injection port 1410 for mixing the injection product with the carrier fluid prior to delivery through the header 1412 to the boom tubes 1420, the boom sections 1428 and the spray nozzles 1424.

As shown in FIG. 14, the injection product is provided to the flow of carrier fluid upstream from the spray nozzles 1424 and the boom sections 1426 (each examples of product dispensers). In other examples, the injection product is provided in a localized manner, for instance with a parallel set of injection plumbing (having its own header, injection boom tubes or the like) to the header 1412 and boom tubes 1420 for the carrier fluid. In this example, the injection pump 1408 communicates the injection product under pressure to the control valves 1422, and the control valves 1422 include one or more components, such as injection valves, configured to selectively inject the injection product to the carrier fluid proximate to the product dispensers, such as the boom sections 1426 having multiple spray nozzles 1424, or in another configuration to spray nozzles 1424 associated with the control valves 1422 in a one to one basis. The injection control valves precede or proceed the control valves 1422, for instance with unidirectional valves to prevent back flow.

The control valves 1422 of the smart nozzles (e.g., having ECUs and one or more of the spray nozzles 1424) are provided along the boom tubes 1420. The control valves receive flow rate instructions from the master node (also referred to as a main controller) 110 and implement the flow rate instructions as a corresponding specified duty cycle. As discussed herein, the specified duty cycle is, in various examples, modified with the example duty cycle modulators 1100, 1500 (1500 is shown in FIG. 15) based on performance and characteristics associated with the respective control valves 1422 or proximate to the control valves 1422 (e.g., local pressure and corresponding pressure error relative to a system pressure). Example valve performance and characteristics associated with control valves 1422 include, but are not limited to, variations in actual duty cycle (e.g., movement of the valve operator) relative to the specified duty cycle, or pressure errors (e.g., pressure variance) proximate to the control valves 1422 relative to a system pressure that cause flow rate, droplet or spray pattern deviations through the spray nozzles 1424.

In the example shown in FIG. 14, pressure errors (also referred to as pressure variances) are shown proximate to associated control valves 1422. As previously discussed one or more of the carrier pump 1404, injection pump 1408 or other device, such as a pressure regulating valve, act as pressure regulators for the sprayer 1400 (e.g., sprayer system). The pressure regulator provides the agricultural product (e.g., mixed carrier fluid and injection product, carrier fluid for downstream mixing with injection product or the like) at a system pressure (PS or PS'). In one example, shown with the first pressure plot provided beneath the right boom tube 1420 the system pressure (PS) is initially localized along the header 1412. Because of fluid mechanic characteristics of the boom tube 1420, fittings, the control valves or the like the system pressure gradually decreases along the boom tube 1420, for instance as shown at each of P1, P2, P3 and P4 in the first plot. As pressure decreases along the boom tube 1420, flow rate through the associated control valves 1422 and spray nozzles 1424 correspondingly decreases. Pressure errors, PE1, PE2, PE3, PE4 are illustrated in the first pressure plot based on the difference between system pressure (PS) and the associated pressures (P1-P4) and represent the potential degradation of pressure along the boom tube 1420 and indicate the degradation of sprayer output for product dispensers, such as spray nozzles 1424 along the boom tube 1420.

In one variation, the sprayer control system including one or more of a controller 1302 (e.g., the master node 110) or the like discussed herein operates the system pressure regulator (or regulators) at pressures above a specified system pressure, for instance a system overpressure (PO). As shown in the second pressure plot in FIG. 14, the system overpressure (PO) is provided proximate to the header 1412, for instance at interior ends of the boom tubes 1420. In one example, the system overpressure generally minimizes pressure errors along the boom tube 1420. For instance, a displaced specified system pressure (PS') is provided along the boom tube 1420, in this example at a relatively central location. PS' provides the specified system pressure at a location along the boom tube 1420 that minimizes pressure error at the extremities of the boom tube 1420. For instance, in the example shown P4' has less error (PE4') than the specified system pressure shown in the second plot as PS'. Conversely, P1' includes pressure error (PE1') corresponding to an elevated pressure due to the system overpressure (PO). The pressure error PE1' has an opposed sign to PE4' because P1' is greater than PS'. The control valves 1422 associated with P1' and PE1' will have an increased flow rate relative to a specified flow rate related to the valve 1422 from the main controller (such as the master node 110). As described further herein, duty cycle modulation based on pressure error (e.g., PE1-PE4 or PE1'-PE4') is implemented to correct flow rate deviation caused by the variation in pressure.

FIG. 14 includes a series of pressure monitors 1430A-D proximate to one or more of the control valves 1422. In one example, the pressure monitors 1430A-D correspond to pressure transducers installed along one or more of the boom tube 1420, proximate to the control valves 1422, proximate to the associated spray nozzles 1424 or the like. Optionally, multiple monitors are installed proximate to the control valves 1422 and the spray nozzles 1424 associated with the control valves 1422.

In other examples, the pressure monitors 1430A-D include other components, analysis of the operation of components, known system behavior based on previous benchmark testing, performance registries or the like that facilitate the determination of pressure errors. In one example, one or smaller number of pressure monitors 1430 are provided along the boom tube 1420 and an incrementor/decrementor is implemented to step up (or step down) the measured pressure at a first location to approximate pressures at other locations along the boom tube. For instance, through experimentation, fluid mechanic calculations or the like a relationship between system pressure, flow rate, tube dimensions and other components is determined. The incrementor/decrementor is configured to implement the relationship and according step up or step down pressure at locations spaced from an initial benchmark location such as the system pressure (PS) proximate to the header 1412 or the PS' location provided along the boom tube 1420. Similarly, a stock system in some examples has known performance characteristics including known pressure measurements (or pressure drops) along the boom tube 1420 in relation to various system pressures and flow rates. The performance characteristics are retained in a system performance register, and pressures (P1, P1', or the like) and corresponding pressure errors (PE1, PE1') are determined through indexing flow rate and system pressure relative to a corresponding location of the sprayer 1400 plumbing, such as a location (e.g., of a control valve 1422) along the boom tube 1420 relative to the header 1412 or system pressure regulator.

In another example, the pressure monitor includes a flow rate to pressure transformer configured to determine pressure proximate to one or more of the control valves 1422 according to flow rate through the one or more spray nozzles 1424 associated with the valve 1422 or through the valve 1422 itself. By measuring the flow rate the pressure (and pressure drop across the valve 1422) is readily determined and compared against the system pressure to determine the local pressure error.

In still another example, performance of the control valve 1422, such as the valve operator 400 (see FIGS. 4, 5), is analyzed to determine pressure proximate to the valve 1422. As previously discussed and shown in FIG. 7 the control valve 1422 (e.g., its movement when driven) is analyzed to assess valve performance. For instance, the coil current plot in FIG. 7 provides various indications of valve operator 400 movement. The inflection point 710A for current indicates the valve operator 400 has begun movement and accordingly 'cracked' the seal between the operator 400 and valve seat 409. The fluid pressure (e.g., P1, P1' or the like) on the upstream side of the operator 400 relative to the pressure on the downstream side (atmospheric generally (ATM), or 0 psi) along with the spring force of the spring 418 is overcome and the operator 400 begins to move. The current proximate to the inflection point 710A scales with the pressure differential (delta P) between the upstream and downstream sides of the control valve 1422 (e.g., the valve operator 1400). For instance, as the delta P increases (e.g., with a higher system pressure, such as at P1 or proximate to the known system pressure, PS) the current correspondingly rises as additional current is applied to overcome the higher delta P. Conversely, as the delta P decreases, for instance at P4 in FIG. 14, along the boom tube 1420 relative to atmospheric pressure the current correspondingly decreases. With analysis of valve performance at different pressure differentials and indexing of the pressure differentials to corresponding current measurements the plot at FIG. 7 is, in one example, used to determine the delta P at a control valve. Because delta P is generally determined relative to atmospheric pressure (ATM in FIG. 14) on the downstream side of the control valve 1422 the pressure at the upstream side (e.g., along the boom tube 1420 and proximate to the valve 1422) is determined. For instance, a delta P for the left most valve of the right boom tube 1420 based on electrical current is 57 psi in an example and is equivalent to 57 psi on the upstream side of the control valve 1422 (e.g., P1 or P1') assuming 0 psi (ATM) on the downstream side of the valve 1422. Further, by knowing the system pressure (PS, PS') the pressure error, PE, PE', for the control valve 1422 is readily determined (PS-P1 or PS'-P1'), and then used as an input for duty cycle modulations (e.g., as shown in FIG. 15).

FIG. 15 is a schematic of an example duty cycle modulator 1500 configured to control (e.g., maintain, modify, guide or the like) the duty cycle of one or more control valves 1422 according to determined errors, for instance with one or more of operator duty cycle error, pressure error or the like (e.g., one or more characteristics of the system or valve that deviate from specified values). As previously discussed with the duty cycle modulator 1100, the duty cycle corrections discussed are in one example, implemented as magnetic flux corrections that change the specified duty cycle (e.g., corresponding to a specified flow rate) to provide the specified flow rate, spray pattern, droplet size or the like through analysis and response to determined errors in the system or valve.

In some examples, the duty cycle modulator 1500 is referred to as a feedback control loop 1500, algorithm or the like and is included with a controller 606 of a smart nozzle (ECU or systems 600A-C in FIG. 13). In an example, at 1504 the controller 606 (see FIG. 6) optionally receives a specified flow rate (e.g., from the controller 1302, master node 110 or the like) and provides a corresponding specified duty cycle 1502 to a junction, such as a summation block 1506. The output of the summation block 1506 is an applied duty cycle 1508 At 1512, the applied duty cycle is implements, for instance, with one or more of the low side and high side switches 614, 612 and the controller 606 shown in FIG. 6.

The duty cycle modulator 1500 shown in FIG. 15 includes a first characteristic error loop. In this example, the first loop corresponds to valve performance of the control valve 1422 (or 304) including, but not limited to, variation of actual duty cycle relative to the specified duty cycle. At 1514 the actual duty cycle of the control valve 1422 is determined. The comparator 1516 compares the actual duty cycle with the specified duty cycle and determines the valve operator duty cycle error based on the difference. As previously discussed, the valve operator duty cycle error is one example of a duty cycle correction 1518 provided to the summation block 1506 for generation of the applied duty cycle 1508.

As further shown in FIG. 15, the duty cycle modulator 1500 includes another characteristic error loop in communication with the remainder of the modulator 1500 to compensate for a different variation or error. In this example, the duty cycle modulator 1500 compensates for pressure variation or error proximate to one or more control valves 1422 (or 304) relative to a system pressure, such as PS or PS' in FIG. 14. Pressure error, such as deviation from system pressure, PS, at a control valve 1422 correspondingly decreases flow rate (if a negative error), and in in the present example is compensated with a duty cycle correction that changes (e.g., increases if a negative error) the specified duty cycle to provide additional flow from control valve 1422 experiencing the pressure error.

At 1520, a pressure monitor (e.g., pressure transducer, known characteristics of the sprayer 1400, registry, electrical characteristic corresponding to pressure or the like) determines the pressure proximate to the control valve 1422. A comparator 1522 compares the determined pressure (e.g., P1-P4, P1'-P4') relative to the system pressure (PS, PS') to determine the pressure error (PE1-PE4, PE1'-PE4') proximate to the control valve 1422.

In the example shown in FIG. 15, a pressure error to duty cycle transformer is provided that converts the determined pressure error to a duty cycle correction. One example of relationship between pressure error and a corresponding duty cycle correction is shown below.

$$DC_{corr} = DC_{targ} \left( \frac{\sqrt{\frac{PS}{SG}} - \sqrt{\frac{PS-PE}{SG}}}{\sqrt{\frac{PS-PE}{SG}}} \right)$$

In the example correction, $DC_{corr}$ is the duty cycle correction (e.g., for modification of the specified duty cycle to the actual duty cycle); $DC_{targ}$ is the specified duty cycle (e.g., based on flow rate, system pressure or the like, for instance provided by the master node 110 or controller 1320); PS is the current system pressure (PS, PS', for instance relative to atmosphere) sent from the main controller to the control valve, and PE is the difference between system pressure (PS, PS' or the like) and the pressure proximate to the control valve 1422 (P1, P1' or the like); and SG is the specific gravity of the liquid agricultural product.

The duty cycle correction ($DC_{corr}$) is the duty cycle correction 1518 provided to the summation block 1506 of the duty cycle modulator to account for pressure error at the associated control valve 1422. Implementing the duty cycle correction provides an actual duty cycle 1508 for implementation (e.g., at 1512, for instance with the switches 612, 614) to compensate for the determined error and its effects (decreased flow rate, inaccurate spray pattern, droplet size or the like because of the pressure error) In an example, this modulation is provided for one or more (or each) of the control valves 1422 to provide independent corrections for each of the control valves 1422 according to the characteristics of the system (and the valve) proximate to each valve 1422. Optionally, the duty cycle correction based on the determined pressure error is provided by itself to the summation block 1506 for the duty cycle modulator 1500 (and the associated controller) to determine the actual duty cycle. In another example, the duty cycle correction is applied in combination with other duty cycle corrections, such as the valve operator duty cycle error (and corresponding correction) show at 1516 in FIG. 15. In still other examples, additional duty cycle corrections are determined based on one or more of system (sprayer 1400) errors valve errors or the like to provide valve 1422 and spray nozzle 1424 performance closely approximating the performance specified, for instance based on the original specified duty cycle for the control valve 1422 (e.g., based on a specified flow rate).

In another example, for instance with the second pressure plot shown in FIG. 14 (having P1', PE1' and so on) the pressure error at the first and second control valves 1422 (e.g., corresponding to the pressure monitors 1430A, B) is optionally a different sign of pressure error. For instance, P1'

(and P2') are greater than PS', and the corresponding PE1' (and PE2') indicate higher pressures at the associated valves 1422 than PS'. In this case, the pressure errors determined at 1522 and the associated pressure based duty cycle correction determined at the transformer 1524 are a subtractive duty cycle correction, and the actual duty cycle corresponds to the specified duty cycle 1502 decreased by the pressure based duty cycle correction.

Figure 16:
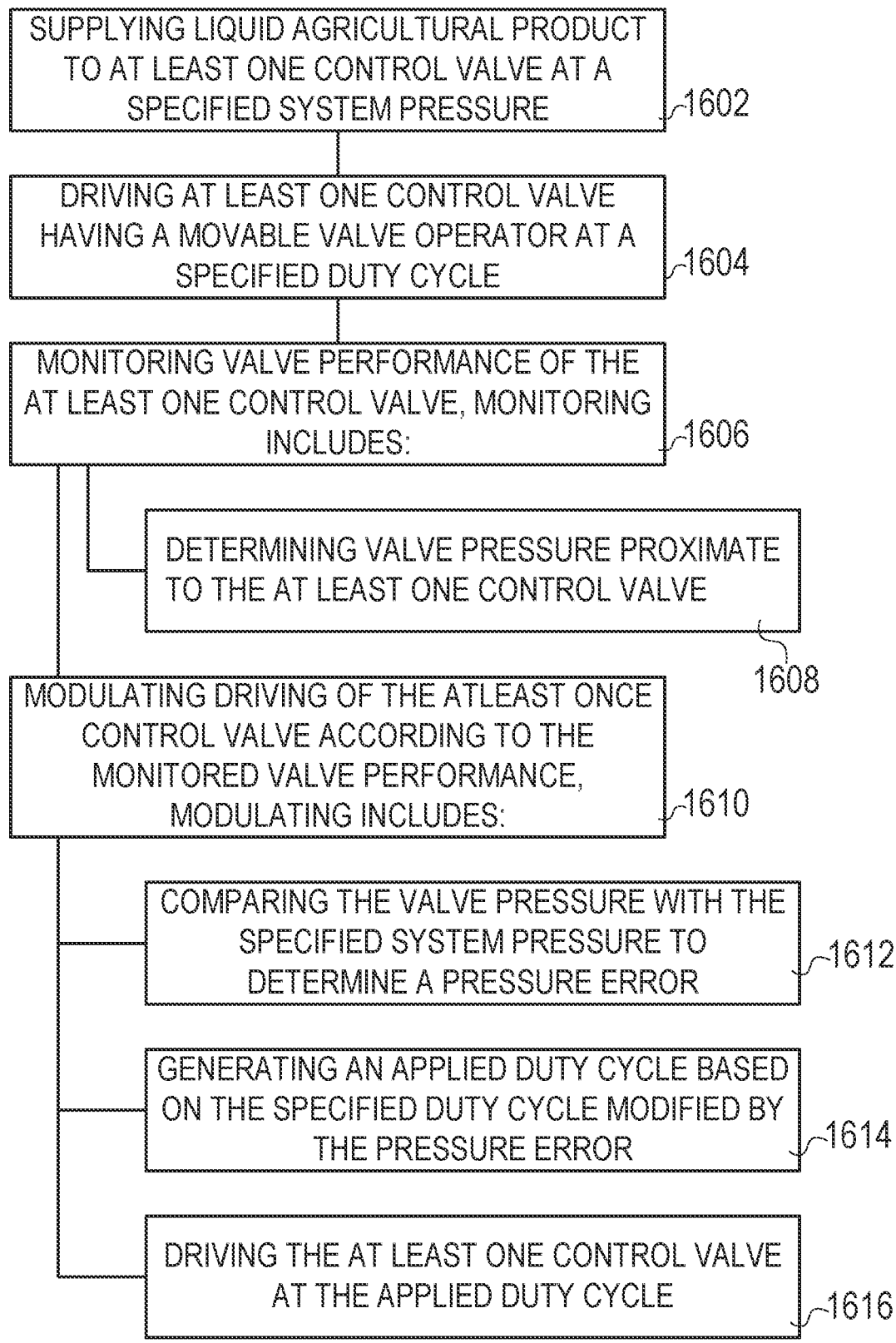
FIG. 16 illustrates a block diagram of a method for controlling one or more spray nozzles with duty cycle compensation.

FIG. 16 is a block diagram illustrating one example of a method 1600 for controlling one or more spray nozzles, for instance through duty cycle compensation for system and valve errors as discussed herein. In describing the method 1600 reference is made to one or more components, features, functions or the like described herein. Where convenient reference is made to the components of features with reference numerals. Reference numerals provided are exemplary and are not exclusive. For instance, the features, components, functions or the like described in the method 1600 include but are not limited to the corresponding numbered elements, other corresponding features described herein, both numbered and unnumbered as well as their equivalents.

At 1602 a liquid agricultural product (e.g., carrier fluid, mixture of carrier fluid and injected product, or injection product) is supplied to at least one control valve 1422 at a specified system pressure. For instance, the liquid agricultural product is regulated (e.g., pumped or restricted) at a specified initial pressure (PS, PS' or overpressure, PO, that provides PS'). At 1604, the at least on the control valve 1422 is driven at a specified duty cycle. For instance, an ECU (e.g., controller 606) of a smart nozzle receives a specified flow rate, and the ECU translates the specified flow rate to a corresponding specified duty cycle, and the valve operator of the control valve 1422 is driven according to the specified duty cycle, for instance to provide the specified flow rate of the liquid agricultural product through one or more associated spray nozzles 1424.

At 1606, performance of the at least one control valve 1422 is monitored including one or more characteristics of the valve itself and the system proximate to the valve. For instance, in one example, at 1608 a valve pressure is determined proximate to the at least one control valve 1422. The valve pressure proximate to the valve 1422 is determine with one or more features including measuring valve pressure proximate to the valve (e.g., with a pressure transducer). In another example, the valve pressure is determined with assignment of a valve pressure value according to incrementing or decrementing of the system pressure based on a location of the at least one control valve, for instance with empirical or experimental behavior of the sprayer system 1400. Optionally, the valve pressure is determined with assignment of a valve pressure valve taken from a system performance register having pressure values for the at least one control valve according to the location of the at least one control valve (e.g., along the boom tube 1420, relative to a system pressure regulator, relative to an indexed system pressure or the like). In still another example, the valve pressure is determined by generating a valve pressure value based on the flow rate of the liquid agricultural product through the at least one control valve (e.g., with the flow rate, dimensions of the valve or spray nozzle, the valve pressure is mathematically or empirically determines). In yet another example, the valve pressure is determined by generating a valve pressure value based on valve operator performance. As discussed herein, the performance of the valve is monitored and pressure proximate to the control valve 1422 is determined from the performance. For instance, applied current to open the valve from the closed position is associated with corresponding pressure differences across the control valve (e.g., pressure differences or delta between atmospheric on the downstream side and the upstream side of the valve). The pressure difference, in one example, corresponds to the pressure proximate to the control valve (e.g., P1 or P1' in FIG. 14) and is compared with the initial system pressure (PS, PS') to determine the pressure error (PE, PE').

At 1610, driving of the at least one control valve 1422 is modulated according to the monitored valve performance. As discussed herein, one or more errors are determined (e.g., detected, calculated, generated, assigned or the like) for valve performance or system characteristics proximate to the valve, and the specified duty cycle for the control valve 1422 is modified to compensate for the determined errors. At 1612, the determined valve pressure is compared with a specified system pressure (e.g., PS, PS' in FIG. 14) to determine a pressure error, such as PE1 or PE1' (or pressure errors associated with the other valves 1422) in FIG. 14. At 1614 an applied duty cycle is generated based on the specified duty cycle (e.g., corresponding to a specified flow rate for the valve 1422 or its associated spray nozzle(s) 1424) modified by the pressure error. In one example, the pressure error is transformed to a duty cycle and added or subtracted from the specified duty cycle (e.g., at the summation block 1506 in FIG. 15). At 1616, the method 1600 includes driving the at least one control valve 1422 at the applied duty cycle. Operating the at least one control valve 1422 with the applied duty cycle compensates one or more of flow rate through the valve and its associated spray nozzle(s), spray nozzle spray pattern or droplet size or the like for the determined error (e.g., pressure error, valve operator duty cycle error, alone or in combination, or the like).

Several options for the method 1600 follow. In one example, generating the valve pressure value based on valve operator performance includes generating the valve pressure value based on one or more of movement of the valve operator or electrical characteristics associated with movement of the valve operator.

In another example, monitoring the valve performance of the at least one control valve includes determining an actual valve operator duty cycle of the at least one control valve. Optionally, modulating driving of the least one control valve includes comparing the actual valve operator duty cycle with the specified duty cycle to determine a valve operatory duty cycle error. In this example, generating the applied duty cycle includes generating the applied duty cycle based on the specified duty cycle modified by the pressure error and the valve operator duty cycle error. The pressure error includes a pressure based duty cycle correction, the valve operator duty cycle error includes a valve operator based duty cycle correction. Generating the applied duty cycle includes generating the applied duty cycle based on the specified duty cycle modified by the pressure based duty cycle correction and the valve operator based duty cycle correction, for instance as shown in FIG. 15 with the summation block 1506.

The method 1600 optionally includes spraying the liquid agricultural product from a spray nozzle (e.g., nozzle 1424 or an array of spray nozzles 1424 as part of a boom section 1426, see FIG. 14) in communication with the at least one control valve 1422 driven at the applied duty cycle.

In another example, the at least one control valve 1422 includes a plurality of control valves 1422, and driving the at least one control valve 1422 at the specified duty cycle is conducted for each of the control valves 1422. Monitoring valve performance and modulating driving of the at least one control valve are conducted for each of the control valves 1422, for instance, to provide independently determined corrections and compensated operation for each of the valves. In another example, monitoring valve performance and modulating driving of each of the control valves 1422 is conducted independently for each of the control valves based on valve pressure proximate to each control valve 1422, respectively.

Optionally, the (initial) specified duty cycle varies for each of the control valves 1422, for instance because of boom location, boom rotation, field indexing of flow rate for nozzles/valves within specified zones or the like. Similarly, the corrections and compensated operation of the control valves 1422 is based on the varied specified duty cycles for each of the respective control valves 1422.

In another example, supplying the liquid agricultural product to the at least one control valve 1422 at the specified system pressure includes supplying the liquid agricultural product at an elevated system pressure (e.g., PO as shown in FIG. 14) greater than the specified system pressure (PS'). Supplying the liquid agricultural product includes providing the liquid agricultural product at the specified system pressure PS' along at least one location of a sprayer boom having the at least one control valve 1422 and a boom tube 1420 interconnecting the at least one control valve and a source of the liquid agricultural product. Optionally, the at least one control valve 1422 includes a plurality of control valves 1422 distributed along the boom tube 1420. Supplying the liquid agricultural product to the plurality of control valves at the specified system pressure includes supplying the liquid agricultural product at an elevated system pressure (PO) greater than the specified system pressure (PS'), and providing the liquid agricultural product at the specified system pressure (PS') along a sprayer boom having the boom tube 1420. As discussed herein, the elevated system pressure (PO) and associated system pressure (PS') minimize the pressure error (e.g., PE1', PE2' and so on) at one or more of the control valves 1422 of the plurality of control valves according to supply of the liquid agricultural product at the elevated system pressure.

Various Notes & Aspects

Aspect 1 can include subject matter such as a sprayer control system, comprising: a plurality of smart nozzles, each of the smart nozzles includes: at least one control valve having a valve operator; an electronic control unit (ECU) configured to operate the valve operator; and one or more spray nozzles, wherein the at least one control valve and the ECU are configured to control a flow rate of liquid agricultural product through the one or more spray nozzles; and a duty cycle modulator in communication with the ECU and configured to generate an applied duty cycle of the at least one control valve, the duty cycle modulator includes: a specified duty cycle input having a specified duty cycle; a valve monitor configured to determine an actual valve operator duty cycle of the at least one control valve; a valve operator comparator configured to compare the actual valve operator duty cycle with the specified duty cycle and generate a valve operator duty cycle error; a pressure monitor associated with the at least one control valve configured to determine a valve pressure proximate to the at least one control valve; a pressure comparator configured to compare the valve pressure with a system pressure and generate a pressure error; and an applied duty cycle generator configured to generate the applied duty cycle based on the specified duty cycle modified by the valve operator duty cycle error and the pressure error.

Aspect 2 can include, or can optionally be combined with the subject matter of Aspect 1, to optionally include wherein the valve monitor includes a valve operator monitor configured to monitor movement of the valve operator or electrical characteristics associated with movement of the valve operator to determine the actual valve operator duty cycle.

Aspect 3 can include, or can optionally be combined with the subject matter of one or any combination of Aspects 1 or 2 to optionally include wherein the pressure monitor includes one or more of: a pressure transducer proximate to the at least one control valve; an incrementor/decrementor configured to assign pressure values according to location of the at least one control valve; a system performance register having pressure according to location of the at least one control valve; a flow rate to pressure transformer configured to determine the valve pressure based on the flow rate through the one or more spray nozzles; or an operator performance to pressure transformer configured to determine the valve pressure based on valve operator performance.

Aspect 4 can include, or can optionally be combined with the subject matter of one or any combination of Aspects 1-3 to optionally include wherein valve operator performance includes one or more of movement of the valve operator or electrical characteristics associated with movement of the valve operator.

Aspect 5 can include, or can optionally be combined with the subject matter of one or any combination of Aspects 1-4 to optionally include wherein the ECU includes the pressure monitor and the valve monitor, and the ECU is configured to monitor one or more of electrical characteristics or movement of the valve operator to determine the actual valve operator duty cycle and the valve pressure proximate to the associated at least one control valve.

Aspect 6 can include, or can optionally be combined with the subject matter of Aspects 1-5 to optionally include wherein the duty cycle modulator includes a pressure error to duty cycle transformer configured to determine a pressure based duty cycle error based on the pressure error.

Aspect 7 can include, or can optionally be combined with the subject matter of Aspects 1-6 to optionally include wherein the applied duty cycle generator is configured to combine the specified duty cycle with each of the duty cycle error and the pressure based duty cycle error to generate the applied duty cycle.

Aspect 8 can include, or can optionally be combined with the subject matter of Aspects 1-7 to optionally include wherein the pressure based duty cycle error includes a pressure based duty cycle correction, and the valve operator duty cycle error includes a valve operator based duty cycle correction.

Aspect 9 can include, or can optionally be combined with the subject matter of Aspects 1-8 to optionally include wherein each of the smart nozzles includes an associated spray nozzle.

Aspect 10 can include, or can optionally be combined with the subject matter of Aspects 1-9 to optionally include a master node configured for coupling with a system pressure regulator, the master node is configured to control the system pressure of the liquid agricultural product.

Aspect 11 can include, or can optionally be combined with the subject matter of Aspects 1-10 to optionally include wherein the ECU includes the duty cycle modulator.

Aspect 12 can include, or can optionally be combined with the subject matter of Aspects 1-11 to optionally include the system pressure regulator in communication with the master node, and the system pressure regulator includes one or more a system pump or a pressure regulating valve.

Aspect 13 can include, or can optionally be combined with the subject matter of Aspects 1-12 to optionally include wherein the system pump includes one or more of a carrier fluid pump configured to pump carrier fluid or an injection pump configured to pump injection product, and the liquid agricultural product includes the injection product mixed with the carrier fluid.

Aspect 14 can include, or can optionally be combined with the subject matter of Aspects 1-13 to optionally include a sprayer control system, comprising: a plurality of smart nozzles, each of the smart nozzles includes: at least one control valve having a valve operator; an electronic control unit (ECU) configured to operate the valve operator; and one or more spray nozzles, wherein the at least one control valve and the ECU are configured to control a flow rate of liquid agricultural product through the one or more spray nozzles; and a duty cycle modulator in communication with the ECU and configured to generate an applied duty cycle of the at least one control valve, the duty cycle modulator includes: a specified duty cycle input having a specified duty cycle; a pressure monitor associated with the at least one control valve configured to determine a valve pressure proximate to the at least one control valve; a pressure comparator configured to compare the valve pressure with a system pressure and generate a pressure error; and an applied duty cycle generator configured to generate the applied duty cycle based on the specified duty cycle modified by the pressure error.

Aspect 15 can include, or can optionally be combined with the subject matter of Aspects 1-14 to optionally include wherein the pressure monitor includes one or more of: a pressure transducer proximate to the at least one control valve; an incrementor/decrementor configured to assign pressure values according to location of the at least one control valve; a system performance register having pressure according to location of the at least one control valve; a flow rate to pressure transformer configured to determine the valve pressure based on the flow rate through the at least one control valve; or an operator performance to pressure transformer configured to determine the valve pressure based on valve operator performance.

Aspect 16 can include, or can optionally be combined with the subject matter of Aspects 1-15 to optionally include wherein valve operator performance includes one or more of movement of the valve operator or electrical characteristics associated with movement of the valve operator.

Aspect 17 can include, or can optionally be combined with the subject matter of Aspects 1-16 to optionally include wherein the ECU includes the pressure monitor, and the ECU is configured to monitor one or more of electrical characteristics or movement of the valve operator to determine the valve pressure proximate to the associated at least one control valve.

Aspect 18 can include, or can optionally be combined with the subject matter of Aspects 1-17 to optionally include wherein the duty cycle modulator includes a pressure error to duty cycle transformer configured to determine a pressure based duty cycle error based on the pressure error.

Aspect 19 can include, or can optionally be combined with the subject matter of Aspects 1-18 to optionally include wherein the applied duty cycle generator is configured to combine the specified duty cycle with the pressure based duty cycle error to generate the applied duty cycle.

Aspect 20 can include, or can optionally be combined with the subject matter of Aspects 1-19 to optionally include a system pressure regulator in communication with a master node, and the master node is configured to control the system pressure of a liquid agricultural product.

Aspect 21 can include, or can optionally be combined with the subject matter of Aspects 1-20 to optionally include wherein the ECU includes the duty cycle modulator.

Aspect 22 can include, or can optionally be combined with the subject matter of Aspects 1-21 to optionally include wherein each of the smart nozzles includes an associated spray nozzle.

Aspect 23 can include, or can optionally be combined with the subject matter of Aspects 1-22 to optionally include a method for controlling one or more spray nozzles comprising: supplying liquid agricultural product to at least one control valve at a specified system pressure; driving at least one control valve having a movable valve operator at a specified duty cycle; monitoring valve performance of the at least one control valve, monitoring includes: determining valve pressure proximate to the at least one control valve; and modulating driving of the at least control valve according to the monitored valve performance, modulating includes: comparing the valve pressure with the specified system pressure to determine a pressure error; generating an applied duty cycle based on the specified duty cycle modified by the pressure error; and driving the at least one control valve at the applied duty cycle.

Aspect 24 can include, or can optionally be combined with the subject matter of Aspects 1-23 to optionally include wherein pressure error includes a pressure based duty cycle correction; and generating the applied duty cycle based on the specified duty cycle modified by the pressure error includes generating the applied duty cycle based on the specified duty cycle modified by the pressure based duty cycle correction.

Aspect 25 can include, or can optionally be combined with the subject matter of Aspects 1-24 to optionally include wherein determining valve pressure proximate to the least one control valve includes: measuring valve pressure proximate to the at least one control valve; assigning valve pressure proximate to the at least one control valve according to incrementing or decrementing of the system pressure based on a location of the at least one control valve; assigning valve pressure proximate to the at least one control valve according to a system performance register having pressure values for the at least one control valve according to the location of the at least one control valve; generating a valve pressure value based on flow rate of the liquid agricultural product through the at least one control valve; generating a valve pressure value based on valve operator performance.

Aspect 26 can include, or can optionally be combined with the subject matter of Aspects 1-25 to optionally include wherein generating the valve pressure value based on valve operator performance includes generating the valve pressure value based on one or more of movement of the valve operator or electrical characteristics associated with movement of the valve operator.

Aspect 27 can include, or can optionally be combined with the subject matter of Aspects 1-26 to optionally include wherein monitoring the valve performance of the at least one control valve includes determining an actual valve operator duty cycle of the at least one control valve.

Aspect 28 can include, or can optionally be combined with the subject matter of Aspects 1-27 to optionally include wherein modulating driving of the least one control valve includes: comparing the actual valve operator duty cycle with the specified duty cycle to determine a valve operatory duty cycle error; and generating the applied duty cycle includes generating the applied duty cycle based on the specified duty cycle modified by the pressure error and the valve operator duty cycle error.

Aspect 29 can include, or can optionally be combined with the subject matter of Aspects 1-28 to optionally include wherein the pressure error includes pressure based duty cycle correction, the valve operator duty cycle error includes a valve operator based duty cycle correction; and generating the applied duty cycle includes generating the applied duty cycle based on the specified duty cycle modified by the pressure based duty cycle correction and the valve operator based duty cycle correction.

Aspect 30 can include, or can optionally be combined with the subject matter of Aspects 1-29 to optionally include spraying the liquid agricultural product from a spray nozzle in communication with the at least one control valve driven at the applied duty cycle.

Aspect 31 can include, or can optionally be combined with the subject matter of Aspects 1-30 to optionally include wherein the at least one control valve includes a plurality of control valves; and driving the at least one control valve at the specified duty cycle is conducted for each of the control valves; and monitoring valve performance and modulating driving of the at least one control valve are conducted for each of the control valves.

Aspect 32 can include, or can optionally be combined with the subject matter of Aspects 1-31 to optionally include wherein monitoring valve performance and modulating driving of each of the control valves is conducted independently for each of the control valves based on valve pressure proximate to each control valve, respectively.

Aspect 33 can include, or can optionally be combined with the subject matter of Aspects 1-32 to optionally include wherein supplying the liquid agricultural product to the at least one control valve at the specified system pressure includes: supplying the liquid agricultural product at an elevated system pressure greater than the specified system pressure; and providing the liquid agricultural product at the specified system pressure along at least one location of a sprayer boom having the at least one control valve and a boom tube interconnecting the at least one control valve and a source of the liquid agricultural product.

Aspect 34 can include, or can optionally be combined with the subject matter of Aspects 1-33 to optionally include wherein the at least one control valve includes a plurality of control valves distributed along the boom tube; and supplying the liquid agricultural product to the at least one control valve at the specified system pressure includes: supplying the liquid agricultural product at an elevated system pressure greater than the specified system pressure; providing the liquid agricultural product at the specified system pressure along a sprayer boom; and minimizing the pressure error at one or more of the control valves of the plurality of control valves according to supply of the liquid agricultural product at the elevated system pressure.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A sprayer control system, comprising:
a first smart nozzle, including:
a control valve having a valve operator;
an electronic control unit (ECU) configured to operate the valve operator; and
a first set of one or more spray nozzles, wherein the control valve and the ECU are configured to control a flow rate of a liquid agricultural product through the first set of one or more spray nozzles;
a plurality of pressure monitors distributed along a boom tube, the boom tube extending between a proximal boom end and a distal boom end, wherein the plurality of pressure monitors are configured to determine one or more nozzle pressures at the first set of one or more spray nozzles proximate to the respective pressure monitors of the plurality of pressure monitors, the plurality of pressure monitors including a first pressure monitor associated with the first smart nozzle, wherein the first pressure monitor is located proximate to at least one of the first set of one or more spray nozzles and is configured to determine a first nozzle pressure proximate to the at least one of the first set of one or more spray nozzles; and
one or more system pressure regulators configured to control a system pressure of the liquid agricultural product within the boom tube, wherein the sprayer control system is configured to operate the one or more system pressure regulators at pressures above a specified system pressure to generate a system overpressure at the proximal boom end, and the sprayer control system is configured to operate the one or more system pressure regulators to achieve the specified system pressure between the proximal boom end and the distal boom end.

2. The sprayer control system of claim 1, further comprising:
a pressure comparator configured to compare the one or more nozzle pressures including the first nozzle pressure with the system pressure and generate at least one pressure error;
a second smart nozzle, including:
a second control valve having a second valve operator;
a second set of one or more spray nozzles, wherein the at least one second control valve and a second ECU are configured to control a flow rate of the liquid agricultural product through the first second set of one or more spray nozzles; and
a second pressure monitor associated with the second smart nozzle, wherein the second pressure monitor is located proximate to at least one of the second set of one or more spray nozzles and is configured to determine a second nozzle pressure proximate to the at least one of the second set of one or more spray nozzles; and wherein the pressure comparator generates the at least one pressure error based on a comparison of one or more of the first nozzle pressure or the second nozzle pressure with the system pressure.

3. The sprayer control system of claim 2, wherein the first smart nozzle and the second smart nozzle are installed along the boom tube.

4. The sprayer control system of claim 3, wherein the first pressure monitor is located between the proximal boom end and the first control valve.

5. The sprayer control system of claim 4, wherein the second pressure monitor is located between the proximal boom end and the second control valve.

6. The sprayer control system of claim 5, wherein the first pressure monitor is located between the proximal boom end and the second pressure monitor.

7. The sprayer control system of claim 2, wherein the ECU includes a first and the second ECU associated with the respective first and second smart nozzles.

8. The sprayer control system of claim 1, wherein the one or more system pressure regulators include a carrier pump or an injection pump.

9. The spray sprayer control system of claim 1, further comprising:
a pressure comparator configured to compare the one or more nozzle pressures including the first nozzle pressure with the system pressure and generate at least one pressure error; and
wherein the one or more system pressure regulators are configured to increase the system pressure to the system overpressure based on the at least one pressure error.

10. A sprayer control system, comprising:
an array of smart nozzles, each of the smart nozzles of the array of smart nozzles includes:
a control valve having a valve operator;
an electronic control unit (ECU) configured to operate the valve operator;
one or more spray nozzles, wherein the control valve and the ECU are configured to control a flow rate of liquid agricultural product through the first set of one or more spray nozzles; and
a pressure monitor located proximate to at least one spray nozzle of the one or more spray nozzles, the pressure monitor is configured to determine a nozzle pressure proximate to the at least one spray nozzle; and
a duty cycle modulator in communication with the ECU of each of the smart nozzles, the duty cycle modulator is configured to generate applied duty cycles for the control valve of each of the smart nozzles of the array of smart nozzles, and the duty cycle modulator includes:
a pressure comparator configured to compare the nozzle pressure for each smart nozzle of the array of smart nozzles with a system pressure and generate a pressure error for each of the smart nozzles; and
an applied duty cycle generator configured to generate applied duty cycles for each smart nozzle of the array of smart nozzles based on a specified duty cycle modified by the pressure error for each of the smart nozzles.

11. The sprayer control system of claim 10, wherein the array of smart nozzles includes a first smart nozzle and a second smart nozzle, wherein:
the first smart nozzle includes a first set of the one or more spray nozzles, and the pressure monitor determines a first nozzle pressure proximate to at least one of the spray nozzles nozzle of the first set of the one or more spray nozzles;

the second smart nozzle includes a second set of the one or more spray nozzles, and the pressure monitor determines a second nozzle pressure proximate to at least one of the spray nozzles nozzle of the second set of the one or more spray nozzles; and wherein the pressure comparator generates the pressure error based on a comparison of one or more of the first nozzle pressure or the second nozzle pressure with the system pressure.

12. The sprayer control system of claim 11, wherein the first smart nozzle and the second smart nozzle are installed along a boom tube having a first boom end and a second boom end.

13. The sprayer control system of claim 12, wherein the pressure monitor of the first smart nozzle is located between the first boom end and the control valve of the first smart nozzle.

14. The sprayer control system of claim 13, wherein second pressure monitor of the second smart nozzle is located between the first boom end and the control valve of the second smart nozzle.

15. The sprayer control system of claim 14, wherein the pressure monitor of the first smart nozzle is located between the first boom end and the pressure monitor of the second smart nozzle.

16. The sprayer control system of claim 10, further comprising a pressure regulator configured to adjust the system pressure, and the system pressure is adjusted based on the at least one pressure error.

17. The sprayer control system of claim 16, wherein the pressure regulator includes a carrier pump or an injection pump.

18. The spray sprayer control system of claim 16, wherein the pressure regulator is configured to increase the system pressure to a system overpressure based on the at least one pressure error.

19. The sprayer control system of claim 10, wherein the array of smart nozzles includes a first smart nozzle and a second smart nozzle, wherein:

the first smart nozzle includes a first set of the one or more spray nozzles, and the pressure monitor determines a first nozzle pressure proximate to at least one of the spray nozzle nozzles of the first set of the one or more spray nozzles;

the second smart nozzle includes a second set of the one or more spray nozzles, and the pressure monitor determines a second nozzle pressure proximate to at least one of the spray nozzle nozzles of the second set of the one or more spray nozzles;

wherein the pressure comparator is configured to compare the first nozzle pressure with the system pressure to determine a first pressure error;

wherein the pressure comparator is configured to compare the second nozzle pressure with the system pressure to determine a second pressure error;

wherein the applied duty cycle generator generates a first applied duty cycle for the first smart nozzle based on the first pressure error and the specified duty cycle for the first smart nozzle; and wherein the applied duty cycle generator generates a second applied duty cycle for the second smart nozzle based on the second pressure error and the specified duty cycle for the second smart nozzle.

* * * * *